(12) United States Patent
Davis et al.

(10) Patent No.: US 11,526,304 B2
(45) Date of Patent: *Dec. 13, 2022

(54) MEMCACHED SERVER FUNCTIONALITY IN A CLUSTER OF DATA PROCESSING NODES

(71) Applicant: III Holdings 2, LLC, Wilmington, DE (US)

(72) Inventors: Mark Bradley Davis, Austin, TX (US); Prashant R. Chandra, San Jose, CA (US)

(73) Assignee: III Holdings 2, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/089,207

(22) Filed: Nov. 4, 2020

(65) Prior Publication Data

US 2021/0117130 A1 Apr. 22, 2021

Related U.S. Application Data

(63) Continuation of application No. 16/198,619, filed on Nov. 21, 2018, now Pat. No. 10,877,695, which is a (Continued)

(51) Int. Cl.
*G06F 3/06* (2006.01)
*H04L 67/568* (2022.01)

(52) U.S. Cl.
CPC .......... *G06F 3/0659* (2013.01); *G06F 3/0604* (2013.01); *G06F 3/067* (2013.01); *H04L 67/568* (2022.05)

(58) Field of Classification Search
CPC ...... G06F 3/0659; G06F 3/067; G06F 3/0604; G06F 3/0656; H04L 49/25;
(Continued)

(56) References Cited

U.S. PATENT DOCUMENTS 4,215,406 A 7/1980 Gomola et al.
4,412,288 A 10/1983 Herman
(Continued)

FOREIGN PATENT DOCUMENTS

CA 2496783 3/2004
DE 112008001875 8/2013
(Continued)

OTHER PUBLICATIONS

US 7,774,482 B1, 08/2010, Szeto et al. (withdrawn)
(Continued)

*Primary Examiner* — Ernest Unelus
(74) *Attorney, Agent, or Firm* — Crowell & Moring LLP

(57) ABSTRACT

A method is performed by a first server on a chip (SoC) node that is one instance of a plurality of nodes within a cluster of nodes. An operation is performed for determine if a second one of the SoC nodes in the cluster has data stored thereon corresponding to a data identifier in response to receiving a data retrieval request including the data identifier. An operation is performed for determining if a remote memory access channel exists between the SoC node and the second one of the SoC nodes. An operation is performed for access the data from the second one of the SoC nodes using the remote memory access channel after determine that the second one of the SoC nodes has the data stored thereon and that the remote memory access channel exists between the SoC node and the second one of the SoC nodes.

17 Claims, 17 Drawing Sheets

Related U.S. Application Data continuation of application No. 15/357,332, filed on Nov. 21, 2016, now Pat. No. 10,140,245, which is a continuation of application No. 13/728,428, filed on Dec. 27, 2012, now Pat. No. 9,648,102, which is a continuation-in-part of application No. 13/453,086, filed on Apr. 23, 2012, now Pat. No. 8,599,863, which is a continuation-in-part of application No. 12/794,996, filed on Jun. 7, 2010, now abandoned.

(60) Provisional application No. 61/256,723, filed on Oct. 30, 2009.

(58) Field of Classification Search
CPC ............. H04L 67/2842; H04L 67/1097; H04L 49/356; H04L 49/357; H04L 49/3009
See application file for complete search history.

(56) References Cited

U.S. PATENT DOCUMENTS

| | | |
|---|---|---|
| 4,525,780 A | 6/1985 | Bratt et al. |
| 4,532,893 A | 8/1985 | Day et al. |
| 4,542,458 A | 9/1985 | Kitajima |
| 4,553,202 A | 11/1985 | Trufyn |
| 4,677,614 A | 6/1987 | Circo |
| 4,850,891 A | 7/1989 | Walkup et al. |
| 4,852,001 A | 7/1989 | Tsushima et al. |
| 4,943,932 A | 7/1990 | Lark et al. |
| 5,146,561 A | 9/1992 | Carey et al. |
| 5,168,441 A | 12/1992 | Onarheim |
| 5,175,800 A | 12/1992 | Galis et al. |
| 5,257,374 A | 10/1993 | Hammer et al. |
| 5,276,877 A | 1/1994 | Friedrich |
| 5,299,115 A | 3/1994 | Fields et al. |
| 5,307,496 A | 4/1994 | Ichinose et al. |
| 5,325,526 A | 6/1994 | Cameron et al. |
| 5,349,682 A | 9/1994 | Rosenberry |
| 5,355,508 A | 10/1994 | Kan |
| 5,377,332 A | 12/1994 | Entwistle et al. |
| 5,408,663 A | 4/1995 | Miller |
| 5,451,936 A | 9/1995 | Yang et al. |
| 5,473,773 A | 12/1995 | Aman et al. |
| 5,477,546 A | 12/1995 | Shibata |
| 5,495,533 A | 2/1996 | Linehan et al. |
| 5,504,894 A | 4/1996 | Ferguson et al. |
| 5,542,000 A | 7/1996 | Semba |
| 5,550,970 A | 8/1996 | Cline et al. |
| 5,594,901 A | 1/1997 | Andoh |
| 5,594,908 A | 1/1997 | Hyatt |
| 5,598,536 A | 1/1997 | Slaughter et al. |
| 5,600,844 A | 2/1997 | Shaw et al. |
| 5,623,641 A | 4/1997 | Kadoyashiki |
| 5,651,006 A | 7/1997 | Fujino et al. |
| 5,652,841 A | 7/1997 | Nemirovsky et al. |
| 5,675,739 A | 10/1997 | Eilert et al. |
| 5,701,451 A | 12/1997 | Rogers et al. |
| 5,729,754 A | 3/1998 | Estes |
| 5,732,077 A | 3/1998 | Whitehead |
| 5,734,818 A | 3/1998 | Kern et al. |
| 5,737,009 A | 4/1998 | Payton |
| 5,752,030 A | 5/1998 | Konno et al. |
| 5,757,771 A | 5/1998 | Li |
| 5,761,433 A | 6/1998 | Billings |
| 5,761,484 A | 6/1998 | Agarwal et al. |
| 5,765,146 A | 6/1998 | Wolf |
| 5,774,660 A | 6/1998 | Brendel et al. |
| 5,774,668 A | 6/1998 | Choquier et al. |
| 5,781,187 A | 7/1998 | Gephardt et al. |
| 5,781,624 A | 7/1998 | Mitra et al. |
| 5,787,459 A | 7/1998 | Stallmo et al. |
| 5,799,174 A | 8/1998 | Muntz et al. |
| 5,801,985 A | 9/1998 | Roohparvar et al. |
| 5,826,082 A | 10/1998 | Bishop et al. |
| 5,826,236 A | 10/1998 | Narimatsu et al. |
| 5,826,239 A | 10/1998 | Du et al. |
| 5,828,888 A | 10/1998 | Kozaki et al. |
| 5,832,517 A | 11/1998 | Knutsen, II |
| 5,854,887 A | 12/1998 | Kindell et al. |
| 5,862,478 A | 1/1999 | Cutler, Jr. et al. |
| 5,867,382 A | 2/1999 | McLaughlin |
| 5,874,789 A | 2/1999 | Su |
| 5,881,238 A | 3/1999 | Aman et al. |
| 5,901,048 A | 5/1999 | Hu |
| 5,908,468 A | 6/1999 | Hartmann |
| 5,911,143 A | 6/1999 | Deinhart et al. |
| 5,913,921 A | 6/1999 | Tosey |
| 5,918,017 A | 6/1999 | Attanasio et al. |
| 5,920,545 A | 7/1999 | Raesaenen et al. |
| 5,920,863 A | 7/1999 | McKeehan et al. |
| 5,930,167 A | 7/1999 | Lee et al. |
| 5,933,417 A | 8/1999 | Rottoo |
| 5,935,293 A | 8/1999 | Detering et al. |
| 5,950,190 A | 9/1999 | Yeager |
| 5,958,003 A | 9/1999 | Preining et al. |
| 5,961,599 A | 10/1999 | Kalavade et al. |
| 5,968,176 A | 10/1999 | Nessett et al. |
| 5,971,804 A | 10/1999 | Gallagher et al. |
| 5,978,356 A | 11/1999 | Elwalid et al. |
| 5,987,611 A | 11/1999 | Freund |
| 6,003,061 A | 12/1999 | Jones et al. |
| 6,006,192 A | 12/1999 | Cheng et al. |
| 6,012,052 A | 1/2000 | Altschuler et al. |
| 6,021,425 A | 2/2000 | Waldron, III et al. |
| 6,032,224 A | 2/2000 | Blumenau |
| 6,052,707 A | 4/2000 | D'Souza |
| 6,055,618 A | 4/2000 | Thorson |
| 6,058,416 A | 5/2000 | Mukherjee et al. |
| 6,067,545 A | 5/2000 | Wolff |
| 6,076,174 A | 6/2000 | Freund |
| 6,078,953 A | 6/2000 | Vaid et al. |
| 6,085,238 A | 7/2000 | Yuasa et al. |
| 6,088,718 A | 7/2000 | Altschuler et al. |
| 6,092,178 A | 7/2000 | Jindal et al. |
| 6,097,882 A | 8/2000 | Mogul |
| 6,098,090 A | 8/2000 | Burns |
| 6,101,508 A | 8/2000 | Wolff |
| 6,108,662 A | 8/2000 | Hoskins et al. |
| 6,122,664 A | 9/2000 | Boukobza |
| 6,141,214 A | 10/2000 | Ahn |
| 6,151,598 A | 11/2000 | Shaw et al. |
| 6,154,778 A | 11/2000 | Koistinen et al. |
| 6,161,170 A | 12/2000 | Burger et al. |
| 6,167,445 A | 12/2000 | Gai et al. |
| 6,175,869 B1 | 1/2001 | Ahuja et al. |
| 6,181,699 B1 | 1/2001 | Crinion et al. |
| 6,182,142 B1 | 1/2001 | Win et al. |
| 6,185,575 B1 | 2/2001 | Orcutt |
| 6,185,601 B1 | 2/2001 | Wolff |
| 6,192,414 B1 | 2/2001 | Horn |
| 6,195,678 B1 | 2/2001 | Komuro |
| 6,198,741 B1 | 3/2001 | Yoshizawa et al. |
| 6,201,611 B1 | 3/2001 | Carter et al. |
| 6,202,080 B1 | 3/2001 | Lu et al. |
| 6,205,465 B1 | 3/2001 | Schoening et al. |
| 6,212,542 B1 | 4/2001 | Kahle et al. |
| 6,223,202 B1 | 4/2001 | Bayeh |
| 6,226,677 B1 | 5/2001 | Slemmer |
| 6,226,788 B1 | 5/2001 | Schoening et al. |
| 6,247,056 B1 | 6/2001 | Chou et al. |
| 6,252,878 B1 | 6/2001 | Locklear |
| 6,253,230 B1 | 6/2001 | Couland et al. |
| 6,259,675 B1 | 7/2001 | Honda |
| 6,263,359 B1 | 7/2001 | Fong et al. |
| 6,266,667 B1 | 7/2001 | Olsson |
| 6,269,398 B1 | 7/2001 | Leong |
| 6,278,712 B1 | 8/2001 | Takihiro et al. |
| 6,282,561 B1 | 8/2001 | Jones et al. |
| 6,289,382 B1 | 9/2001 | Bowman-Amuah |
| 6,298,352 B1 | 10/2001 | Kannan et al. |
| 6,314,114 B1 | 11/2001 | Coyle et al. |
| 6,314,487 B1 | 11/2001 | Hahn et al. |
| 6,314,501 B1 | 11/2001 | Gulick et al. |
| 6,314,555 B1 | 11/2001 | Ndumu et al. |

(56) References Cited

U.S. PATENT DOCUMENTS

| | | |
|---|---|---|
| 6,317,787 B1 | 11/2001 | Boyd et al. |
| 6,324,279 B1 | 11/2001 | Kalmanek, Jr. et al. |
| 6,327,364 B1 | 12/2001 | Shaffer et al. |
| 6,330,008 B1 | 12/2001 | Razdow et al. |
| 6,330,562 B1 | 12/2001 | Boden et al. |
| 6,330,583 B1 | 12/2001 | Reiffin |
| 6,330,605 B1 | 12/2001 | Christensen et al. |
| 6,333,936 B1 | 12/2001 | Johansson et al. |
| 6,334,114 B1 | 12/2001 | Jacobs et al. |
| 6,338,085 B1 | 1/2002 | Ramaswamy |
| 6,338,112 B1 | 1/2002 | Wipfel et al. |
| 6,339,717 B1 | 1/2002 | Baumgartl et al. |
| 6,343,311 B1 | 1/2002 | Nishida et al. |
| 6,343,488 B1 | 2/2002 | Hackfort |
| 6,345,287 B1 | 2/2002 | Fong et al. |
| 6,345,294 B1 | 2/2002 | O'Toole et al. |
| 6,349,295 B1 | 2/2002 | Tedesco |
| 6,351,775 B1 | 2/2002 | Yu |
| 6,353,844 B1 | 3/2002 | Bitar et al. |
| 6,363,434 B1 | 3/2002 | Eytchison |
| 6,363,488 B1 | 3/2002 | Ginter et al. |
| 6,366,945 B1 | 4/2002 | Fong et al. |
| 6,370,154 B1 | 4/2002 | Wickham |
| 6,370,584 B1 | 4/2002 | Bestavros et al. |
| 6,373,841 B1 | 4/2002 | Goh et al. |
| 6,374,254 B1 | 4/2002 | Cochran et al. |
| 6,374,297 B1 | 4/2002 | Wolf et al. |
| 6,384,842 B1 | 5/2002 | DeKoning |
| 6,385,302 B1 | 5/2002 | Antonucci et al. |
| 6,392,989 B1 | 5/2002 | Jardetzky et al. |
| 6,393,569 B1 | 5/2002 | Orenshteyn |
| 6,393,581 B1 | 5/2002 | Friedman et al. |
| 6,400,996 B1 | 6/2002 | Hoffberg et al. |
| 6,404,768 B1 | 6/2002 | Basak et al. |
| 6,405,234 B2 | 6/2002 | Ventrone |
| 6,418,459 B1 | 7/2002 | Gulick |
| 6,434,568 B1 | 8/2002 | Bowman-Amuah |
| 6,438,125 B1 | 8/2002 | Brothers |
| 6,438,134 B1 | 8/2002 | Chow et al. |
| 6,438,594 B1 | 8/2002 | Bowman-Amuah |
| 6,438,652 B1 | 8/2002 | Jordan et al. |
| 6,442,137 B1 | 8/2002 | Yu et al. |
| 6,446,192 B1 | 9/2002 | Narasimhan et al. |
| 6,452,809 B1 | 9/2002 | Jackson et al. |
| 6,452,924 B1 | 9/2002 | Golden et al. |
| 6,453,349 B1 | 9/2002 | Kano et al. |
| 6,453,383 B1 | 9/2002 | Stoddard et al. |
| 6,460,082 B1 | 10/2002 | Lumelsky et al. |
| 6,463,454 B1 | 10/2002 | Lumelsky et al. |
| 6,464,261 B1 | 10/2002 | Dybevik et al. |
| 6,466,965 B1 | 10/2002 | Chessell et al. |
| 6,466,980 B1 | 10/2002 | Lumelsky et al. |
| 6,477,580 B1 | 11/2002 | Bowman-Amuah |
| 6,487,390 B1 | 11/2002 | Virine et al. |
| 6,490,432 B1 | 12/2002 | Wegener et al. |
| 6,496,566 B1 | 12/2002 | Posthuma |
| 6,496,866 B2 | 12/2002 | Attanasio et al. |
| 6,496,872 B1 | 12/2002 | Katz et al. |
| 6,502,135 B1 | 12/2002 | Munger et al. |
| 6,505,228 B1 | 1/2003 | Schoening et al. |
| 6,507,586 B1 | 1/2003 | Satran et al. |
| 6,519,571 B1 | 2/2003 | Guheen et al. |
| 6,520,591 B1 | 2/2003 | Jun et al. |
| 6,526,442 B1 | 2/2003 | Stupek, Jr. et al. |
| 6,529,499 B1 | 3/2003 | Doshi et al. |
| 6,529,932 B1 | 3/2003 | Dadiomov et al. |
| 6,549,940 B1 | 4/2003 | Allen et al. |
| 6,556,952 B1 | 4/2003 | Magro |
| 6,564,261 B1 | 5/2003 | Gudjonsson et al. |
| 6,571,215 B1 | 5/2003 | Mahapatro |
| 6,571,391 B1 | 5/2003 | Acharya et al. |
| 6,574,238 B1 | 6/2003 | Thrysoe |
| 6,574,632 B2 | 6/2003 | Fox et al. |
| 6,578,068 B1 | 6/2003 | Bowman-Amuah |
| 6,584,489 B1 | 6/2003 | Jones et al. |
| 6,584,499 B1 | 6/2003 | Jantz et al. |
| 6,587,469 B1 | 7/2003 | Bragg |
| 6,587,938 B1 | 7/2003 | Eilert et al. |
| 6,590,587 B1 | 7/2003 | Wichelman et al. |
| 6,600,898 B1 | 7/2003 | Bonet et al. |
| 6,601,234 B1 | 7/2003 | Bowman-Amuah |
| 6,606,660 B1 | 8/2003 | Bowman-Amuah |
| 6,618,820 B1 | 9/2003 | Krum |
| 6,622,168 B1 | 9/2003 | Datta |
| 6,626,077 B1 | 9/2003 | Gilbert |
| 6,628,649 B1 | 9/2003 | Raj et al. |
| 6,629,081 B1 | 9/2003 | Cornelius et al. |
| 6,629,148 B1 | 9/2003 | Ahmed et al. |
| 6,633,544 B1 | 10/2003 | Rexford et al. |
| 6,636,853 B1 | 10/2003 | Stephens, Jr. |
| 6,640,145 B2 | 10/2003 | Hoffberg et al. |
| 6,640,238 B1 | 10/2003 | Bowman-Amuah |
| 6,651,098 B1 | 11/2003 | Carroll et al. |
| 6,651,125 B2 | 11/2003 | Maergner |
| 6,661,671 B1 | 12/2003 | Franke et al. |
| 6,661,787 B1 | 12/2003 | O'Connell et al. |
| 6,662,202 B1 | 12/2003 | Krusche et al. |
| 6,662,219 B1 | 12/2003 | Nishanov et al. |
| 6,668,304 B1 | 12/2003 | Satran et al. |
| 6,687,257 B1 | 2/2004 | Balasubramanian |
| 6,690,400 B1 | 2/2004 | Moayyad et al. |
| 6,690,647 B1 | 2/2004 | Tang et al. |
| 6,701,318 B2 | 3/2004 | Fox et al. |
| 6,704,489 B1 | 3/2004 | Kurakake |
| 6,711,691 B1 | 3/2004 | Howard et al. |
| 6,714,778 B2 | 3/2004 | Nykanen et al. |
| 6,724,733 B1 | 4/2004 | Schuba et al. |
| 6,725,456 B1 | 4/2004 | Bruno et al. |
| 6,735,188 B1 | 5/2004 | Becker et al. |
| 6,735,630 B1 | 5/2004 | Gelvin et al. |
| 6,738,736 B1 | 5/2004 | Bond |
| 6,745,246 B1 | 6/2004 | Erimli et al. |
| 6,748,559 B1 | 6/2004 | Pfister |
| 6,757,723 B1 | 6/2004 | O'Toole et al. |
| 6,760,306 B1 | 7/2004 | Pan et al. |
| 6,766,389 B2 | 7/2004 | Hayter et al. |
| 6,771,661 B1 | 8/2004 | Chawla et al. |
| 6,772,211 B2 | 8/2004 | Lu et al. |
| 6,775,701 B1 | 8/2004 | Pan et al. |
| 6,779,016 B1 | 8/2004 | Aziz et al. |
| 6,781,990 B1 | 8/2004 | Puri et al. |
| 6,785,724 B1 | 8/2004 | Drainville et al. |
| 6,785,794 B2 | 8/2004 | Chase et al. |
| 6,813,676 B1 | 11/2004 | Henry et al. |
| 6,816,750 B1 | 11/2004 | Klaas |
| 6,816,903 B1 | 11/2004 | Rakoshitz et al. |
| 6,816,905 B1 | 11/2004 | Sheets et al. |
| 6,823,377 B1 | 11/2004 | Wu et al. |
| 6,826,607 B1 | 11/2004 | Gelvin et al. |
| 6,829,762 B2 | 12/2004 | Arimilli et al. |
| 6,832,251 B1 | 12/2004 | Gelvin et al. |
| 6,836,806 B1 | 12/2004 | Raciborski et al. |
| 6,842,430 B1 | 1/2005 | Melnik |
| 6,850,966 B2 | 2/2005 | Matsuura et al. |
| 6,857,020 B1 | 2/2005 | Chaar et al. |
| 6,857,026 B1 | 2/2005 | Cain |
| 6,857,938 B1 | 2/2005 | Smith et al. |
| 6,859,831 B1 | 2/2005 | Gelvin et al. |
| 6,859,927 B2 | 2/2005 | Moody et al. |
| 6,862,606 B1 | 3/2005 | Major et al. |
| 6,868,097 B1 | 3/2005 | Soda et al. |
| 6,874,031 B2 | 3/2005 | Corbeil |
| 6,894,792 B1 | 5/2005 | Abe |
| 6,904,460 B1 | 6/2005 | Raciborski et al. |
| 6,912,533 B1 | 6/2005 | Hornick |
| 6,922,664 B1 | 7/2005 | Fernandez et al. |
| 6,925,431 B1 | 8/2005 | Papaefstathiou |
| 6,928,471 B2 | 8/2005 | Pabari et al. |
| 6,931,640 B2 | 8/2005 | Asano et al. |
| 6,934,702 B2 | 8/2005 | Faybishenko et al. |
| 6,938,256 B2 | 8/2005 | Deng et al. |
| 6,947,982 B1 | 9/2005 | McGann et al. |
| 6,948,171 B2 | 9/2005 | Dan et al. |
| 6,950,821 B2 | 9/2005 | Faybishenko et al. |

(56) References Cited

U.S. PATENT DOCUMENTS

| | | |
|---|---|---|
| 6,950,833 B2 | 9/2005 | Costello et al. |
| 6,952,828 B2 | 10/2005 | Greene |
| 6,954,784 B2 | 10/2005 | Aiken et al. |
| 6,963,917 B1 | 11/2005 | Callis et al. |
| 6,963,926 B1 | 11/2005 | Robinson |
| 6,963,948 B1 | 11/2005 | Gulick |
| 6,965,930 B1 | 11/2005 | Arrowood et al. |
| 6,966,033 B1 | 11/2005 | Gasser et al. |
| 6,971,098 B2 | 11/2005 | Khare et al. |
| 6,975,609 B1 | 12/2005 | Khaleghi et al. |
| 6,977,939 B2 | 12/2005 | Joy et al. |
| 6,978,310 B1 | 12/2005 | Rodriguez et al. |
| 6,978,447 B1 | 12/2005 | Okmianski |
| 6,985,461 B2 | 1/2006 | Singh |
| 6,985,937 B1 | 1/2006 | Keshav et al. |
| 6,988,170 B2 | 1/2006 | Barroso et al. |
| 6,990,063 B1 | 1/2006 | Lenoski et al. |
| 6,990,677 B1 | 1/2006 | Pietraszak et al. |
| 6,996,821 B1 | 2/2006 | Butterworth |
| 6,996,822 B1 | 2/2006 | Willen |
| 7,003,414 B1 | 2/2006 | Wichelman et al. |
| 7,006,881 B1 | 2/2006 | Hallberg et al. |
| 7,013,303 B2 | 3/2006 | Faybishenko et al. |
| 7,013,322 B2 | 3/2006 | Lahr |
| 7,017,186 B2 | 3/2006 | Day |
| 7,020,695 B1 | 3/2006 | Kundu et al. |
| 7,020,701 B1 | 3/2006 | Gelvin et al. |
| 7,020,719 B1 | 3/2006 | Grove et al. |
| 7,032,119 B2 | 4/2006 | Fung |
| 7,034,686 B2 | 4/2006 | Matsumura |
| 7,035,230 B1 | 4/2006 | Shaffer et al. |
| 7,035,240 B1 | 4/2006 | Balakrishnan et al. |
| 7,035,854 B2 | 4/2006 | Hsaio et al. |
| 7,035,911 B2 | 4/2006 | Lowery et al. |
| 7,043,605 B2 | 5/2006 | Suzuki |
| 7,058,070 B2 | 6/2006 | Tran et al. |
| 7,058,951 B2 | 6/2006 | Bril et al. |
| 7,065,579 B2 | 6/2006 | Traversal et al. |
| 7,065,764 B1 | 6/2006 | Prael et al. |
| 7,072,807 B2 | 7/2006 | Brown et al. |
| 7,076,717 B2 | 7/2006 | Grossman et al. |
| 7,080,078 B1 | 7/2006 | Slaughter et al. |
| 7,080,283 B1 | 7/2006 | Songer et al. |
| 7,080,285 B2 | 7/2006 | Kosugi |
| 7,080,378 B1 | 7/2006 | Noland et al. |
| 7,082,606 B2 | 7/2006 | Wood et al. |
| 7,085,825 B1 | 8/2006 | Pishevar et al. |
| 7,085,837 B2 | 8/2006 | Kimbrel et al. |
| 7,085,893 B2 | 8/2006 | Krissell et al. |
| 7,089,294 B1 | 8/2006 | Baskey et al. |
| 7,093,256 B2 | 8/2006 | Bloks |
| 7,095,738 B1 | 8/2006 | Desanti |
| 7,099,933 B1 | 8/2006 | Wallace et al. |
| 7,100,192 B1 | 8/2006 | Igawa et al. |
| 7,102,996 B1 | 9/2006 | Amdahl et al. |
| 7,103,625 B1 | 9/2006 | Hipp et al. |
| 7,103,664 B1 | 9/2006 | Novaes et al. |
| 7,117,208 B2 | 10/2006 | Tamayo et al. |
| 7,117,273 B1 | 10/2006 | O'Toole et al. |
| 7,119,591 B1 | 10/2006 | Lin |
| 7,124,289 B1 | 10/2006 | Suorsa |
| 7,124,410 B2 | 10/2006 | Berg et al. |
| 7,126,913 B1 | 10/2006 | Patel et al. |
| 7,127,613 B2 | 10/2006 | Pabla et al. |
| 7,127,633 B1 | 10/2006 | Olson et al. |
| 7,136,927 B2 | 11/2006 | Traversal et al. |
| 7,140,020 B2 | 11/2006 | McCarthy et al. |
| 7,143,088 B2 | 11/2006 | Green et al. |
| 7,143,153 B1 | 11/2006 | Black et al. |
| 7,143,168 B1 | 11/2006 | BiBiasio et al. |
| 7,145,995 B2 | 12/2006 | Oltmanns et al. |
| 7,146,233 B2 | 12/2006 | Aziz et al. |
| 7,146,353 B2 | 12/2006 | Garg et al. |
| 7,146,416 B1 | 12/2006 | Yoo et al. |
| 7,150,044 B2 | 12/2006 | Hoefelmeyer et al. |
| 7,154,621 B2 | 12/2006 | Rodriguez et al. |
| 7,155,478 B2 | 12/2006 | Ims et al. |
| 7,155,502 B1 | 12/2006 | Galloway et al. |
| 7,165,107 B2 | 1/2007 | Pouyoul et al. |
| 7,165,120 B1 | 1/2007 | Giles et al. |
| 7,167,920 B2 | 1/2007 | Traversal et al. |
| 7,168,049 B2 | 1/2007 | Day |
| 7,170,315 B2 | 1/2007 | Bakker et al. |
| 7,171,415 B2 | 1/2007 | Kan et al. |
| 7,171,476 B2 | 1/2007 | Maeda et al. |
| 7,171,491 B1 | 1/2007 | O'Toole et al. |
| 7,171,593 B1 | 1/2007 | Whittaker |
| 7,177,823 B2 | 2/2007 | Lam et al. |
| 7,180,866 B1 | 2/2007 | Chartre et al. |
| 7,185,046 B2 | 2/2007 | Ferstl et al. |
| 7,185,073 B1 | 2/2007 | Gai et al. |
| 7,185,077 B1 | 2/2007 | O'Toole et al. |
| 7,188,145 B2 | 3/2007 | Lowery et al. |
| 7,188,174 B2 | 3/2007 | Rolia et al. |
| 7,191,244 B2 | 3/2007 | Jennings et al. |
| 7,197,549 B1 | 3/2007 | Salama et al. |
| 7,197,559 B2 | 3/2007 | Goldstein et al. |
| 7,197,561 B1 | 3/2007 | Lovy et al. |
| 7,197,565 B2 | 3/2007 | Abdelaziz et al. |
| 7,203,063 B2 | 4/2007 | Bash et al. |
| 7,203,746 B1 | 4/2007 | Harrop |
| 7,203,753 B2 | 4/2007 | Yeager et al. |
| 7,206,819 B2 | 4/2007 | Schmidt |
| 7,206,841 B2 | 4/2007 | Traversal et al. |
| 7,206,934 B2 | 4/2007 | Pabla et al. |
| 7,213,047 B2 | 5/2007 | Yeager et al. |
| 7,213,050 B1 | 5/2007 | Shaffer et al. |
| 7,213,062 B1 | 5/2007 | Raciborski et al. |
| 7,213,065 B2 | 5/2007 | Watt |
| 7,216,173 B2 | 5/2007 | Clayton et al. |
| 7,222,187 B2 | 5/2007 | Yeager et al. |
| 7,222,343 B2 | 5/2007 | Heyrman et al. |
| 7,225,249 B1 | 5/2007 | Barry et al. |
| 7,225,442 B2 | 5/2007 | Dutta et al. |
| 7,228,350 B2 | 6/2007 | Hong et al. |
| 7,231,445 B1 | 6/2007 | Aweya et al. |
| 7,233,569 B1 | 6/2007 | Swallow |
| 7,233,669 B2 | 6/2007 | Swallow |
| 7,236,915 B2 | 6/2007 | Algieri et al. |
| 7,237,243 B2 | 6/2007 | Sutton et al. |
| 7,242,501 B2 | 7/2007 | Ishimoto |
| 7,243,351 B2 | 7/2007 | Kundu |
| 7,249,179 B1 | 7/2007 | Romero et al. |
| 7,251,222 B2 | 7/2007 | Chen et al. |
| 7,251,688 B2 | 7/2007 | Leighton et al. |
| 7,254,608 B2 | 8/2007 | Yeager et al. |
| 7,257,655 B1 | 8/2007 | Burney et al. |
| 7,260,846 B2 | 8/2007 | Day |
| 7,263,288 B1 | 8/2007 | Islam |
| 7,263,560 B2 | 8/2007 | Abdelaziz et al. |
| 7,274,705 B2 | 9/2007 | Chang et al. |
| 7,275,018 B2 | 9/2007 | Abu-El-Zeet et al. |
| 7,275,102 B2 | 9/2007 | Yeager et al. |
| 7,275,249 B1 | 9/2007 | Miller et al. |
| 7,278,008 B1 | 10/2007 | Case et al. |
| 7,278,142 B2 | 10/2007 | Bandhole et al. |
| 7,278,582 B1 | 10/2007 | Siegel et al. |
| 7,281,045 B2 | 10/2007 | Aggarwal et al. |
| 7,283,838 B2 | 10/2007 | Lu |
| 7,284,109 B1 | 10/2007 | Paxie et al. |
| 7,289,619 B2 | 10/2007 | Vivadelli et al. |
| 7,289,985 B2 | 10/2007 | Zeng et al. |
| 7,293,092 B2 | 11/2007 | Sukegawa |
| 7,296,268 B2 | 11/2007 | Darling et al. |
| 7,299,294 B1 | 11/2007 | Bruck et al. |
| 7,305,464 B2 | 12/2007 | Phillipi et al. |
| 7,308,496 B2 | 12/2007 | Yeager et al. |
| 7,308,687 B2 | 12/2007 | Trossman et al. |
| 7,310,319 B2 | 12/2007 | Awsienko et al. |
| 7,313,793 B2 | 12/2007 | Traut et al. |
| 7,315,887 B1 | 1/2008 | Liang et al. |
| 7,320,025 B1 | 1/2008 | Steinberg et al. |
| 7,324,555 B1 | 1/2008 | Chen et al. |
| 7,325,050 B2 | 1/2008 | O+3 Connor et al. |

(56) References Cited

U.S. PATENT DOCUMENTS

| | | |
|---|---|---|
| 7,328,243 B2 | 2/2008 | Yeager et al. |
| 7,328,264 B2 | 2/2008 | Babka |
| 7,328,406 B2 | 2/2008 | Kalinoski et al. |
| 7,334,108 B1 | 2/2008 | Case et al. |
| 7,334,230 B2 | 2/2008 | Chung et al. |
| 7,337,333 B2 | 2/2008 | O+3 Conner et al. |
| 7,337,446 B2 | 2/2008 | Sankaranarayan et al. |
| 7,340,500 B2 | 3/2008 | Traversal et al. |
| 7,340,578 B1 | 3/2008 | Khanzode |
| 7,340,777 B1 | 3/2008 | Szor |
| 7,343,467 B2 | 3/2008 | Brown et al. |
| 7,349,348 B1 | 3/2008 | Johnson et al. |
| 7,350,186 B2 | 3/2008 | Coleman et al. |
| 7,353,276 B2 | 4/2008 | Bain et al. |
| 7,353,362 B2 | 4/2008 | Georgiou et al. |
| 7,353,495 B2 | 4/2008 | Somogyi |
| 7,356,655 B2 | 4/2008 | Allen et al. |
| 7,356,770 B1 | 4/2008 | Jackson |
| 7,363,346 B2 | 4/2008 | Groner et al. |
| 7,366,101 B1 | 4/2008 | Varier et al. |
| 7,366,719 B2 | 4/2008 | Shaw |
| 7,370,092 B2 | 5/2008 | Aderton et al. |
| 7,373,391 B2 | 5/2008 | Iinuma |
| 7,373,524 B2 | 5/2008 | Motsinger et al. |
| 7,376,693 B2 | 5/2008 | Neiman et al. |
| 7,380,039 B2 | 5/2008 | Miloushev et al. |
| 7,382,154 B2 | 6/2008 | Ramos et al. |
| 7,383,433 B2 | 6/2008 | Yeager et al. |
| 7,386,586 B1 | 6/2008 | Headley et al. |
| 7,386,611 B2 | 6/2008 | Dias et al. |
| 7,386,850 B2 | 6/2008 | Mullen |
| 7,386,888 B2 | 6/2008 | Liang et al. |
| 7,389,310 B1 | 6/2008 | Bhagwan et al. |
| 7,392,325 B2 | 6/2008 | Grove et al. |
| 7,392,360 B1 | 6/2008 | Aharoni |
| 7,395,536 B2 | 7/2008 | Verbeke et al. |
| 7,395,537 B1 | 7/2008 | Brown |
| 7,398,216 B2 | 7/2008 | Barnett et al. |
| 7,398,471 B1 | 7/2008 | Rambacher |
| 7,401,114 B1 | 7/2008 | Block et al. |
| 7,401,152 B2 | 7/2008 | Traversal et al. |
| 7,401,153 B2 | 7/2008 | Traversal et al. |
| 7,401,355 B2 | 7/2008 | Supnik et al. |
| 7,403,994 B1 | 7/2008 | Vogl et al. |
| 7,409,433 B2 | 8/2008 | Lowery et al. |
| 7,412,492 B1 | 8/2008 | Waldspurger |
| 7,412,703 B2 | 8/2008 | Cleary et al. |
| 7,415,709 B2 | 8/2008 | Hipp et al. |
| 7,418,518 B2 | 8/2008 | Grove et al. |
| 7,418,534 B2 | 8/2008 | Hayter et al. |
| 7,421,402 B2 | 9/2008 | Chang et al. |
| 7,421,500 B2 | 9/2008 | Talwar et al. |
| 7,423,971 B1 | 9/2008 | Mohaban et al. |
| 7,426,489 B2 | 9/2008 | Van Soestbergen et al. |
| 7,426,546 B2 | 9/2008 | Breiter et al. |
| 7,428,540 B1 | 9/2008 | Coates et al. |
| 7,433,304 B1 | 10/2008 | Galloway et al. |
| 7,437,460 B2 | 10/2008 | Chidambaran et al. |
| 7,437,540 B2 | 10/2008 | Paolucci et al. |
| 7,437,730 B2 | 10/2008 | Goyal |
| 7,441,261 B2 | 10/2008 | Slater et al. |
| 7,447,147 B2 | 11/2008 | Nguyen et al. |
| 7,447,197 B2 | 11/2008 | Terrell et al. |
| 7,451,199 B2 | 11/2008 | Kandefer et al. |
| 7,451,201 B2 | 11/2008 | Alex et al. |
| 7,454,467 B2 | 11/2008 | Girouard et al. |
| 7,461,134 B2 | 12/2008 | Ambrose |
| 7,463,587 B2 | 12/2008 | Rajsic et al. |
| 7,464,159 B2 | 12/2008 | Luoffo et al. |
| 7,464,160 B2 | 12/2008 | Iszlai et al. |
| 7,466,712 B2 | 12/2008 | Makishima et al. |
| 7,466,810 B1 | 12/2008 | Quon et al. |
| 7,467,225 B2 | 12/2008 | Anerousis et al. |
| 7,467,306 B2 | 12/2008 | Cartes et al. |
| 7,467,358 B2 | 12/2008 | Kang et al. |
| 7,475,419 B1 | 1/2009 | Basu et al. |
| 7,483,945 B2 | 1/2009 | Blumofe |
| 7,484,008 B1 | 1/2009 | Gelvin et al. |
| 7,484,225 B2 | 1/2009 | Hugly et al. |
| 7,487,254 B2 | 2/2009 | Walsh et al. |
| 7,487,509 B2 | 2/2009 | Hugly et al. |
| 7,492,720 B2 | 2/2009 | Pruthi et al. |
| 7,502,747 B1 | 3/2009 | Pardo et al. |
| 7,502,884 B1 | 3/2009 | Shah et al. |
| 7,503,045 B1 | 3/2009 | Aziz et al. |
| 7,505,463 B2 | 3/2009 | Schuba |
| 7,512,649 B2 | 3/2009 | Faybishenko et al. |
| 7,512,894 B1 | 3/2009 | Hintermeister |
| 7,516,221 B2 | 4/2009 | Souder et al. |
| 7,516,455 B2 | 4/2009 | Matheson et al. |
| 7,519,677 B2 | 4/2009 | Lowery et al. |
| 7,519,843 B1 | 4/2009 | Buterbaugh et al. |
| 7,526,479 B2 | 4/2009 | Zenz |
| 7,529,835 B1 | 5/2009 | Agronow et al. |
| 7,533,141 B2 | 5/2009 | Nadgi et al. |
| 7,533,161 B2 | 5/2009 | Hugly et al. |
| 7,533,172 B2 | 5/2009 | Traversal et al. |
| 7,533,385 B1 | 5/2009 | Barnes |
| 7,536,541 B2 | 5/2009 | Isaacson |
| 7,543,052 B1 | 6/2009 | Klein |
| 7,546,553 B2 | 6/2009 | Bozak et al. |
| 7,551,614 B2 | 6/2009 | Teisberg et al. |
| 7,554,930 B2 | 6/2009 | Gaddis et al. |
| 7,555,666 B2 | 6/2009 | Brundridge et al. |
| 7,562,143 B2 | 7/2009 | Fellenstein et al. |
| 7,568,199 B2 | 7/2009 | Bozak et al. |
| 7,570,943 B2 | 8/2009 | Sorvari et al. |
| 7,571,438 B2 | 8/2009 | Jones et al. |
| 7,574,523 B2 | 8/2009 | Traversal et al. |
| 7,577,722 B1 | 8/2009 | Khandejar et al. |
| 7,577,834 B1 | 8/2009 | Traversal et al. |
| 7,577,959 B2 | 8/2009 | Nguyen et al. |
| 7,580,382 B1 | 8/2009 | Amis et al. |
| 7,580,919 B1 | 8/2009 | Hannel |
| 7,583,607 B2 | 9/2009 | Steele et al. |
| 7,583,661 B2 | 9/2009 | Chaudhuri |
| 7,584,274 B2 | 9/2009 | Bond et al. |
| 7,586,841 B2 | 9/2009 | Vasseur |
| 7,590,746 B2 | 9/2009 | Slater et al. |
| 7,590,747 B2 | 9/2009 | Coates et al. |
| 7,594,011 B2 | 9/2009 | Chandra |
| 7,594,015 B2 | 9/2009 | Bozak et al. |
| 7,596,144 B2 | 9/2009 | Pong |
| 7,596,784 B2 | 9/2009 | Abrams et al. |
| 7,599,360 B2 | 10/2009 | Edsall et al. |
| 7,606,225 B2 | 10/2009 | Xie et al. |
| 7,606,245 B2 | 10/2009 | Ma et al. |
| 7,610,289 B2 | 10/2009 | Muret et al. |
| 7,613,796 B2 | 11/2009 | Harvey et al. |
| 7,616,646 B1 | 11/2009 | Ma et al. |
| 7,620,057 B1 | 11/2009 | Aloni et al. |
| 7,620,635 B2 | 11/2009 | Hornick |
| 7,620,706 B2 | 11/2009 | Jackson |
| 7,624,118 B2 | 11/2009 | Schipunov et al. |
| 7,624,194 B2 | 11/2009 | Kakivaya et al. |
| 7,627,691 B1 | 12/2009 | Buchsbaum et al. |
| 7,631,066 B1 | 12/2009 | Schatz et al. |
| 7,640,353 B2 | 12/2009 | Shen et al. |
| 7,640,547 B2 | 12/2009 | Neiman et al. |
| 7,644,215 B2 | 1/2010 | Wallace et al. |
| 7,657,535 B2 | 2/2010 | Moyaux et al. |
| 7,657,597 B2 | 2/2010 | Arora et al. |
| 7,657,626 B1 | 2/2010 | Zwicky |
| 7,657,677 B2 | 2/2010 | Huang et al. |
| 7,657,756 B2 | 2/2010 | Hall |
| 7,660,887 B2 | 2/2010 | Reedy et al. |
| 7,660,922 B2 | 2/2010 | Harriman |
| 7,664,110 B1 | 2/2010 | Lovett et al. |
| 7,665,090 B1 | 2/2010 | Tormasov et al. |
| 7,668,809 B1 | 2/2010 | Kelly et al. |
| 7,673,164 B1 | 3/2010 | Agarwal |
| 7,680,933 B2 | 3/2010 | Fatula, Jr. |
| 7,685,281 B1 | 3/2010 | Saraiya et al. |
| 7,685,599 B2 | 3/2010 | Kanai et al. |

(56) References Cited

U.S. PATENT DOCUMENTS

| | | |
|---|---|---|
| 7,685,602 B1 | 3/2010 | Tran et al. |
| 7,689,661 B2 | 3/2010 | Lowery et al. |
| 7,693,976 B2 | 4/2010 | Perry et al. |
| 7,693,993 B2 | 4/2010 | Sheets et al. |
| 7,694,076 B2 | 4/2010 | Lowery et al. |
| 7,694,305 B2 | 4/2010 | Karlsson et al. |
| 7,698,386 B2 | 4/2010 | Amidon et al. |
| 7,698,398 B1 | 4/2010 | Lai |
| 7,698,430 B2 | 4/2010 | Jackson |
| 7,701,948 B2 | 4/2010 | Rabie et al. |
| 7,707,088 B2 | 4/2010 | Schmelzer |
| 7,710,936 B2 | 5/2010 | Morales Barroso |
| 7,711,652 B2 | 5/2010 | Schmelzer |
| 7,716,193 B2 | 5/2010 | Krishnamoorthy |
| 7,716,334 B2 | 5/2010 | Rao et al. |
| 7,719,834 B2 | 5/2010 | Miyamoto et al. |
| 7,721,125 B2 | 5/2010 | Fung |
| 7,725,583 B2 | 5/2010 | Jackson |
| 7,730,220 B2 | 6/2010 | Hasha et al. |
| 7,730,262 B2 | 6/2010 | Lowery et al. |
| 7,730,488 B2 | 6/2010 | Ilzuka et al. |
| 7,739,308 B2 | 6/2010 | Baffler et al. |
| 7,739,541 B1 | 6/2010 | Rao et al. |
| 7,742,425 B2 | 6/2010 | El-Damhougy |
| 7,742,476 B2 | 6/2010 | Branda et al. |
| 7,743,147 B2 | 6/2010 | Suorsa et al. |
| 7,747,451 B2 | 6/2010 | Keohane et al. |
| RE41,440 E | 7/2010 | Briscoe et al. |
| 7,751,433 B2 | 7/2010 | Dollo et al. |
| 7,752,258 B2 | 7/2010 | Lewin et al. |
| 7,752,624 B2 | 7/2010 | Crawford, Jr. et al. |
| 7,756,658 B2 | 7/2010 | Kulkarni et al. |
| 7,757,236 B1 | 7/2010 | Singh |
| 7,760,720 B2 | 7/2010 | Pullela et al. |
| 7,761,557 B2 | 7/2010 | Fellenstein et al. |
| 7,761,687 B2 | 7/2010 | Blumrich et al. |
| 7,765,288 B2 | 7/2010 | Bainbridge et al. |
| 7,765,299 B2 | 7/2010 | Romero |
| 7,769,620 B1 | 8/2010 | Fernandez et al. |
| 7,769,803 B2 | 8/2010 | Birdwell et al. |
| 7,770,120 B2 | 8/2010 | Baudisch |
| 7,774,331 B2 | 8/2010 | Barth et al. |
| 7,774,495 B2 | 8/2010 | Pabla et al. |
| 7,778,234 B2 | 8/2010 | Cooke et al. |
| 7,782,813 B2 | 8/2010 | Wheeler et al. |
| 7,783,777 B1 | 8/2010 | Pabla et al. |
| 7,783,786 B1 | 8/2010 | Lauterbach |
| 7,783,910 B2 | 8/2010 | Felter et al. |
| 7,788,403 B2 | 8/2010 | Darugar et al. |
| 7,788,477 B1 | 8/2010 | Huang et al. |
| 7,791,894 B2 | 9/2010 | Bechtolsheim |
| 7,792,113 B1 | 9/2010 | Foschiano et al. |
| 7,793,288 B2 | 9/2010 | Sameske |
| 7,796,399 B2 | 9/2010 | Clayton et al. |
| 7,796,619 B1 | 9/2010 | Feldmann et al. |
| 7,797,367 B1 | 9/2010 | Gelvin et al. |
| 7,797,393 B2 | 9/2010 | Qiu et al. |
| 7,801,132 B2 | 9/2010 | Ofek et al. |
| 7,802,017 B2 | 9/2010 | Uemura et al. |
| 7,805,448 B2 | 9/2010 | Andrzejak et al. |
| 7,805,575 B1 | 9/2010 | Agarwal et al. |
| 7,810,090 B2 | 10/2010 | Gebhart |
| 7,813,822 B1 | 10/2010 | Hoffberg |
| 7,827,361 B1 | 11/2010 | Karlsson et al. |
| 7,830,820 B2 | 11/2010 | Duke et al. |
| 7,831,839 B2 | 11/2010 | Hatakeyama |
| 7,840,353 B2 | 11/2010 | Ouksel et al. |
| 7,840,703 B2 | 11/2010 | Arimilli et al. |
| 7,844,687 B1 | 11/2010 | Gelvin et al. |
| 7,844,787 B2 | 11/2010 | Ranganathan et al. |
| 7,848,262 B2 | 12/2010 | El-Damhougy |
| 7,849,139 B2 | 12/2010 | Wolfson et al. |
| 7,849,140 B2 | 12/2010 | Abdel-Aziz et al. |
| 7,853,880 B2 | 12/2010 | Porter |
| 7,860,999 B1 | 12/2010 | Subramanian et al. |
| 7,865,614 B2 | 1/2011 | Lu et al. |
| 7,886,023 B1 | 2/2011 | Johnson |
| 7,889,675 B2 | 2/2011 | Mack-Crane et al. |
| 7,890,571 B1 | 2/2011 | Kriegsman |
| 7,890,701 B2 | 2/2011 | Lowery et al. |
| 7,891,004 B1 | 2/2011 | Gelvin et al. |
| RE42,262 E | 3/2011 | Stephens, Jr. |
| 7,899,047 B2 | 3/2011 | Cabrera et al. |
| 7,900,206 B1 | 3/2011 | Joshi et al. |
| 7,904,569 B1 | 3/2011 | Gelvin et al. |
| 7,925,795 B2 | 4/2011 | Tamir et al. |
| 7,930,397 B2 | 4/2011 | Midgley |
| 7,934,005 B2 | 4/2011 | Fascenda |
| 7,958,262 B2 | 6/2011 | Hasha et al. |
| 7,970,929 B1 | 6/2011 | Mahalingaiah |
| 7,971,204 B2 | 6/2011 | Jackson |
| 7,975,032 B2 | 7/2011 | Lowery et al. |
| 7,975,035 B2 | 7/2011 | Popescu et al. |
| 7,975,110 B1 | 7/2011 | Spaur et al. |
| 7,984,137 B2 | 7/2011 | O'Toole, Jr. et al. |
| 7,984,183 B2 | 7/2011 | Andersen et al. |
| 7,991,817 B2 | 8/2011 | Dehon et al. |
| 7,991,922 B2 | 8/2011 | Hayter et al. |
| 7,992,151 B2 | 8/2011 | Warrier et al. |
| 7,995,501 B2 | 8/2011 | Jetcheva et al. |
| 7,996,510 B2 | 8/2011 | Vicente |
| 8,000,288 B2 | 8/2011 | Wheeler et al. |
| 8,014,408 B2 | 9/2011 | Habelha et al. |
| 8,018,860 B1 | 9/2011 | Cook |
| 8,019,832 B2 | 9/2011 | De Sousa et al. |
| 8,032,634 B1 | 10/2011 | Eppstein |
| 8,037,202 B2 | 10/2011 | Yeager et al. |
| 8,037,475 B1 | 10/2011 | Jackson |
| 8,041,773 B2 | 10/2011 | Abu-Ghazaleh et al. |
| 8,055,788 B1 | 11/2011 | Chan et al. |
| 8,060,552 B2 | 11/2011 | Hinni et al. |
| 8,060,760 B2 | 11/2011 | Shetty et al. |
| 8,060,775 B1 | 11/2011 | Sharma et al. |
| 8,073,978 B2 | 12/2011 | Sengupta et al. |
| 8,078,708 B1 | 12/2011 | Wang et al. |
| 8,079,118 B2 | 12/2011 | Gelvin et al. |
| 8,082,400 B1 | 12/2011 | Chang et al. |
| 8,090,880 B2 | 1/2012 | Hasha et al. |
| 8,095,600 B2 | 1/2012 | Hasha et al. |
| 8,095,601 B2 | 1/2012 | Hasha et al. |
| 8,103,543 B1 | 1/2012 | Zwicky |
| 8,108,455 B2 | 1/2012 | Yeager et al. |
| 8,108,508 B1 | 1/2012 | Goh et al. |
| 8,108,512 B2 | 1/2012 | Howard et al. |
| 8,108,930 B2 | 1/2012 | Hoefelmeyer et al. |
| 8,122,269 B2 | 2/2012 | Houlihan et al. |
| 8,132,034 B2 | 3/2012 | Lambert et al. |
| 8,135,812 B2 | 3/2012 | Lowery et al. |
| 8,140,658 B1 | 3/2012 | Gelvin et al. |
| 8,151,103 B2 | 4/2012 | Jackson |
| 8,155,113 B1 | 4/2012 | Agarwal |
| 8,156,362 B2 | 4/2012 | Branover et al. |
| 8,160,077 B2 | 4/2012 | Traversal et al. |
| 8,161,391 B2 | 4/2012 | McCleiland et al. |
| 8,165,120 B2 | 4/2012 | Maruccia et al. |
| 8,166,063 B2 | 4/2012 | Andersen et al. |
| 8,166,204 B2 | 4/2012 | Basu et al. |
| 8,170,040 B2 | 5/2012 | Konda |
| 8,171,136 B2 | 5/2012 | Petite |
| 8,176,189 B2 | 5/2012 | Traversal et al. |
| 8,176,490 B1 | 5/2012 | Jackson |
| 8,180,996 B2 | 5/2012 | Fullerton et al. |
| 8,185,776 B1 | 5/2012 | Gentes et al. |
| 8,189,612 B2 | 5/2012 | Lemaire et al. |
| 8,194,659 B2 | 6/2012 | Ban |
| 8,196,133 B2 | 6/2012 | Kakumani et al. |
| 8,199,636 B1 | 6/2012 | Rouyer et al. |
| 8,204,992 B2 | 6/2012 | Arora et al. |
| 8,205,044 B2 | 6/2012 | Lowery et al. |
| 8,205,103 B2 | 6/2012 | Kazama et al. |
| 8,205,210 B2 | 6/2012 | Cleary et al. |
| 8,244,671 B2 | 8/2012 | Chen et al. |
| 8,260,893 B1 | 9/2012 | Bandhole et al. |
| 8,261,349 B2 | 9/2012 | Peng |

(56) References Cited

U.S. PATENT DOCUMENTS

| | | |
|---|---|---|
| 8,266,321 B2 | 9/2012 | Johnston-Watt et al. |
| 8,271,628 B2 | 9/2012 | Lowery et al. |
| 8,271,980 B2 | 9/2012 | Jackson |
| 8,275,881 B2 | 9/2012 | Fellenslein et al. |
| 8,302,100 B2 | 10/2012 | Deng et al. |
| 8,321,048 B1 | 11/2012 | Coss et al. |
| 8,346,591 B2 | 1/2013 | Fellenstein et al. |
| 8,346,908 B1 | 1/2013 | Vanyukhin et al. |
| 8,359,397 B2 | 1/2013 | Traversal et al. |
| 8,370,898 B1 | 2/2013 | Jackson |
| 8,379,425 B2 | 2/2013 | Fukuoka et al. |
| 8,380,846 B1 | 2/2013 | Abu-Ghazaleh et al. |
| 8,386,622 B2 | 2/2013 | Jacobson |
| 8,392,515 B2 | 3/2013 | Kakivaya et al. |
| 8,396,757 B2 | 3/2013 | Fellenslein et al. |
| 8,397,092 B2 | 3/2013 | Karnowski |
| 8,402,540 B2 | 3/2013 | Kapoor et al. |
| 8,407,428 B2 | 3/2013 | Cheriton et al. |
| 8,413,155 B2 | 4/2013 | Jackson |
| 8,417,715 B1 | 4/2013 | Bruckhaus et al. |
| 8,417,813 B2 | 4/2013 | Kakivaya et al. |
| 8,458,333 B1 | 6/2013 | Stoica et al. |
| 8,463,867 B2 | 6/2013 | Robertson et al. |
| 8,464,250 B1 | 6/2013 | Ansel |
| 8,484,382 B2 | 7/2013 | Das et al. |
| 8,495,201 B2 | 7/2013 | Klincewicz |
| 8,504,663 B2 | 8/2013 | Lowery et al. |
| 8,504,791 B2 | 8/2013 | Cheriton et al. |
| 8,516,470 B1 | 8/2013 | van Rietschote |
| 8,544,017 B1 | 9/2013 | Prael et al. |
| 8,554,920 B2 | 10/2013 | Chen et al. |
| 8,560,639 B2 | 10/2013 | Murphy et al. |
| 8,572,326 B2 | 10/2013 | Murphy et al. |
| RE44,610 E | 11/2013 | Krakirian et al. |
| 8,584,129 B1 | 11/2013 | Czajkowski |
| 8,589,517 B2 | 11/2013 | Hoefelmeyer et al. |
| 8,599,863 B2 | 12/2013 | Davis |
| 8,601,595 B2 | 12/2013 | Gelvin et al. |
| 8,606,800 B2 | 12/2013 | Lagad et al. |
| 8,615,602 B2 | 12/2013 | Li et al. |
| 8,626,820 B1 | 1/2014 | Levy |
| 8,631,130 B2 | 1/2014 | Jackson |
| 8,684,802 B1 | 4/2014 | Gross et al. |
| 8,701,121 B2 | 4/2014 | Saffre |
| 8,726,278 B1 | 5/2014 | Shawver et al. |
| 8,737,410 B2 | 5/2014 | Davis |
| 8,738,860 B1 | 5/2014 | Griffin et al. |
| 8,745,275 B2 | 6/2014 | Ikeya et al. |
| 8,745,302 B2 | 6/2014 | Davis et al. |
| 8,782,120 B2 | 7/2014 | Jackson |
| 8,782,231 B2 | 7/2014 | Jackson |
| 8,782,321 B2 | 7/2014 | Harriman et al. |
| 8,782,654 B2 | 7/2014 | Jackson |
| 8,812,400 B2 | 8/2014 | Faraboschi et al. |
| 8,824,485 B2 | 9/2014 | Biswas et al. |
| 8,854,831 B2 | 10/2014 | Arnouse |
| 8,863,143 B2 | 10/2014 | Jackson |
| 8,903,964 B2 | 12/2014 | Breslin |
| 8,930,536 B2 | 1/2015 | Jackson |
| 8,954,584 B1 | 2/2015 | Subbarayan et al. |
| 9,008,079 B2 | 4/2015 | Davis et al. |
| 9,038,078 B2 | 5/2015 | Jackson |
| 9,054,990 B2 | 6/2015 | Davis |
| 9,060,060 B2 | 6/2015 | Lobig |
| 9,069,611 B2 | 6/2015 | Jackson |
| 9,069,929 B2 | 6/2015 | Borland |
| 9,075,655 B2 | 7/2015 | Davis et al. |
| 9,075,657 B2 | 7/2015 | Jackson |
| 9,077,654 B2 | 7/2015 | Davis |
| 9,092,594 B2 | 7/2015 | Borland |
| 9,112,813 B2 | 8/2015 | Jackson |
| 9,116,755 B2 | 8/2015 | Jackson |
| 9,128,767 B2 | 9/2015 | Jackson |
| 9,152,455 B2 | 10/2015 | Jackson |
| 9,176,785 B2 | 11/2015 | Jackson |
| 9,231,886 B2 | 1/2016 | Jackson |
| 9,262,225 B2 | 2/2016 | Davis |
| 9,268,607 B2 | 2/2016 | Jackson |
| 9,288,147 B2 | 3/2016 | Kern |
| 9,304,896 B2 | 4/2016 | Chandra et al. |
| 9,311,269 B2 | 4/2016 | Davis |
| 9,367,802 B2 | 6/2016 | Arndt et al. |
| 9,405,584 B2 | 8/2016 | Davis |
| 9,413,687 B2 | 8/2016 | Jackson |
| 9,454,403 B2 | 9/2016 | Davis |
| 9,465,771 B2 | 10/2016 | Davis et al. |
| 9,479,463 B2 | 10/2016 | Davis |
| 9,491,064 B2 | 10/2016 | Jackson |
| 9,509,552 B2 | 11/2016 | Davis |
| 9,575,805 B2 | 2/2017 | Jackson |
| 9,585,281 B2 | 2/2017 | Schnell |
| 9,602,573 B1 | 3/2017 | Abu-Ghazaleh et al. |
| 9,619,296 B2 | 4/2017 | Jackson |
| 9,648,102 B1 | 5/2017 | Davis et al. |
| 9,680,770 B2 | 6/2017 | Davis |
| 9,749,326 B2 | 8/2017 | Davis |
| 9,778,959 B2 | 10/2017 | Jackson |
| 9,785,479 B2 | 10/2017 | Jackson |
| 9,792,249 B2 | 10/2017 | Borland |
| 9,825,860 B2 | 11/2017 | Hu |
| 9,866,477 B2 | 1/2018 | Davis |
| 9,876,735 B2 | 1/2018 | Davis |
| 9,886,322 B2 | 2/2018 | Jackson |
| 9,929,976 B2 | 3/2018 | Davis |
| 9,959,140 B2 | 5/2018 | Jackson |
| 9,959,141 B2 | 5/2018 | Jackson |
| 9,961,013 B2 | 5/2018 | Jackson |
| 9,965,442 B2 | 5/2018 | Borland |
| 9,977,763 B2 | 5/2018 | Davis |
| 9,979,672 B2 | 5/2018 | Jackson |
| 10,021,806 B2 | 7/2018 | Schnell |
| 10,050,970 B2 | 8/2018 | Davis |
| 10,135,731 B2 | 11/2018 | Davis |
| 10,140,245 B2 | 11/2018 | Davis et al. |
| 10,277,531 B2 | 4/2019 | Jackson |
| 10,311,014 B2 | 6/2019 | Dalton |
| 10,333,862 B2 | 6/2019 | Jackson |
| 10,379,909 B2 | 8/2019 | Jackson |
| 10,445,146 B2 | 10/2019 | Jackson |
| 10,445,148 B2 | 10/2019 | Jackson |
| 10,585,704 B2 | 3/2020 | Jackson |
| 10,608,949 B2 | 3/2020 | Jackson |
| 10,733,028 B2 | 8/2020 | Jackson |
| 10,735,505 B2 | 8/2020 | Abu-Ghazaleh et al. |
| 10,871,999 B2 | 12/2020 | Jackson |
| 10,951,487 B2 | 3/2021 | Jackson |
| 10,977,090 B2 | 4/2021 | Jackson |
| 11,132,277 B2 | 9/2021 | Dalton |
| 11,134,022 B2 | 9/2021 | Jackson |
| 11,144,355 B2 | 10/2021 | Jackson |
| 11,356,385 B2 | 6/2022 | Jackson |
| 11,467,883 B2 | 10/2022 | Jackson |
| 2001/0015733 A1 | 8/2001 | Sklar |
| 2001/0023431 A1 | 9/2001 | Horiguchi |
| 2001/0034752 A1 | 10/2001 | Kremien |
| 2001/0037311 A1 | 11/2001 | McCoy et al. |
| 2001/0044667 A1 | 11/2001 | Nakano |
| 2001/0044759 A1 | 11/2001 | Kutsumi |
| 2001/0046227 A1 | 11/2001 | Matsuhira et al. |
| 2001/0051929 A1 | 12/2001 | Suzuki |
| 2001/0052016 A1 | 12/2001 | Skene et al. |
| 2001/0052108 A1 | 12/2001 | Bowman-Amuah |
| 2002/0002578 A1 | 1/2002 | Yamashita |
| 2002/0002636 A1 | 1/2002 | Vange et al. |
| 2002/0004833 A1 | 1/2002 | Tonouchi |
| 2002/0004912 A1 | 1/2002 | Fung |
| 2002/0007389 A1 | 1/2002 | Jones et al. |
| 2002/0010783 A1 | 1/2002 | Primak et al. |
| 2002/0018481 A1 | 2/2002 | Mor et al. |
| 2002/0031364 A1 | 3/2002 | Suzuki et al. |
| 2002/0032716 A1 | 3/2002 | Nagato |
| 2002/0035605 A1 | 3/2002 | Kenton |
| 2002/0040391 A1 | 4/2002 | Chaiken et al. |
| 2002/0049608 A1 | 4/2002 | Hartsell et al. |

(56) References Cited

U.S. PATENT DOCUMENTS

| | | |
|---|---|---|
| 2002/0052909 A1 | 5/2002 | Seeds |
| 2002/0052961 A1 | 5/2002 | Yoshimine et al. |
| 2002/0059094 A1 | 5/2002 | Hosea et al. |
| 2002/0059274 A1 | 5/2002 | Hartsell et al. |
| 2002/0062377 A1 | 5/2002 | Hillman et al. |
| 2002/0062451 A1 | 5/2002 | Scheidt et al. |
| 2002/0065864 A1 | 5/2002 | Hartsell et al. |
| 2002/0083299 A1 | 6/2002 | Van Huben et al. |
| 2002/0083352 A1 | 6/2002 | Fujimoto et al. |
| 2002/0087611 A1 | 7/2002 | Tanaka et al. |
| 2002/0087699 A1 | 7/2002 | Karagiannis et al. |
| 2002/0090075 A1 | 7/2002 | Gabriel |
| 2002/0091786 A1 | 7/2002 | Yamaguchi et al. |
| 2002/0093915 A1 | 7/2002 | Larson |
| 2002/0097732 A1 | 7/2002 | Worster et al. |
| 2002/0099842 A1 | 7/2002 | Jennings et al. |
| 2002/0103886 A1 | 8/2002 | Rawson, III |
| 2002/0107903 A1 | 8/2002 | Richter et al. |
| 2002/0107962 A1 | 8/2002 | Richter et al. |
| 2002/0116234 A1 | 8/2002 | Nagasawa |
| 2002/0116721 A1 | 8/2002 | Dobes et al. |
| 2002/0120741 A1 | 8/2002 | Webb et al. |
| 2002/0124128 A1 | 9/2002 | Qiu |
| 2002/0129160 A1 | 9/2002 | Habelha |
| 2002/0133537 A1 | 9/2002 | Lau et al. |
| 2002/0133821 A1 | 9/2002 | Shteyn |
| 2002/0138459 A1 | 9/2002 | Mandal |
| 2002/0138635 A1 | 9/2002 | Redlich et al. |
| 2002/0143855 A1 | 10/2002 | Traversat |
| 2002/0143944 A1 | 10/2002 | Traversal et al. |
| 2002/0147663 A1 | 10/2002 | Walker et al. |
| 2002/0147771 A1 | 10/2002 | Traversal et al. |
| 2002/0147810 A1 | 10/2002 | Traversal et al. |
| 2002/0151271 A1 | 10/2002 | Tatsuji |
| 2002/0152299 A1 | 10/2002 | Traversal et al. |
| 2002/0152305 A1 | 10/2002 | Jackson et al. |
| 2002/0156699 A1 | 10/2002 | Gray et al. |
| 2002/0156891 A1 | 10/2002 | Ulrich et al. |
| 2002/0156893 A1 | 10/2002 | Pouyoul et al. |
| 2002/0156904 A1 | 10/2002 | Gullotta et al. |
| 2002/0156984 A1 | 10/2002 | Padovano |
| 2002/0159452 A1 | 10/2002 | Foster et al. |
| 2002/0161869 A1 | 10/2002 | Griffin et al. |
| 2002/0161917 A1 | 10/2002 | Shapiro et al. |
| 2002/0166117 A1 | 11/2002 | Abrams et al. |
| 2002/0172205 A1 | 11/2002 | Tagore-Brage et al. |
| 2002/0173984 A1 | 11/2002 | Robertson et al. |
| 2002/0174165 A1 | 11/2002 | Kawaguchi |
| 2002/0174227 A1 | 11/2002 | Hartsell et al. |
| 2002/0184310 A1 | 12/2002 | Traversal et al. |
| 2002/0184311 A1 | 12/2002 | Traversal et al. |
| 2002/0184357 A1 | 12/2002 | Traversal et al. |
| 2002/0184358 A1 | 12/2002 | Traversal et al. |
| 2002/0186656 A1 | 12/2002 | Vu |
| 2002/0188657 A1 | 12/2002 | Traversal et al. |
| 2002/0194384 A1 | 12/2002 | Habelha |
| 2002/0194412 A1 | 12/2002 | Bottom |
| 2002/0196611 A1 | 12/2002 | Ho et al. |
| 2002/0196734 A1 | 12/2002 | Tanaka et al. |
| 2002/0198734 A1 | 12/2002 | Greene et al. |
| 2002/0198923 A1 | 12/2002 | Hayes |
| 2003/0004772 A1 | 1/2003 | Dutta et al. |
| 2003/0005130 A1 | 1/2003 | Cheng |
| 2003/0005162 A1 | 1/2003 | Habelha |
| 2003/0007493 A1 | 1/2003 | Oi et al. |
| 2003/0009506 A1 | 1/2003 | Bril et al. |
| 2003/0014503 A1 | 1/2003 | Legout et al. |
| 2003/0014524 A1 | 1/2003 | Tormasov |
| 2003/0014539 A1 | 1/2003 | Reznick |
| 2003/0018766 A1 | 1/2003 | Duvvuru |
| 2003/0018803 A1 | 1/2003 | El Batt et al. |
| 2003/0028585 A1 | 2/2003 | Yeager et al. |
| 2003/0028642 A1 | 2/2003 | Agarwal et al. |
| 2003/0028645 A1 | 2/2003 | Romagnoli |
| 2003/0028656 A1 | 2/2003 | Babka |
| 2003/0033547 A1 | 2/2003 | Larson et al. |
| 2003/0036820 A1 | 2/2003 | Yellepeddy et al. |
| 2003/0039246 A1 | 2/2003 | Guo et al. |
| 2003/0041141 A1 | 2/2003 | Abdelaziz et al. |
| 2003/0041266 A1 | 2/2003 | Ke et al. |
| 2003/0041308 A1 | 2/2003 | Ganesan et al. |
| 2003/0050924 A1 | 3/2003 | Faybishenko et al. |
| 2003/0050959 A1 | 3/2003 | Faybishenko et al. |
| 2003/0050989 A1 | 3/2003 | Marinescu et al. |
| 2003/0051127 A1 | 3/2003 | Miwa |
| 2003/0055894 A1 | 3/2003 | Yeager et al. |
| 2003/0055898 A1 | 3/2003 | Yeager et al. |
| 2003/0058277 A1 | 3/2003 | Bowman-Amuah |
| 2003/0061260 A1 | 3/2003 | Rajkumar |
| 2003/0061261 A1 | 3/2003 | Greene |
| 2003/0061262 A1 | 3/2003 | Hahn et al. |
| 2003/0065703 A1 | 4/2003 | Aborn |
| 2003/0065784 A1 | 4/2003 | Herrod |
| 2003/0069918 A1 | 4/2003 | Lu et al. |
| 2003/0069949 A1 | 4/2003 | Chan et al. |
| 2003/0072263 A1 | 4/2003 | Peterson |
| 2003/0074090 A1 | 4/2003 | Becka |
| 2003/0076832 A1 | 4/2003 | Ni |
| 2003/0088457 A1 | 5/2003 | Keil et al. |
| 2003/0093255 A1 | 5/2003 | Freyensee et al. |
| 2003/0093624 A1 | 5/2003 | Arimilli et al. |
| 2003/0097429 A1 | 5/2003 | Wu et al. |
| 2003/0097439 A1 | 5/2003 | Strayer et al. |
| 2003/0101084 A1 | 5/2003 | Perez |
| 2003/0103413 A1 | 6/2003 | Jacobi, Jr. et al. |
| 2003/0105655 A1 | 6/2003 | Kimbrel et al. |
| 2003/0105721 A1 | 6/2003 | Ginter et al. |
| 2003/0110262 A1 | 6/2003 | Hasan et al. |
| 2003/0112792 A1 | 6/2003 | Cranor et al. |
| 2003/0115562 A1 | 6/2003 | Martin |
| 2003/0120472 A1 | 6/2003 | Lind |
| 2003/0120701 A1 | 6/2003 | Pulsipher et al. |
| 2003/0120704 A1 | 6/2003 | Tran et al. |
| 2003/0120710 A1 | 6/2003 | Pulsipher et al. |
| 2003/0120780 A1 | 6/2003 | Zhu |
| 2003/0126013 A1 | 7/2003 | Shand |
| 2003/0126200 A1 | 7/2003 | Wolff |
| 2003/0126202 A1 | 7/2003 | Watt |
| 2003/0126265 A1 | 7/2003 | Aziz et al. |
| 2003/0126283 A1 | 7/2003 | Prakash et al. |
| 2003/0131043 A1 | 7/2003 | Berg et al. |
| 2003/0131209 A1 | 7/2003 | Lee |
| 2003/0135509 A1 | 7/2003 | Davis |
| 2003/0135615 A1 | 7/2003 | Wyatt |
| 2003/0135621 A1 | 7/2003 | Romagnoli |
| 2003/0140190 A1 | 7/2003 | Mahony et al. |
| 2003/0144894 A1 | 7/2003 | Robertson et al. |
| 2003/0149685 A1 | 8/2003 | Trossman et al. |
| 2003/0154112 A1 | 8/2003 | Neiman et al. |
| 2003/0158884 A1 | 8/2003 | Alford |
| 2003/0158940 A1 | 8/2003 | Leigh |
| 2003/0159083 A1 | 8/2003 | Fukuhara et al. |
| 2003/0169269 A1 | 9/2003 | Sasaki et al. |
| 2003/0172191 A1 | 9/2003 | Williams |
| 2003/0177050 A1 | 9/2003 | Crampton |
| 2003/0177121 A1 | 9/2003 | Moona et al. |
| 2003/0177334 A1 | 9/2003 | King et al. |
| 2003/0182421 A1 | 9/2003 | Faybishenko et al. |
| 2003/0182425 A1 | 9/2003 | Kurakake |
| 2003/0182429 A1 | 9/2003 | Jagels |
| 2003/0185229 A1 | 10/2003 | Shachar et al. |
| 2003/0187907 A1 | 10/2003 | Ito |
| 2003/0188083 A1 | 10/2003 | Kumar et al. |
| 2003/0191795 A1 | 10/2003 | Bernardin et al. |
| 2003/0191857 A1 | 10/2003 | Terrell et al. |
| 2003/0193402 A1 | 10/2003 | Post et al. |
| 2003/0195931 A1 | 10/2003 | Dauger |
| 2003/0200109 A1 | 10/2003 | Honda et al. |
| 2003/0200258 A1 | 10/2003 | Hayashi |
| 2003/0202520 A1 | 10/2003 | Witkowski et al. |
| 2003/0202709 A1 | 10/2003 | Simard et al. |
| 2003/0204773 A1 | 10/2003 | Petersen et al. |
| 2003/0204786 A1 | 10/2003 | Dinker |
| 2003/0210694 A1 | 11/2003 | Jayaraman et al. |

(56) References Cited

U.S. PATENT DOCUMENTS

| | | |
|---|---|---|
| 2003/0212738 A1 | 11/2003 | Wookey et al. |
| 2003/0212792 A1 | 11/2003 | Raymond |
| 2003/0216951 A1 | 11/2003 | Ginis et al. |
| 2003/0217129 A1 | 11/2003 | Knittel et al. |
| 2003/0227934 A1 | 12/2003 | White |
| 2003/0231624 A1 | 12/2003 | Alappat et al. |
| 2003/0231647 A1 | 12/2003 | Petrovykh |
| 2003/0233378 A1 | 12/2003 | Butler et al. |
| 2003/0233446 A1 | 12/2003 | Earl |
| 2003/0236745 A1 | 12/2003 | Hartsell et al. |
| 2004/0003077 A1 | 1/2004 | Bantz et al. |
| 2004/0003086 A1 | 1/2004 | Parham et al. |
| 2004/0009751 A1 | 1/2004 | Michaelis |
| 2004/0010544 A1 | 1/2004 | Slater et al. |
| 2004/0010550 A1 | 1/2004 | Gopinath |
| 2004/0010592 A1 | 1/2004 | Carver et al. |
| 2004/0013113 A1 | 1/2004 | Singh et al. |
| 2004/0015579 A1 | 1/2004 | Cooper et al. |
| 2004/0015973 A1 | 1/2004 | Skovira |
| 2004/0017806 A1 | 1/2004 | Yazdy et al. |
| 2004/0017808 A1 | 1/2004 | Forbes et al. |
| 2004/0030741 A1 | 2/2004 | Wolton et al. |
| 2004/0030743 A1 | 2/2004 | Hugly et al. |
| 2004/0030794 A1 | 2/2004 | Hugly et al. |
| 2004/0030938 A1 | 2/2004 | Barr et al. |
| 2004/0034873 A1 | 2/2004 | Zenoni |
| 2004/0039815 A1 | 2/2004 | Evans et al. |
| 2004/0044718 A1 | 3/2004 | Ferstl et al. |
| 2004/0044727 A1 | 3/2004 | Abdelaziz et al. |
| 2004/0054630 A1 | 3/2004 | Ginter et al. |
| 2004/0054777 A1 | 3/2004 | Ackaouy et al. |
| 2004/0054780 A1 | 3/2004 | Romero |
| 2004/0054807 A1 | 3/2004 | Harvey et al. |
| 2004/0064511 A1 | 4/2004 | Abdel-Aziz et al. |
| 2004/0064512 A1 | 4/2004 | Arora et al. |
| 2004/0064568 A1 | 4/2004 | Arora et al. |
| 2004/0064817 A1 | 4/2004 | Shibayama et al. |
| 2004/0066782 A1 | 4/2004 | Nassar |
| 2004/0068676 A1 | 4/2004 | Larson et al. |
| 2004/0068730 A1 | 4/2004 | Miller et al. |
| 2004/0071147 A1 | 4/2004 | Roadknight et al. |
| 2004/0073650 A1 | 4/2004 | Nakamura |
| 2004/0073854 A1 | 4/2004 | Windl |
| 2004/0073908 A1 | 4/2004 | Benejam et al. |
| 2004/0081148 A1 | 4/2004 | Yamada |
| 2004/0083287 A1 | 4/2004 | Gao et al. |
| 2004/0088347 A1 | 5/2004 | Yeager et al. |
| 2004/0088348 A1 | 5/2004 | Yeager et al. |
| 2004/0088369 A1 | 5/2004 | Yeager et al. |
| 2004/0098391 A1 | 5/2004 | Robertson et al. |
| 2004/0098447 A1 | 5/2004 | Verbeke et al. |
| 2004/0103078 A1 | 5/2004 | Smedberg et al. |
| 2004/0103305 A1 | 5/2004 | Ginter et al. |
| 2004/0103339 A1 | 5/2004 | Chalasani et al. |
| 2004/0103413 A1 | 5/2004 | Mandava et al. |
| 2004/0011761 A1 | 6/2004 | Hensley |
| 2004/0107123 A1 | 6/2004 | Haffner |
| 2004/0107273 A1 | 6/2004 | Biran et al. |
| 2004/0107281 A1 | 6/2004 | Bose et al. |
| 2004/0109428 A1 | 6/2004 | Krishnamurthy |
| 2004/0111307 A1 | 6/2004 | Demsky et al. |
| 2004/0111612 A1 | 6/2004 | Choi et al. |
| 2004/0117610 A1 | 6/2004 | Hensley |
| 2004/0117768 A1 | 6/2004 | Chang et al. |
| 2004/0121777 A1 | 6/2004 | Schwarz et al. |
| 2004/0122970 A1 | 6/2004 | Kawaguchi et al. |
| 2004/0128495 A1 | 7/2004 | Hensley |
| 2004/0128670 A1 | 7/2004 | Robinson et al. |
| 2004/0133620 A1 | 7/2004 | Habelha |
| 2004/0133640 A1 | 7/2004 | Yeager et al. |
| 2004/0133665 A1 | 7/2004 | Deboer et al. |
| 2004/0133703 A1 | 7/2004 | Habetha |
| 2004/0135780 A1 | 7/2004 | Nims |
| 2004/0139202 A1 | 7/2004 | Talwar et al. |
| 2004/0139464 A1 | 7/2004 | Ellis et al. |
| 2004/0141521 A1 | 7/2004 | George |
| 2004/0143664 A1 | 7/2004 | Usa et al. |
| 2004/0148326 A1 | 7/2004 | Nadgir |
| 2004/0148390 A1 | 7/2004 | Cleary et al. |
| 2004/0150664 A1 | 8/2004 | Baudisch |
| 2004/0151181 A1 | 8/2004 | Chu |
| 2004/0153563 A1 | 8/2004 | Shay et al. |
| 2004/0158637 A1 | 8/2004 | Lee |
| 2004/0162871 A1 | 8/2004 | Pabla et al. |
| 2004/0165588 A1 | 8/2004 | Pandya |
| 2004/0172464 A1 | 9/2004 | Nag |
| 2004/0179528 A1 | 9/2004 | Powers et al. |
| 2004/0181370 A1 | 9/2004 | Froehlich et al. |
| 2004/0181476 A1 | 9/2004 | Smith et al. |
| 2004/0189677 A1 | 9/2004 | Amann et al. |
| 2004/0193674 A1 | 9/2004 | Kurosawa et al. |
| 2004/0194098 A1 | 9/2004 | Chung et al. |
| 2004/0196308 A1 | 10/2004 | Blomquist |
| 2004/0199566 A1 | 10/2004 | Carlson |
| 2004/0199621 A1 | 10/2004 | Lau |
| 2004/0199646 A1 | 10/2004 | Susai et al. |
| 2004/0199918 A1 | 10/2004 | Skovira |
| 2004/0203670 A1 | 10/2004 | King et al. |
| 2004/0204978 A1 | 10/2004 | Rayrole |
| 2004/0205101 A1 | 10/2004 | Radhakrishnan |
| 2004/0205206 A1 | 10/2004 | Naik et al. |
| 2004/0210624 A1 | 10/2004 | Andrzejak et al. |
| 2004/0210632 A1 | 10/2004 | Carlson |
| 2004/0210693 A1 | 10/2004 | Zeitler et al. |
| 2004/0213395 A1 | 10/2004 | Ishii et al. |
| 2004/0215780 A1 | 10/2004 | Kawato |
| 2004/0215864 A1 | 10/2004 | Arimilli et al. |
| 2004/0215991 A1 | 10/2004 | McAfee et al. |
| 2004/0216121 A1 | 10/2004 | Jones et al. |
| 2004/0218615 A1 | 11/2004 | Griffin et al. |
| 2004/0221038 A1 | 11/2004 | Clarke et al. |
| 2004/0236852 A1 | 11/2004 | Birkestrand et al. |
| 2004/0243378 A1 | 12/2004 | Schnatterly et al. |
| 2004/0243466 A1 | 12/2004 | Trybinski et al. |
| 2004/0244006 A1 | 12/2004 | Kaufman et al. |
| 2004/0260701 A1 | 12/2004 | Lehikoinen |
| 2004/0260746 A1 | 12/2004 | Brown et al. |
| 2004/0267486 A1 | 12/2004 | Percer et al. |
| 2004/0267897 A1 | 12/2004 | Hill et al. |
| 2004/0267901 A1 | 12/2004 | Gomez |
| 2004/0268035 A1 | 12/2004 | Ueno |
| 2004/0268315 A1 | 12/2004 | Gouriou |
| 2005/0010465 A1 | 1/2005 | Drew et al. |
| 2005/0010608 A1 | 1/2005 | Horikawa |
| 2005/0015378 A1 | 1/2005 | Gammel et al. |
| 2005/0015621 A1 | 1/2005 | Ashley et al. |
| 2005/0018604 A1 | 1/2005 | Dropps et al. |
| 2005/0018606 A1 | 1/2005 | Dropps et al. |
| 2005/0018663 A1 | 1/2005 | Dropps et al. |
| 2005/0021291 A1 | 1/2005 | Retich |
| 2005/0021371 A1 | 1/2005 | Basone et al. |
| 2005/0021606 A1 | 1/2005 | Davies et al. |
| 2005/0021728 A1 | 1/2005 | Sugimoto |
| 2005/0021759 A1 | 1/2005 | Gupta et al. |
| 2005/0021862 A1 | 1/2005 | Schroeder et al. |
| 2005/0022188 A1 | 1/2005 | Tameshige et al. |
| 2005/0027863 A1 | 2/2005 | Talwar et al. |
| 2005/0027864 A1 | 2/2005 | Bozak et al. |
| 2005/0027865 A1 | 2/2005 | Bozak et al. |
| 2005/0027870 A1 | 2/2005 | Trebes et al. |
| 2005/0030954 A1 | 2/2005 | Dropps et al. |
| 2005/0033742 A1 | 2/2005 | Kamvar et al. |
| 2005/0033890 A1 | 2/2005 | Lee |
| 2005/0034070 A1 | 2/2005 | Meir et al. |
| 2005/0038808 A1 | 2/2005 | Kutch |
| 2005/0038835 A1 | 2/2005 | Chidambaran et al. |
| 2005/0044195 A1 | 2/2005 | Westfall |
| 2005/0044205 A1 | 2/2005 | Sankaranarayan et al. |
| 2005/0044226 A1 | 2/2005 | McDermott et al. |
| 2005/0044228 A1 | 2/2005 | Birkestrand et al. |
| 2005/0049884 A1 | 3/2005 | Hunt et al. |
| 2005/0050057 A1 | 3/2005 | Mital et al. |
| 2005/0050200 A1 | 3/2005 | Mizoguchi |
| 2005/0050270 A1 | 3/2005 | Horn et al. |

(56) References Cited

U.S. PATENT DOCUMENTS

| | | |
|---|---|---|
| 2005/0054354 A1 | 3/2005 | Roman et al. |
| 2005/0055322 A1 | 3/2005 | Masters et al. |
| 2005/0055694 A1 | 3/2005 | Lee |
| 2005/0055697 A1 | 3/2005 | Buco |
| 2005/0055698 A1 | 3/2005 | Sasaki et al. |
| 2005/0060360 A1 | 3/2005 | Doyle et al. |
| 2005/0060608 A1 | 3/2005 | Marchand |
| 2005/0065826 A1 | 3/2005 | Baker et al. |
| 2005/0066302 A1 | 3/2005 | Kanade |
| 2005/0066358 A1 | 3/2005 | Anderson et al. |
| 2005/0071843 A1 | 3/2005 | Guo et al. |
| 2005/0076145 A1 | 4/2005 | Ben-Zvi et al. |
| 2005/0077921 A1 | 4/2005 | Percer et al. |
| 2005/0080845 A1 | 4/2005 | Gopinath |
| 2005/0080891 A1 | 4/2005 | Cauthron |
| 2005/0080930 A1 | 4/2005 | Joseph |
| 2005/0086300 A1 | 4/2005 | Yeager et al. |
| 2005/0091505 A1 | 4/2005 | Riley et al. |
| 2005/0097560 A1 | 5/2005 | Rolia et al. |
| 2005/0102396 A1 | 5/2005 | Hipp |
| 2005/0102400 A1 | 5/2005 | Nakahara |
| 2005/0102683 A1 | 5/2005 | Branson |
| 2005/0105538 A1 | 5/2005 | Perera et al. |
| 2005/0108407 A1 | 5/2005 | Johnson et al. |
| 2005/0108703 A1 | 5/2005 | Hellier |
| 2005/0113203 A1 | 5/2005 | Mueller et al. |
| 2005/0114478 A1 | 5/2005 | Popescu et al. |
| 2005/0114551 A1 | 5/2005 | Basu et al. |
| 2005/0114862 A1 | 5/2005 | Bisdikian et al. |
| 2005/0120160 A1 | 6/2005 | Plouffe et al. |
| 2005/0125213 A1 | 6/2005 | Chen et al. |
| 2005/0125537 A1 | 6/2005 | Martins et al. |
| 2005/0125538 A1 | 6/2005 | Tawil |
| 2005/0131898 A1 | 6/2005 | Fatula, Jr. |
| 2005/0132378 A1 | 6/2005 | Horvitz et al. |
| 2005/0132379 A1 | 6/2005 | Sankaran et al. |
| 2005/0138618 A1 | 6/2005 | Gebhart |
| 2005/0141424 A1 | 6/2005 | Lim et al. |
| 2005/0144315 A1 | 6/2005 | George et al. |
| 2005/0149940 A1 | 7/2005 | Calinescu et al. |
| 2005/0154861 A1 | 7/2005 | Arimilli et al. |
| 2005/0155033 A1 | 7/2005 | Luoffo et al. |
| 2005/0156732 A1 | 7/2005 | Matsumura |
| 2005/0160137 A1 | 7/2005 | Ishikawa et al. |
| 2005/0163143 A1 | 7/2005 | Kalantar et al. |
| 2005/0165925 A1 | 7/2005 | Dan et al. |
| 2005/0169179 A1 | 8/2005 | Antal |
| 2005/0172291 A1 | 8/2005 | Das et al. |
| 2005/0177600 A1 | 8/2005 | Eilam et al. |
| 2005/0187866 A1 | 8/2005 | Lee |
| 2005/0188088 A1 | 8/2005 | Fellenstein et al. |
| 2005/0188089 A1 | 8/2005 | Lichtenstein et al. |
| 2005/0188091 A1 | 8/2005 | Szabo et al. |
| 2005/0190236 A1 | 9/2005 | Ishimoto |
| 2005/0192771 A1 | 9/2005 | Fischer et al. |
| 2005/0193103 A1 | 9/2005 | Drabik |
| 2005/0193231 A1 | 9/2005 | Scheuren |
| 2005/0195075 A1 | 9/2005 | McGraw |
| 2005/0197877 A1 | 9/2005 | Kalinoski |
| 2005/0198200 A1 | 9/2005 | Subramanian et al. |
| 2005/0202922 A1 | 9/2005 | Thomas |
| 2005/0203761 A1 | 9/2005 | Barr |
| 2005/0204040 A1 | 9/2005 | Ferri et al. |
| 2005/0209892 A1 | 9/2005 | Miller |
| 2005/0210470 A1 | 9/2005 | Chung et al. |
| 2005/0213507 A1 | 9/2005 | Banerjee et al. |
| 2005/0213560 A1 | 9/2005 | Duvvury |
| 2005/0222885 A1 | 10/2005 | Chen et al. |
| 2005/0228852 A1 | 10/2005 | Santos et al. |
| 2005/0228856 A1 | 10/2005 | Swildens |
| 2005/0228892 A1 | 10/2005 | Riley et al. |
| 2005/0234846 A1 | 10/2005 | Davidson et al. |
| 2005/0235137 A1 | 10/2005 | Barr et al. |
| 2005/0235150 A1 | 10/2005 | Kaler et al. |
| 2005/0240688 A1 | 10/2005 | Moerman et al. |
| 2005/0243867 A1 | 11/2005 | Petite |
| 2005/0246705 A1 | 11/2005 | Etelson et al. |
| 2005/0249341 A1 | 11/2005 | Mahone et al. |
| 2005/0256942 A1 | 11/2005 | McCardle et al. |
| 2005/0256946 A1 | 11/2005 | Childress et al. |
| 2005/0259397 A1 | 11/2005 | Bash et al. |
| 2005/0259683 A1 | 11/2005 | Bishop et al. |
| 2005/0262495 A1 | 11/2005 | Fung et al. |
| 2005/0262508 A1 | 11/2005 | Asano et al. |
| 2005/0267948 A1 | 12/2005 | Mckinley et al. |
| 2005/0268063 A1 | 12/2005 | Diao et al. |
| 2005/0278392 A1 | 12/2005 | Hansen et al. |
| 2005/0278760 A1 | 12/2005 | Dewar et al. |
| 2005/0283534 A1 | 12/2005 | Bigagli et al. |
| 2005/0283782 A1 | 12/2005 | Lu et al. |
| 2005/0283822 A1 | 12/2005 | Appleby et al. |
| 2005/0288961 A1 | 12/2005 | Tabrizi |
| 2005/0289540 A1 | 12/2005 | Nguyen et al. |
| 2006/0002311 A1 | 1/2006 | Iwanaga et al. |
| 2006/0008256 A1 | 1/2006 | Khedouri et al. |
| 2006/0010445 A1 | 1/2006 | Petersen et al. |
| 2006/0013132 A1 | 1/2006 | Garnett et al. |
| 2006/0013218 A1 | 1/2006 | Shore et al. |
| 2006/0015555 A1 | 1/2006 | Douglass et al. |
| 2006/0015637 A1 | 1/2006 | Chung |
| 2006/0015773 A1 | 1/2006 | Singh et al. |
| 2006/0023245 A1 | 2/2006 | Sato et al. |
| 2006/0028991 A1 | 2/2006 | Tan et al. |
| 2006/0029053 A1 | 2/2006 | Roberts et al. |
| 2006/0031379 A1 | 2/2006 | Kasriel et al. |
| 2006/0031547 A1 | 2/2006 | Tsui et al. |
| 2006/0031813 A1 | 2/2006 | Bishop et al. |
| 2006/0036743 A1 | 2/2006 | Deng et al. |
| 2006/0037016 A1 | 2/2006 | Saha et al. |
| 2006/0039246 A1 | 2/2006 | King et al. |
| 2006/0041444 A1 | 2/2006 | Flores et al. |
| 2006/0047920 A1 | 3/2006 | Moore et al. |
| 2006/0048157 A1 | 3/2006 | Dawson et al. |
| 2006/0053215 A1 | 3/2006 | Sharma |
| 2006/0053216 A1 | 3/2006 | Deokar et al. |
| 2006/0056291 A1 | 3/2006 | Baker et al. |
| 2006/0059253 A1 | 3/2006 | Goodman et al. |
| 2006/0063690 A1 | 3/2006 | Billiauw et al. |
| 2006/0069671 A1 | 3/2006 | Conley et al. |
| 2006/0069774 A1 | 3/2006 | Chen et al. |
| 2006/0069926 A1 | 3/2006 | Ginter et al. |
| 2006/0074925 A1 | 4/2006 | Bixby |
| 2006/0074940 A1 | 4/2006 | Craft et al. |
| 2006/0088015 A1 | 4/2006 | Kakivaya et al. |
| 2006/0089894 A1 | 4/2006 | Balk et al. |
| 2006/0090003 A1 | 4/2006 | Kakivaya et al. |
| 2006/0090025 A1 | 4/2006 | Tufford et al. |
| 2006/0090136 A1 | 4/2006 | Miller et al. |
| 2006/0095917 A1 | 5/2006 | Black-Ziegelbein et al. |
| 2006/0097863 A1 | 5/2006 | Horowitz et al. |
| 2006/0112184 A1 | 5/2006 | Kuo |
| 2006/0112308 A1 | 5/2006 | Crawford |
| 2006/0117208 A1 | 6/2006 | Davidson |
| 2006/0117317 A1 | 6/2006 | Crawford et al. |
| 2006/0120411 A1 | 6/2006 | Basu |
| 2006/0126619 A1 | 6/2006 | Teisberg et al. |
| 2006/0126667 A1 | 6/2006 | Smith et al. |
| 2006/0129667 A1 | 6/2006 | Anderson |
| 2006/0129687 A1 | 6/2006 | Goldszmidt et al. |
| 2006/0136235 A1 | 6/2006 | Keohane et al. |
| 2006/0136570 A1 | 6/2006 | Pandya |
| 2006/0136908 A1 | 6/2006 | Gebhart et al. |
| 2006/0136928 A1 | 6/2006 | Crawford et al. |
| 2006/0136929 A1 | 6/2006 | Miller et al. |
| 2006/0140211 A1 | 6/2006 | Huang et al. |
| 2006/0143350 A1 | 6/2006 | Miloushev et al. |
| 2006/0149695 A1 | 7/2006 | Bossman et al. |
| 2006/0153191 A1 | 7/2006 | Rajsic et al. |
| 2006/0155740 A1 | 7/2006 | Chen et al. |
| 2006/0155912 A1 | 7/2006 | Singh et al. |
| 2006/0156273 A1 | 7/2006 | Narayan et al. |
| 2006/0159088 A1 | 7/2006 | Aghvami et al. |
| 2006/0161466 A1 | 7/2006 | Trinon et al. |
| 2006/0161585 A1 | 7/2006 | Clarke et al. |

(56) References Cited

U.S. PATENT DOCUMENTS

| | | |
|---|---|---|
| 2006/0165040 A1 | 7/2006 | Rathod |
| 2006/0168107 A1 | 7/2006 | Balan et al. |
| 2006/0168224 A1 | 7/2006 | Midgley |
| 2006/0173730 A1 | 8/2006 | Birkestrand |
| 2006/0174342 A1 | 8/2006 | Zaheer et al. |
| 2006/0179241 A1 | 8/2006 | Clark et al. |
| 2006/0189349 A1 | 8/2006 | Montulli et al. |
| 2006/0190775 A1 | 8/2006 | Aggarwal et al. |
| 2006/0190975 A1 | 8/2006 | Gonzalez |
| 2006/0200773 A1 | 9/2006 | Nocera et al. |
| 2006/0206621 A1 | 9/2006 | Toebes |
| 2006/0208870 A1 | 9/2006 | Dousson |
| 2006/0212332 A1 | 9/2006 | Jackson |
| 2006/0212333 A1 | 9/2006 | Jackson |
| 2006/0212334 A1 | 9/2006 | Jackson |
| 2006/0212740 A1 | 9/2006 | Jackson |
| 2006/0218301 A1 | 9/2006 | O'Toole et al. |
| 2006/0224725 A1 | 10/2006 | Bali et al. |
| 2006/0224740 A1 | 10/2006 | Sievers-Tostes |
| 2006/0224741 A1 | 10/2006 | Jackson |
| 2006/0227810 A1 | 10/2006 | Childress et al. |
| 2006/0229920 A1 | 10/2006 | Favorel et al. |
| 2006/0230140 A1 | 10/2006 | Aoyama et al. |
| 2006/0230149 A1 | 10/2006 | Jackson |
| 2006/0236368 A1 | 10/2006 | Raja et al. |
| 2006/0236371 A1 | 10/2006 | Fish |
| 2006/0248141 A1 | 11/2006 | Mukherjee |
| 2006/0248197 A1 | 11/2006 | Evans et al. |
| 2006/0248359 A1 | 11/2006 | Fung |
| 2006/0250971 A1 | 11/2006 | Gammenthaler et al. |
| 2006/0251419 A1 | 11/2006 | Zadikian et al. |
| 2006/0253570 A1 | 11/2006 | Biswas et al. |
| 2006/0259734 A1 | 11/2006 | Sheu et al. |
| 2006/0265508 A1 | 11/2006 | Angel et al. |
| 2006/0265609 A1 | 11/2006 | Fung |
| 2006/0268742 A1 | 11/2006 | Chu |
| 2006/0271552 A1 | 11/2006 | McChesney et al. |
| 2006/0271928 A1 | 11/2006 | Gao et al. |
| 2006/0277278 A1 | 12/2006 | Hegde |
| 2006/0282505 A1 | 12/2006 | Hasha et al. |
| 2006/0282547 A1 | 12/2006 | Hasha et al. |
| 2006/0294238 A1 | 12/2006 | Naik et al. |
| 2007/0003051 A1 | 1/2007 | Kiss et al. |
| 2007/0006001 A1 | 1/2007 | Isobe et al. |
| 2007/0011224 A1 | 1/2007 | Mena et al. |
| 2007/0011302 A1 | 1/2007 | Groner et al. |
| 2007/0022425 A1 | 1/2007 | Jackson |
| 2007/0028244 A1 | 2/2007 | Landis et al. |
| 2007/0033292 A1 | 2/2007 | Sull et al. |
| 2007/0033533 A1 | 2/2007 | Sull et al. |
| 2007/0041335 A1 | 2/2007 | Znamova et al. |
| 2007/0043591 A1 | 2/2007 | Meretei |
| 2007/0044010 A1 | 2/2007 | Sull et al. |
| 2007/0047195 A1 | 3/2007 | Merkin et al. |
| 2007/0050777 A1 | 3/2007 | Hutchinson et al. |
| 2007/0061441 A1 | 3/2007 | Landis et al. |
| 2007/0067366 A1 | 3/2007 | Landis |
| 2007/0067435 A1 | 3/2007 | Landis et al. |
| 2007/0076653 A1 | 4/2007 | Park et al. |
| 2007/0081315 A1 | 4/2007 | Mondor et al. |
| 2007/0083899 A1 | 4/2007 | Compton et al. |
| 2007/0088822 A1 | 4/2007 | Coile et al. |
| 2007/0094486 A1 | 4/2007 | Moore et al. |
| 2007/0094665 A1 | 4/2007 | Jackson |
| 2007/0094691 A1 | 4/2007 | Gazdzinski |
| 2007/0109968 A1 | 5/2007 | Hussain et al. |
| 2007/0118496 A1 | 5/2007 | Bornhoevd |
| 2007/0124344 A1 | 5/2007 | Rajakannimariyan et al. |
| 2007/0130397 A1 | 6/2007 | Tsu |
| 2007/0143824 A1 | 6/2007 | Shahbazi |
| 2007/0150426 A1 | 6/2007 | Asher et al. |
| 2007/0150444 A1 | 6/2007 | Chesnais et al. |
| 2007/0155406 A1 | 7/2007 | Dowling et al. |
| 2007/0174390 A1 | 7/2007 | Silvain et al. |
| 2007/0180310 A1 | 8/2007 | Johnson et al. |
| 2007/0180380 A1 | 8/2007 | Khavari et al. |
| 2007/0204036 A1 | 8/2007 | Mohaban et al. |
| 2007/0209072 A1 | 9/2007 | Chen |
| 2007/0220520 A1 | 9/2007 | Tajima |
| 2007/0226313 A1 | 9/2007 | Li et al. |
| 2007/0226795 A1 | 9/2007 | Conti et al. |
| 2007/0233828 A1 | 10/2007 | Gilbert et al. |
| 2007/0240162 A1 | 10/2007 | Coleman et al. |
| 2007/0253017 A1 | 11/2007 | Czyszczewski et al. |
| 2007/0260716 A1 | 11/2007 | Gnanasambandam et al. |
| 2007/0264986 A1 | 11/2007 | Warrillow et al. |
| 2007/0266136 A1 | 11/2007 | Esfahany et al. |
| 2007/0271375 A1 | 11/2007 | Hwang |
| 2007/0280230 A1 | 12/2007 | Park |
| 2007/0286009 A1 | 12/2007 | Norman |
| 2007/0288585 A1 | 12/2007 | Sekiguchi et al. |
| 2007/0297350 A1 | 12/2007 | Eilam et al. |
| 2007/0299946 A1 | 12/2007 | El-Damhougy et al. |
| 2007/0299947 A1 | 12/2007 | El-Damhougy et al. |
| 2007/0299950 A1 | 12/2007 | Kulkarni et al. |
| 2008/0013453 A1 | 1/2008 | Chiang et al. |
| 2008/0016198 A1 | 1/2008 | Johnston-Watt et al. |
| 2008/0034082 A1 | 2/2008 | McKinney |
| 2008/0040463 A1 | 2/2008 | Brown et al. |
| 2008/0052437 A1 | 2/2008 | Loffink et al. |
| 2008/0059782 A1 | 3/2008 | Kruse et al. |
| 2008/0075089 A1 | 3/2008 | Evans et al. |
| 2008/0082663 A1 | 4/2008 | Mouli et al. |
| 2008/0089358 A1 | 4/2008 | Basso et al. |
| 2008/0104231 A1 | 5/2008 | Dey et al. |
| 2008/0104264 A1 | 5/2008 | Duerk et al. |
| 2008/0126523 A1 | 5/2008 | Tantrum |
| 2008/0140771 A1 | 6/2008 | Vass et al. |
| 2008/0140930 A1 | 6/2008 | Hotchkiss |
| 2008/0155070 A1 | 6/2008 | El-Damhougy et al. |
| 2008/0155100 A1 | 6/2008 | Ahmed et al. |
| 2008/0159745 A1 | 7/2008 | Segal |
| 2008/0162691 A1 | 7/2008 | Zhang et al. |
| 2008/0168451 A1 | 7/2008 | Challenger et al. |
| 2008/0183865 A1 | 7/2008 | Appleby et al. |
| 2008/0183882 A1 | 7/2008 | Flynn et al. |
| 2008/0184248 A1 | 7/2008 | Barua et al. |
| 2008/0186965 A1 | 8/2008 | Zheng et al. |
| 2008/0199133 A1 | 8/2008 | Takizawa et al. |
| 2008/0212273 A1 | 9/2008 | Bechtolsheim |
| 2008/0212276 A1 | 9/2008 | Bottom et al. |
| 2008/0215730 A1 | 9/2008 | Sundaram et al. |
| 2008/0216082 A1 | 9/2008 | Eilam et al. |
| 2008/0217021 A1 | 9/2008 | Lembcke et al. |
| 2008/0222434 A1 | 9/2008 | Shimizu et al. |
| 2008/0235443 A1 | 9/2008 | Chow et al. |
| 2008/0235702 A1 | 9/2008 | Eilam et al. |
| 2008/0239649 A1 | 10/2008 | Bradicich |
| 2008/0243634 A1 | 10/2008 | Dworkin et al. |
| 2008/0250181 A1 | 10/2008 | Li et al. |
| 2008/0255953 A1 | 10/2008 | Chang et al. |
| 2008/0259555 A1 | 10/2008 | Bechtolsheim et al. |
| 2008/0259788 A1 | 10/2008 | Wang et al. |
| 2008/0263131 A1 | 10/2008 | Hinni et al. |
| 2008/0263558 A1 | 10/2008 | Lin et al. |
| 2008/0266793 A1 | 10/2008 | Lee |
| 2008/0270599 A1 | 10/2008 | Tamir et al. |
| 2008/0270731 A1 | 10/2008 | Bryant et al. |
| 2008/0279167 A1 | 11/2008 | Cardei et al. |
| 2008/0288646 A1 | 11/2008 | Hasha et al. |
| 2008/0288659 A1 | 11/2008 | Hasha et al. |
| 2008/0288660 A1 | 11/2008 | Balasubramanian et al. |
| 2008/0288664 A1 | 11/2008 | Pettey et al. |
| 2008/0288683 A1 | 11/2008 | Ramey |
| 2008/0288873 A1 | 11/2008 | McCardle et al. |
| 2008/0289029 A1 | 11/2008 | Kim et al. |
| 2008/0301226 A1 | 12/2008 | Cleary et al. |
| 2008/0301379 A1* | 12/2008 | Pong ............... G06F 12/0284 |
| | | 711/E12.078 |
| 2008/0301794 A1 | 12/2008 | Lee |
| 2008/0310848 A1 | 12/2008 | Yasuda et al. |
| 2008/0313369 A1 | 12/2008 | Verdoorn et al. |
| 2008/0313482 A1 | 12/2008 | Karlapalem et al. |
| 2008/0320121 A1 | 12/2008 | Altaf et al. |

(56) References Cited

U.S. PATENT DOCUMENTS

| | | |
|---|---|---|
| 2008/0320161 A1 | 12/2008 | Maruccia et al. |
| 2009/0010153 A1 | 1/2009 | Filsfils et al. |
| 2009/0021907 A1 | 1/2009 | Mann et al. |
| 2009/0043809 A1 | 2/2009 | Fakhouri et al. |
| 2009/0043888 A1 | 2/2009 | Jackson |
| 2009/0044036 A1 | 2/2009 | Merkin |
| 2009/0049443 A1 | 2/2009 | Powers et al. |
| 2009/0055542 A1 | 2/2009 | Zhoa et al. |
| 2009/0055691 A1 | 2/2009 | Ouksel et al. |
| 2009/0063443 A1 | 3/2009 | Arimilli et al. |
| 2009/0063690 A1 | 3/2009 | Verthein et al. |
| 2009/0064287 A1 | 3/2009 | Bagepalli et al. |
| 2009/0070771 A1 | 3/2009 | Yuyitung et al. |
| 2009/0080428 A1 | 3/2009 | Witkowski et al. |
| 2009/0083390 A1 | 3/2009 | Abu-Ghazaleh et al. |
| 2009/0089410 A1 | 4/2009 | Vicente et al. |
| 2009/0094380 A1 | 4/2009 | Qiu et al. |
| 2009/0097200 A1 | 4/2009 | Sharma et al. |
| 2009/0100133 A1 | 4/2009 | Giulio et al. |
| 2009/0103501 A1 | 4/2009 | Farrag et al. |
| 2009/0105059 A1 | 4/2009 | Dorry et al. |
| 2009/0113056 A1 | 4/2009 | Tameshige et al. |
| 2009/0113130 A1 | 4/2009 | He et al. |
| 2009/0133129 A1 | 5/2009 | Jeong et al. |
| 2009/0135751 A1 | 5/2009 | Hodges et al. |
| 2009/0135835 A1 | 5/2009 | Gallatin et al. |
| 2009/0138594 A1 | 5/2009 | Fellenstein et al. |
| 2009/0158070 A1 | 6/2009 | Gruendler |
| 2009/0172423 A1 | 7/2009 | Song et al. |
| 2009/0178132 A1 | 7/2009 | Hudis et al. |
| 2009/0182836 A1 | 7/2009 | Aviles |
| 2009/0187425 A1 | 7/2009 | Thompson et al. |
| 2009/0198958 A1 | 8/2009 | Arimilli et al. |
| 2009/0204834 A1 | 8/2009 | Hendin et al. |
| 2009/0204837 A1 | 8/2009 | Raval et al. |
| 2009/0210356 A1 | 8/2009 | Abrams et al. |
| 2009/0210495 A1 | 8/2009 | Wolfson et al. |
| 2009/0216881 A1 | 8/2009 | Lovy et al. |
| 2009/0216910 A1 | 8/2009 | Duchesneau |
| 2009/0216920 A1 | 8/2009 | Lauterbach et al. |
| 2009/0217329 A1 | 8/2009 | Riedl et al. |
| 2009/0219827 A1 | 9/2009 | Chen et al. |
| 2009/0222884 A1 | 9/2009 | Shaji et al. |
| 2009/0225360 A1 | 9/2009 | Shirai |
| 2009/0225751 A1 | 9/2009 | Koenck et al. |
| 2009/0234917 A1 | 9/2009 | Despotovic et al. |
| 2009/0234962 A1 | 9/2009 | Strong et al. |
| 2009/0234974 A1 | 9/2009 | Arndt et al. |
| 2009/0235104 A1 | 9/2009 | Fung |
| 2009/0238349 A1 | 9/2009 | Pezzutti |
| 2009/0240547 A1 | 9/2009 | Fellenstein et al. |
| 2009/0248943 A1 | 10/2009 | Jiang et al. |
| 2009/0251867 A1 | 10/2009 | Sharma |
| 2009/0259606 A1 | 10/2009 | Seah et al. |
| 2009/0259863 A1 | 10/2009 | Williams et al. |
| 2009/0259864 A1 | 10/2009 | Li et al. |
| 2009/0265045 A1 | 10/2009 | Coxe, III |
| 2009/0271656 A1 | 10/2009 | Yokota et al. |
| 2009/0276666 A1 | 11/2009 | Haley et al. |
| 2009/0279518 A1 | 11/2009 | Falk et al. |
| 2009/0282274 A1 | 11/2009 | Langgood et al. |
| 2009/0282419 A1 | 11/2009 | Mejdrich et al. |
| 2009/0285136 A1 | 11/2009 | Sun et al. |
| 2009/0287835 A1 | 11/2009 | Jacobson et al. |
| 2009/0292824 A1 | 11/2009 | Marashi et al. |
| 2009/0300608 A1 | 12/2009 | Ferris et al. |
| 2009/0313390 A1 | 12/2009 | Ahuja et al. |
| 2009/0316687 A1 | 12/2009 | Kruppa et al. |
| 2009/0319684 A1 | 12/2009 | Kakivaya et al. |
| 2009/0327079 A1 | 12/2009 | Parker et al. |
| 2009/0327489 A1 | 12/2009 | Swildens et al. |
| 2010/0005331 A1 | 1/2010 | Somasundaram et al. |
| 2010/0008038 A1 | 1/2010 | Coglitore |
| 2010/0008365 A1 | 1/2010 | Porat |
| 2010/0026408 A1 | 2/2010 | Shau |
| 2010/0036945 A1 | 2/2010 | Allibhoy et al. |
| 2010/0040053 A1 | 2/2010 | Gottumukkula et al. |
| 2010/0049822 A1 | 2/2010 | Davies et al. |
| 2010/0049931 A1 | 2/2010 | Jacobson et al. |
| 2010/0051391 A1 | 3/2010 | Jahkonen |
| 2010/0070675 A1* | 3/2010 | Yamazaki ............ H04L 49/25 710/316 |
| 2010/0088205 A1 | 4/2010 | Robertson |
| 2010/0091676 A1 | 4/2010 | Moran et al. |
| 2010/0103837 A1 | 4/2010 | Jungck et al. |
| 2010/0106987 A1 | 4/2010 | Lambert et al. |
| 2010/0114531 A1 | 5/2010 | Korn et al. |
| 2010/0118880 A1 | 5/2010 | Kunz et al. |
| 2010/0121932 A1 | 5/2010 | Joshi et al. |
| 2010/0121947 A1 | 5/2010 | Pirzada et al. |
| 2010/0122251 A1 | 5/2010 | Karc |
| 2010/0125742 A1 | 5/2010 | Ohtani |
| 2010/0125915 A1 | 5/2010 | Hall et al. |
| 2010/0131324 A1 | 5/2010 | Ferris et al. |
| 2010/0131624 A1 | 5/2010 | Ferris |
| 2010/0138481 A1 | 6/2010 | Behrens |
| 2010/0153546 A1 | 6/2010 | Clubb et al. |
| 2010/0158005 A1 | 6/2010 | Mukhopadhyay et al. |
| 2010/0161909 A1 | 6/2010 | Nation et al. |
| 2010/0165983 A1 | 7/2010 | Aybay et al. |
| 2010/0169477 A1 | 7/2010 | Stienhans et al. |
| 2010/0169479 A1 | 7/2010 | Jeong et al. |
| 2010/0169888 A1 | 7/2010 | Hare et al. |
| 2010/0174604 A1 | 7/2010 | Mattingly et al. |
| 2010/0174813 A1 | 7/2010 | Hildreth et al. |
| 2010/0198972 A1 | 8/2010 | Umbehocker |
| 2010/0198985 A1 | 8/2010 | Kanevsky |
| 2010/0217801 A1 | 8/2010 | Leighton et al. |
| 2010/0218194 A1 | 8/2010 | Dallman et al. |
| 2010/0220732 A1 | 9/2010 | Hussain et al. |
| 2010/0223332 A1 | 9/2010 | Maxemchuk et al. |
| 2010/0228848 A1 | 9/2010 | Kis et al. |
| 2010/0235234 A1 | 9/2010 | Shuster |
| 2010/0250914 A1 | 9/2010 | Abdul et al. |
| 2010/0265650 A1 | 10/2010 | Chen et al. |
| 2010/0281166 A1 | 11/2010 | Buyya et al. |
| 2010/0281246 A1 | 11/2010 | Bristow et al. |
| 2010/0299548 A1 | 11/2010 | Chadirchi et al. |
| 2010/0302129 A1 | 12/2010 | Kastrup et al. |
| 2010/0308897 A1 | 12/2010 | Evoy et al. |
| 2010/0312910 A1 | 12/2010 | Lin et al. |
| 2010/0312969 A1 | 12/2010 | Yamazaki et al. |
| 2010/0318665 A1 | 12/2010 | Demmer et al. |
| 2010/0318812 A1 | 12/2010 | Auradkar et al. |
| 2010/0325371 A1 | 12/2010 | Jagadish et al. |
| 2010/0332262 A1 | 12/2010 | Horvitz et al. |
| 2011/0023104 A1 | 1/2011 | Franklin |
| 2011/0026397 A1 | 2/2011 | Saltsidis et al. |
| 2011/0029644 A1 | 2/2011 | Gelvin et al. |
| 2011/0029652 A1 | 2/2011 | Chhuor et al. |
| 2011/0035491 A1 | 2/2011 | Gelvin et al. |
| 2011/0055627 A1 | 3/2011 | Zawacki et al. |
| 2011/0058573 A1 | 3/2011 | Balakavi et al. |
| 2011/0075369 A1 | 3/2011 | Sun et al. |
| 2011/0082928 A1 | 4/2011 | Hasha et al. |
| 2011/0090633 A1 | 4/2011 | Rabinovitz |
| 2011/0103391 A1 | 5/2011 | Davis |
| 2011/0113115 A1 | 5/2011 | Chang et al. |
| 2011/0119344 A1 | 5/2011 | Eustis |
| 2011/0123014 A1 | 5/2011 | Smith |
| 2011/0138046 A1 | 6/2011 | Bonnier et al. |
| 2011/0145393 A1 | 6/2011 | Ben-Zvi et al. |
| 2011/0153953 A1 | 6/2011 | Khemani et al. |
| 2011/0154318 A1 | 6/2011 | Oshins et al. |
| 2011/0167110 A1 | 7/2011 | Hoffberg et al. |
| 2011/0173295 A1 | 7/2011 | Bakke et al. |
| 2011/0173612 A1 | 7/2011 | El Zur et al. |
| 2011/0179134 A1 | 7/2011 | Mayo et al. |
| 2011/0185370 A1 | 7/2011 | Tamir et al. |
| 2011/0191514 A1 | 8/2011 | Wu et al. |
| 2011/0191610 A1 | 8/2011 | Agarwal et al. |
| 2011/0197012 A1 | 8/2011 | Liao et al. |
| 2011/0210975 A1 | 9/2011 | Wong et al. |
| 2011/0213869 A1 | 9/2011 | Korsunsky et al. |

(56) References Cited

U.S. PATENT DOCUMENTS

| | | |
|---|---|---|
| 2011/0231510 A1 | 9/2011 | Korsunsky et al. |
| 2011/0231564 A1 | 9/2011 | Korsunsky et al. |
| 2011/0238841 A1 | 9/2011 | Kakivaya et al. |
| 2011/0238855 A1 | 9/2011 | Korsunsky et al. |
| 2011/0239014 A1 | 9/2011 | Karnowski |
| 2011/0271159 A1 | 11/2011 | Ahn et al. |
| 2011/0273840 A1 | 11/2011 | Chen |
| 2011/0274108 A1 | 11/2011 | Fan |
| 2011/0295991 A1 | 12/2011 | Aida |
| 2011/0296141 A1 | 12/2011 | Daffron |
| 2011/0307887 A1 | 12/2011 | Huang et al. |
| 2011/0314465 A1 | 12/2011 | Smith et al. |
| 2011/0320540 A1 | 12/2011 | Oostlander et al. |
| 2011/0320690 A1 | 12/2011 | Petersen et al. |
| 2012/0011500 A1 | 1/2012 | Faraboschi et al. |
| 2012/0020207 A1 | 1/2012 | Corti et al. |
| 2012/0036237 A1 | 2/2012 | Hasha et al. |
| 2012/0050981 A1 | 3/2012 | Xu et al. |
| 2012/0054469 A1 | 3/2012 | Ikeya et al. |
| 2012/0054511 A1 | 3/2012 | Brinks et al. |
| 2012/0072997 A1 | 3/2012 | Carlson et al. |
| 2012/0081850 A1 | 4/2012 | Regimbal et al. |
| 2012/0096211 A1 | 4/2012 | Davis et al. |
| 2012/0099265 A1 | 4/2012 | Reber |
| 2012/0110055 A1 | 5/2012 | Van Biljon et al. |
| 2012/0110180 A1 | 5/2012 | Van Biljon et al. |
| 2012/0110188 A1 | 5/2012 | Van Biljon et al. |
| 2012/0110651 A1 | 5/2012 | Van Biljon et al. |
| 2012/0117229 A1 | 5/2012 | Van Biljon et al. |
| 2012/0131201 A1 | 5/2012 | Matthews et al. |
| 2012/0137004 A1 | 5/2012 | Smith |
| 2012/0151476 A1 | 6/2012 | Vincent |
| 2012/0155168 A1 | 6/2012 | Kim et al. |
| 2012/0159116 A1 | 6/2012 | Lim et al. |
| 2012/0167083 A1 | 6/2012 | Suit |
| 2012/0167084 A1 | 6/2012 | Suit |
| 2012/0167094 A1 | 6/2012 | Suit |
| 2012/0185334 A1 | 7/2012 | Sarkar et al. |
| 2012/0191860 A1 | 7/2012 | Traversal et al. |
| 2012/0198252 A1 | 8/2012 | Kirschtein et al. |
| 2012/0207165 A1 | 8/2012 | Davis |
| 2012/0218901 A1 | 8/2012 | Jungck et al. |
| 2012/0226788 A1 | 9/2012 | Jackson |
| 2012/0239479 A1 | 9/2012 | Amaro et al. |
| 2012/0278378 A1 | 11/2012 | Lehane et al. |
| 2012/0278430 A1 | 11/2012 | Lehane et al. |
| 2012/0278464 A1 | 11/2012 | Lehane et al. |
| 2012/0296974 A1 | 11/2012 | Tabe et al. |
| 2012/0297042 A1 | 11/2012 | Davis et al. |
| 2012/0324005 A1 | 12/2012 | Nalawade |
| 2013/0010639 A1 | 1/2013 | Armstrong et al. |
| 2013/0024645 A1 | 1/2013 | Cheriton et al. |
| 2013/0031331 A1 | 1/2013 | Cheriton et al. |
| 2013/0036236 A1 | 2/2013 | Morales et al. |
| 2013/0058250 A1 | 3/2013 | Casado et al. |
| 2013/0060839 A1 | 3/2013 | Van Biljon et al. |
| 2013/0066940 A1 | 3/2013 | Shao |
| 2013/0073602 A1 | 3/2013 | Meadway et al. |
| 2013/0073724 A1 | 3/2013 | Parashar et al. |
| 2013/0094499 A1 | 4/2013 | Davis et al. |
| 2013/0097351 A1 | 4/2013 | Davis |
| 2013/0097448 A1 | 4/2013 | Davis et al. |
| 2013/0107444 A1 | 5/2013 | Schnell |
| 2013/0111107 A1 | 5/2013 | Chang et al. |
| 2013/0124417 A1 | 5/2013 | Spears et al. |
| 2013/0145375 A1 | 6/2013 | Kang |
| 2013/0148667 A1 | 6/2013 | Hama et al. |
| 2013/0163605 A1 | 6/2013 | Chandra et al. |
| 2013/0247064 A1 | 9/2013 | Jackson |
| 2013/0268653 A1 | 10/2013 | Deng et al. |
| 2013/0275703 A1 | 10/2013 | Schenfeld et al. |
| 2013/0286840 A1 | 10/2013 | Fan |
| 2013/0290643 A1 | 10/2013 | Lim |
| 2013/0290650 A1 | 10/2013 | Chang et al. |
| 2013/0298134 A1 | 11/2013 | Jackson |
| 2013/0305093 A1 | 11/2013 | Jayachandran et al. |
| 2013/0318269 A1 | 11/2013 | Dalal et al. |
| 2014/0052866 A1 | 2/2014 | Jackson |
| 2014/0082614 A1 | 3/2014 | Klein et al. |
| 2014/0104778 A1 | 4/2014 | Schnell |
| 2014/0122833 A1 | 5/2014 | Davis et al. |
| 2014/0135105 A1 | 5/2014 | Quan et al. |
| 2014/0143773 A1 | 5/2014 | Ciano et al. |
| 2014/0317292 A1 | 10/2014 | Odom |
| 2014/0359044 A1 | 12/2014 | Davis et al. |
| 2014/0359323 A1 | 12/2014 | Fullerton et al. |
| 2014/0365596 A1 | 12/2014 | Kanevsky |
| 2015/0012679 A1 | 1/2015 | Davis et al. |
| 2015/0039840 A1 | 2/2015 | Chandra et al. |
| 2015/0103826 A1 | 4/2015 | Davis |
| 2015/0229586 A1 | 8/2015 | Jackson |
| 2015/0293789 A1 | 10/2015 | Jackson |
| 2015/0301880 A1 | 10/2015 | Allu |
| 2015/0381521 A1 | 12/2015 | Jackson |
| 2016/0161909 A1 | 6/2016 | Wada |
| 2017/0115712 A1 | 4/2017 | Davis |
| 2018/0018149 A1 | 1/2018 | Cook |
| 2018/0054364 A1 | 2/2018 | Jackson |
| 2019/0260689 A1 | 8/2019 | Jackson |
| 2019/0286610 A1 | 9/2019 | Dalton |
| 2020/0073722 A1 | 3/2020 | Jackson |
| 2020/0159449 A1 | 5/2020 | Davis et al. |
| 2020/0379819 A1 | 12/2020 | Jackson |

FOREIGN PATENT DOCUMENTS

| | | |
|---|---|---|
| DE | 60216001 | 7/2017 |
| EP | 0268435 | 5/1988 |
| EP | 0605106 A1 | 7/1994 |
| EP | 0 859 314 A2 | 8/1998 |
| EP | 1331564 | 7/2003 |
| EP | 1365545 | 11/2003 |
| EP | 1492309 | 12/2004 |
| EP | 1865684 | 12/2007 |
| GB | 2391744 | 2/2004 |
| GB | 2392265 | 2/2004 |
| JP | 8-212084 | 8/1996 |
| JP | 2002-207712 | 7/2002 |
| JP | 2005-165568 | 6/2005 |
| JP | 2005-223753 | 8/2005 |
| JP | 2005-536960 | 12/2005 |
| JP | 2006-309439 | 11/2006 |
| KR | 2004/0107934 | 12/2004 |
| TW | M377621 | 4/2010 |
| TW | 201017430 | 5/2010 |
| WO | WO1998/011702 | 3/1998 |
| WO | WO1998/058518 | 12/1998 |
| WO | WO 1999015999 | 4/1999 |
| WO | WO1999/057660 | 11/1999 |
| WO | WO2000/014938 | 3/2000 |
| WO | WO2000/025485 A1 | 5/2000 |
| WO | WO2000/060825 | 10/2000 |
| WO | WO2001/009791 | 2/2001 |
| WO | WO2001/014987 | 3/2001 |
| WO | WO2001/015397 | 3/2001 |
| WO | WO2001/039470 | 5/2001 |
| WO | WO2001/044271 | 6/2001 |
| WO | WO2003/046751 | 6/2003 |
| WO | WO2003/060798 | 9/2003 |
| WO | WO2004/021109 | 3/2004 |
| WO | WO-2004/021641 | 3/2004 |
| WO | WO2004/046919 | 6/2004 |
| WO | WO2004/070547 | 8/2004 |
| WO | WO2004/092884 | 10/2004 |
| WO | WO-2005/013143 | 2/2005 |
| WO | WO2005/017763 A2 | 2/2005 |
| WO | WO2005/017783 | 2/2005 |
| WO | WO2005/089245 A2 | 9/2005 |
| WO | WO2005/091136 | 9/2005 |
| WO | WO2006/036277 | 4/2006 |
| WO | WO2006/107531 | 10/2006 |
| WO | WO2006/108187 | 10/2006 |
| WO | WO2006/112981 | 10/2006 |

(56) References Cited

FOREIGN PATENT DOCUMENTS

| | | |
|---|---|---|
| WO | WO-2008/000193 | 1/2008 |
| WO | WO-2011/044271 | 4/2011 |
| WO | WO-2012/037494 | 3/2012 |

OTHER PUBLICATIONS

Caesar et al., "Design and Implementation of a Routing Control Platform," UseniX, NSDI '05 Paper, Technical Program, obtained from the Internet, on Apr. 13, 2021, at URL <https://www.usenix.org/legacy/event/nsdi05/tech/full_papers/caesar/caesar_html/>, 23 pages.
Advanced Switching Technology Tech Brief, published 2005, 2 pages.
Chapter 1 Overview of the Origin Family Architecture from Origin and OnyX2 Theor of Operations Manual, published 1997, 18 pages.
Cisco MDS 9000 Family Multiprotocol Services Module, published 2006, 13 pages.
Comparing the I2C BUS to the SMBUS, Maxim Integrated, Dec. 1, 2000, p. 1.
Das et al., "Unifying Packet and Circuit Switched Networks," IEEE Globecom Workshops 2009, Nov. 30, 2009, pp. 1-6.
Deering, "IP Multicast Extensions for 4.3BSD UNIX and related Systems," Jun. 1999, 5 pages.
Elghany et al., "High Throughput High Performance NoC Switch," NORCHIP 2008, Nov. 2008, pp. 237-240.
Extended European Search Report for EP 10827330.1, dated Jun. 5, 2013.
Final Office Action on U.S. Appl. No. 12/794,996, dated Jun. 19, 2013.
Final Office Action on U.S. Appl. No. 12/889,721 dated Aug. 2, 2016.
Final Office Action on U.S. Appl. No. 12/889,721, dated Apr. 17, 2014.
Final Office Action on U.S. Appl. No. 12/889,721, dated May 22, 2015.
Final Office Action on U.S. Appl. No. 13/234,054 dated May 31, 2017.
Final Office Action on U.S. Appl. No. 13/234,054 dated Apr. 16, 2015.
Final Office Action on U.S. Appl. No. 13/234,054, dated Jan. 26, 2016.
Final Office Action on U.S. Appl. No. 13/475,713, dated Oct. 17, 2014.
Final Office Action on U.S. Appl. No. 13/475,722, dated Oct. 20, 2014.
Final Office Action on U.S. Appl. No. 13/527,498, dated Nov. 17, 2014.
Final Office Action on U.S. Appl. No. 13/527,505, dated Dec. 5, 2014.
Final Office Action on U.S. Appl. No. 13/624,725 dated Mar. 10, 2016.
Final Office Action on U.S. Appl. No. 13/624,725, dated Nov. 4, 2015.
Final Office Action on U.S. Appl. No. 13/624,725, dated Nov. 13, 2013.
Final Office Action on U.S. Appl. No. 13/624,731, dated Jul. 25, 2014.
Final Office Action on U.S. Appl. No. 13/624,731, dated Nov. 12, 2013.
Final Office Action on U.S. Appl. No. 13/662,759, dated Feb. 22, 2016.
Final Office Action on U.S. Appl. No. 13/692,741, dated Mar. 11, 2015.
Final Office Action on U.S. Appl. No. 13/705,340, dated Aug. 2, 2013.
Final Office Action on U.S. Appl. No. 13/705,414, dated Aug. 9, 2013.
Final Office Action on U.S. Appl. No. 13/728,428 dated May 6, 2016.
Final Office Action on U.S. Appl. No. 14/052,723, dated Dec. 3, 2015.
Final Office Action on U.S. Appl. No. 14/106,697 dated Feb. 2, 2016.
Final Office Action on U.S. Appl. No. 14/106,698, dated Aug. 19, 2015.
Final Office Action on U.S. Appl. No. 14/334,178, dated Nov. 4, 2015.
Final Office Action on U.S. Appl. No. 14/334,931, dated Jul. 9, 2015.
Final Office Action on U.S. Appl. No. 14/809,723 dated Aug. 25, 2017.
Final Office Action on U.S. Appl. No. 15/281,462 dated Jun. 13, 2017.
Final Office Action on U.S. Appl. No. 15/281,462 dated Apr. 6, 2018.
Final Office Action on U.S. Appl. No. 15/357,332 dated May 9, 2018.
fpga4fun.com, "What is JTAG?", 2 pages, Jan. 31, 2010.
From AT to BTX: Motherboard Form Factor, Webopedia, Apr. 29, 2005, p. 1.
Grecu et al., "A Scalable Communication-Centric SoC Interconnect Architecture" Proceedings 5th International Symposium on Quality Electronic Design, 2005, pp. 343, 348 (full article included).
Hossain et al., "Extended Butterfly Fat Tree Interconnection (EFTI) Architecture for Network on CHIP," 2005 IEEE Pacific Rim Conference on Communicatinos, Computers and Signal Processing, Aug. 2005, pp. 613-616.
HP ProLiant SL6500 Scalable System, Family data sheet, HP Technical sheet, Sep. 2010 4 pages.
HP Virtual Connect Traffic Flow—Technology brief, Jan. 2012, 22 pages.
International Preliminary Reporton Patentability for PCT/US2009/044200, dated Nov. 17, 2010.
International Preliminary Report on Patentability for PCT/US2012/038986 dated Nov. 26, 2013.
International Preliminary Reporton Patentability for PCT/US2012/061747, dated Apr. 29, 2014.
International Preliminary Report on Patentability issued on PCT/US12/62608, dated May 6, 2014.
International Search Report and Written Opinion for PCT/US12/38987, dated Aug. 16, 2012.
International Search Report and Written Opinion for PCT/US12/61747, dated Mar. 1, 2013.
International Search Report and Written Opinion for PCT/US12/62608, dated Jan. 18, 2013.
International Search Report and Written Opinion for PCT/US2010/053227, dated May 10, 2012.
International Search Report and Written Opinion for PCT/US2010/053227, dated Dec. 16, 2010.
International Search Report and Written Opinion for PCT/US2011/051996, dated Jan. 19, 2012.
International Search Report and Written Opinion on PCT/US09/44200, dated Jul. 1, 2009.
International Search Report and Written Opinion on PCT/US2012/038986, dated Mar. 14, 2013.
Jansen et al., "SATA-IO to Develop Specification for Mini Interface Connector" Press Release Sep. 21, 2009, Serial ATA3 pages.
Nawathe et al., "Implementation of an 8-Core, 64-Thread, Power Efficient SPARC Server on a Chip", IEEE Journal of Solid-State Circuits, vol. 43, No. 1, Jan. 2008, pp. 6-20.
Non-Final Action on U.S. Appl. No. 13/728,362, dated Feb. 21, 2014.
Non-Final Office Action on U.S. Appl. No. 12/794,996, dated Sep. 17, 2012.
Non-Final Office Action on U.S. Appl. No. 12/889,721, dated Feb. 24, 2016.
Non-Final Office Action on U.S. Appl. No. 12/889,721, dated Jul. 2, 2013.
Non-Final Office Action on U.S. Appl. No. 12/889,721, dated Oct. 11, 2012.
Non-Final Office Action on U.S. Appl. No. 12/889,721, dated Sep. 29, 2014.

(56) References Cited

OTHER PUBLICATIONS

Non-Final Office Action on U.S. Appl. No. 13/234,054 dated Oct. 20, 2016.
Non-Final Office Action on U.S. Appl. No. 13/234,054, dated Aug. 6, 2015.
Non-Final Office Action on U.S. Appl. No. 13/234,054, dated Oct. 23, 2014.
Non-Final Office Action on U.S. Appl. No. 13/284,855, dated Dec. 19, 2013.
Non-Final Office Action on U.S. Appl. No. 13/453,086, dated Mar. 12, 2013.
Non-Final Office Action on U.S. Appl. No. 13/475,713, dated Apr. 1, 2014.
Non-Final Office Action on U.S. Appl. No. 13/475,722, dated Jan. 17, 2014.
Non-Final Office Action on U.S. Appl. No. 13/527,498, dated May 8, 2014.
Non-Final Office Action on U.S. Appl. No. 13/527,505, dated May 8, 2014.
Non-Final Office Action on U.S. Appl. No. 13/624,725, dated Apr. 23, 2015.
Non-Final Office Action on U.S. Appl. No. 13/624,725, dated Jan. 10, 2013.
Non-final office action on U.S. Appl. No. 13/624,731 dated Jan. 29, 2013.
Non-Final Office Action on U.S. Appl. No. 13/662,759, dated Nov. 6, 2014.
Non-Final Office Action on U.S. Appl. No. 13/692,741, dated Jul. 1, 2015.
Non-Final Office Action on U.S. Appl. No. 13/692,741, dated Sep. 4, 2014.
Non-Final Office Action on U.S. Appl. No. 13/705,286, dated May 13, 2013.
Non-Final Office Action on U.S. Appl. No. 13/705,340, dated Mar. 12, 2014.
Non-Final Office Action on U.S. Appl. No. 13/705,340, dated Mar. 29, 2013.
Non-Final Office Action on U.S. Appl. No. 13/705,414, dated Apr. 9, 2013.
Non-Final Office Action on U.S. Appl. No. 13/705,428, dated Jul. 10, 2013.
Non-Final Office Action on U.S. Appl. No. 13/728,308, dated May 14, 2015.
Non-Final Office Action on U.S. Appl. No. 13/728,428, dated Jun. 12, 2015.
Non-Final Office Action on U.S. Appl. No. 14/052,723, dated May 1, 2015.
Non-Final Office Action on U.S. Appl. No. 14/106,697, dated Aug. 17, 2015.
Non-Final Office Action on U.S. Appl. No. 14/106,698, dated Feb. 12, 2015.
Non-Final Office Action on U.S. Appl. No. 14/334,178 dated Dec. 18, 2015.
Non-Final Office Action on U.S. Appl. No. 14/334,931 dated Dec. 11, 2015.
Non-Final Office Action on U.S. Appl. No. 14/334,931, dated Jan. 5, 2015.
Non-Final Office Action on U.S. Appl. No. 14/725,543 dated Apr. 7, 2016.
Non-Final Office Action on U.S. Appl. No. 14/753,948 dated Nov. 4, 2016.
Non-Final Office Action on U.S. Appl. No. 14/809,723 dated Dec. 30, 2016.
Non-Final Office Action on U.S. Appl. No. 15/042,489 dated Jan. 9, 2018.
Non-Final Office Action on U.S. Appl. No. 15/078,115 dated Sep. 5, 2017.
Non-Final Office Action on U.S. Appl. No. 15/254,111 dated Jun. 20, 2017.
Non-Final Office Action on U.S. Appl. No. 15/270,418 dated Apr. 21, 2017.
Non-Final Office Action on U.S. Appl. No. 15/281,462 dated Dec. 15, 2017.
Non-Final Office Action on U.S. Appl. No. 15/281,462 dated Feb. 10, 2017.
Non-Final Office Action on U.S. Appl. No. 15/357,332 dated Nov. 9, 2017.
Notice of Allowance issued on U.S. Appl. No. 14/052,723, dated Feb. 8, 2017.
Notice of Allowance on U.S. Appl. No. 13/234,054, dated Sep. 19, 2017.
Notice of Allowance on U.S. Appl. No. 13/284,855, dated Jul. 14, 2014.
Notice of Allowance on U.S. Appl. No. 13/453,086, dated Jul. 18, 2013.
Notice of Allowance on U.S. Appl. No. 13/475,713, dated Feb. 5, 2015.
Notice of Allowance on U.S. Appl. No. 13/475,722, dated Feb. 27, 2015.
Notice of Allowance on U.S. Appl. No. 13/527,498, dated Feb. 23, 2015.
Notice of Allowance on U.S. Appl. No. 13/527,505, dated Mar. 6, 2015.
Notice of Allowance on U.S. Appl. No. 13/624,725, dated Mar. 30, 2016.
Notice of Allowance on U.S. Appl. No. 13/624,731, dated Mar. 5, 2015.
Notice of Allowance on U.S. Appl. No. 13/662,759 dated May 10, 2016.
Notice of Allowance on U.S. Appl. No. 13/692,741 dated Dec. 4, 2015.
Notice of Allowance on U.S. Appl. No. 13/705,340, dated Dec. 3, 2014.
Notice of Allowance on U.S. Appl. No. 13/705,340, dated Mar. 16, 2015.
Notice of Allowance on U.S. Appl. No. 13/705,386, dated Jan. 24, 2014.
Notice of Allowance on U.S. Appl. No. 13/705,414, dated Nov. 4, 2013.
Notice of Allowance on U.S. Appl. No. 13/728,308 dated Oct. 7, 2015.
Notice of Allowance on U.S. Appl. No. 13/728,428 dated Jul. 18, 2016.
Notice of Allowance on U.S. Appl. No. 14/052,723 dated Feb. 8, 2017.
Notice of Allowance on U.S. Appl. No. 14/106,697 dated Oct. 24, 2016.
Notice of Allowance on U.S. Appl. No. 14/334,178 dated Jun. 8, 2016.
Notice of Allowance on U.S. Appl. No. 14/334,178 dated Aug. 19, 2016.
Notice of Allowance on U.S. Appl. No. 14/334,931 dated May 20, 2016.
Notice of Allowance on U.S. Appl. No. 14/725,543 dated Jul. 21, 2016.
Notice of Allowance on U.S. Appl. No. 14/753,948 dated Jun. 14, 2017.
Notice of Allowance on U.S. Appl. No. 14/809,723 dated Jan. 11, 2018.
Notice of Allowance on U.S. Appl. No. 15/042,489 dated Jul. 16, 2018.
Notice of Allowance on U.S. Appl. No. 15/078,115 dated Jan. 8, 2018.
Notice of Allowance on U.S. Appl. No. 15/254,111 dated Sep. 1, 2017.
Notice of Allowance on U.S. Appl. No. 15/254,111 dated Nov. 13, 2017.
Notice of Allowance on U.S. Appl. No. 15/270,418 dated Nov. 2, 2017.
Notice of Allowance on U.S. Appl. No. 15/357,332 dated Jul. 12, 2018.

(56) References Cited

OTHER PUBLICATIONS

Notice of Allowance on U.S. Appl. No. 15/360,668, dated May 5, 2017.
Notice of Allowance on U.S. Appl. No. 15/430,959 dated Mar. 15, 2018.
Notice of Allowance on U.S. Appl. No. 15/672,418 dated Apr. 4, 2018.
Notice of Allowance U.S. Appl. No. 13/728,308, dated Oct. 7, 2015.
Office Action on Taiwan Application 100133390, dated Aug. 25, 2015 (English translation not available).
Office Action on Taiwan Application 101139729, dated May 25, 2015 (English translation not available).
Pande et al., "Design of a Switch for Network on Chip Applications," May 25-28, 2003 Proceedings of the 2003 International Symposium on Circuits and Systems, vol. 5, pp. V217-V220.
Reexamination Report on Japanese Application 2012-536877, dated Jan. 22, 2015 (English Translation not available).
Search Report on EP Application 10827330.1, dated Feb. 12, 2015.
Venaas, "IPv4 Multicast Address Space Registry," 2013, http://www.iana.org/assignments/multicast-addresses/multicast-addresses.x-html.
Bader et al.; "Applications"; The International Journal of High Performance Computing Applications, vol. 15, No. ; pp. 181-185; Summer 2001.
Coomer et al.; "Introduction to the Cluster Grid—Part 1"; Sun Microsystems White Paper; 19 pages; Aug. 2002.
Joseph et al.; "Evolution of grid computing architecture and grid adoption models"; IBM Systems Journal, vol. 43, No. 4; 22 pages; 2004.
Smith et al.; "Grid computing"; MIT Sloan Management Review, vol. 46, Iss. 1.; 5 pages; Fall 2004.
"Microsoft Computer Dictionary, 5th Ed."; Microsoft Press; 3 pages; 2002.
"Random House Concise Dictionary of Science & Computers"; 3 pages; Helicon Publishing; 2004.
U.S. Appl. No. 11/279,007, filed Apr. 2006, Jackson.
U.S. Appl. No. 13/705,340, filed Apr. 2012, Davis et al.
U.S. Appl. No. 13/899,751, filed May 2013, Chandra.
U.S. Appl. No. 13/935,108, filed Jul. 2013, Davis.
U.S. Appl. No. 13/959,428, filed Aug. 2013, Chandra.
U.S. Appl. No. 60/662,240, filed Mar. 2005, Jackson.
U.S. Appl. No. 60/552,653, filed Apr. 2005, Jackson.
A Language Modeling Framework for Resource Selection and Results Merging Si et al. CIKM 2002, Proceedings of the eleventh international conference on Iformation and Knowledge Management.
Alhusaini et al. "A framework for mapping with resource co-allocation in heterogeneous computing systems," Proceedings 9th Heterogeneous Computing Workshop (HCW 2000) (Cat. No. PR00556), Cancun, Mexico, 2000, pp. 273-286. (Year: 2000).
Ali et al., "Task Execution Time Modeling for Heterogeneous Computing System", IEEE, 2000, pp. 1-15.
Amiri et al., "Dynamic Function Placement for Data-Intensive Cluster Computing," Jun. 2000.
Banicescu et al., "Competitive Resource management in Distributed Computing Environments with Hectiling", 1999, High Performance Computing Symposium, p. 1-7 (Year: 1999).
Banicescu et al., "Efficient Resource Management for Scientific Applications in Distributed Computing Environment" 1998, Mississippi State Univ. Dept. of Comp. Science, p. 45-54. (Year: 1998).
Buyya et al., "An Evaluation of Economy-based Resource Trading and Scheduling on Computational Power Grids for Parameter Sweep Applications," Active Middleware Services, 2000, 10 pages.
Chase et al., "Dynamic Virtual Clusters in a Grid Site Manager", Proceedings of the 12.sup.th IEEE International Symposium on High Performance Distributed Computing (HPDC'03), 2003.
Chen et al., "A flexible service model for advance reservation", Computer Networks, Elsevier science publishers, vol. 37, No. 3-4, pp. 251-262. Nov. 5, 2001.

Exhibit 1002, Declaration of Dr. Andrew Wolfe, Ph.D., document filed on behalf of Unified Patents, LLC, in Case No. IPR2022-00136, 110 pages, Declaration dated Nov. 29, 2021.
Exhibit 1008, Declaration of Kevin Jakel, document filed on behalf of Unified Patents, LLC, in Case No. IPR2022-00136, 7 pages, Declaration dated Nov. 4, 2021.
Foster et al., "A Distributed Resource Management Architecture that Supports Advance Reservations and Co-Allocation," Seventh International Workshop on Quality of Service (IWQoS '99), 1999, pp. 27-36.
Furmento et al. "An Integrated Grid Environment for Component Applications", Proceedings of the Second International Workshop on Grid Computing table of contents, 2001, pp. 26-37.
He XiaoShan; QoS Guided Min-Min Heuristic for Grid Task Scheduling; Jul. 2003, vol. 18, No. 4, pp. 442-451 J. Comput. Sci. & Technol.
Huy Tuong Le, "The Data-AWare Resource Broker" Research Project Thesis, University of Adelaide, Nov. 2003, pp. 1-63.
IBM Tivoli "IBM Directory Integrator and Tivoli Identity Manager Integration" Apr. 2, 2003, pp. 1-13 online link "http:publib.boulder.ibm.com/tividd/td/ITIM/SC32-1683-00/en_US/HTML/idi_integration/index.html" (Year: 2003).
Intel, Architecture Guide: Intel® Active Management Technology, Intel.com, Oct. 10, 2008, pp. 1-23, (Year 2008).
Kafil et al., "Optimal Task Assignment in Herterogenous Computing Systems," IEEE, 1997, pp. 135-146.
Kuan-Wei Cheng, Chao-Tung Yang, Chuan-Lin Lai and Shun-Chyi Change, "A parallel loop self-scheduling on grid computing environments," 7th International Symposium on Parallel Architectures, Algorithms and Networks, 2004. Proceedings. 2004, pp. 409-414 (Year: 2004).
Luo Si et al. "A Language Modeling Framework for Resource Selection and Results Merging", Conference on Information and Knowledge Management. 2002 ACM pp. 391-397.
Maheswaran et al., "Dynamic Matching and Scheduling of a Class of Independent Tasks onto Heterogeneous Computing Systems," IEEE, 2000, pp. 1-15.
Mateescu et al., "Quality of service on the grid via metascheduling with resource co-scheduling and co-reservation," The International Journal of High Performance Computing Applications, 2003, 10 pages.
Notice of Allowance on U.S. Appl. No. 10/530,577, dated Oct. 15, 2015.
Notice of Allowance on U.S. Appl. No. 11/207,438 dated Jan. 3, 2012.
Notice of Allowance on U.S. Appl. No. 11/276,852 dated Nov. 26, 2014.
Notice of Allowance on U.S. Appl. No. 11/276,853, dated Apr. 5, 2016.
Notice of Allowance on U.S. Appl. No. 11/276,854, dated Mar. 6, 2014.
Notice of Allowance on U.S. Appl. No. 11/276,855, dated Sep. 13, 2013.
Notice of Allowance on U.S. Appl. No. 11/616,156, dated Mar. 25, 2014.
Notice of Allowance on U.S. Appl. No. 11/718,867 dated May 25, 2012.
Notice of Allowance on U.S. Appl. No. 12/573,967, dated Jul. 20, 2015.
Notice of Allowance on U.S. Appl. No. 13/621,987 dated Jun. 4, 2015.
Notice of Allowance on U.S. Appl. No. 13/705,286 dated Feb. 24, 2016.
Notice of Allowance on U.S. Appl. No. 13/758,164, dated Apr. 15, 2015.
Notice of Allowance on U.S. Appl. No. 13/760,600 dated Feb. 26, 2018.
Notice of Allowance on U.S. Appl. No. 13/760,600 dated Jan. 9, 2018.
Notice of Allowance on U.S. Appl. No. 13/855,241, dated Oct. 27, 2020.
Notice of Allowance on U.S. Appl. No. 13/855,241, dated Sep. 14, 2020.

(56) References Cited

OTHER PUBLICATIONS

Notice of Allowance on U.S. Appl. No. 14/106,254 dated May 25, 2017.
Notice of Allowance on U.S. Appl. No. 14/137,921 dated Aug. 12, 2021 and Jul. 16, 2021.
Notice of Allowance on U.S. Appl. No. 14/137,940 dated Jan. 30, 2019.
Notice of Allowance on U.S. Appl. No. 14/154,912 dated Apr. 25, 2019.
Notice of Allowance on U.S. Appl. No. 14/154,912, dated Apr. 3, 2019.
Notice of Allowance on U.S. Appl. No. 14/154,912, dated Feb. 7, 2019.
Notice of Allowance on U.S. Appl. No. 14/331,718 dated Jun. 7, 2017.
Notice of Allowance on U.S. Appl. No. 14/331,772, dated Jan. 10, 2018.
Notice of Allowance on U.S. Appl. No. 14/454,049, dated Jan. 20, 2015.
Notice of Allowance on U.S. Appl. No. 14/590,102, dated Jan. 22, 2018.
Notice of Allowance on U.S. Appl. No. 14/704,231, dated Sep. 2, 2015.
Notice of Allowance on U.S. Appl. No. 14/709,642 dated Mar. 19, 2019.
Notice of Allowance on U.S. Appl. No. 14/709,642, dated May 9, 2019.
Notice of Allowance on U.S. Appl. No. 14/791,873 dated Dec. 20, 2018.
Notice of Allowance on U.S. Appl. No. 14/827,927 dated Jan. 21, 2022 and Dec. 9, 2021.
Notice of Allowance on U.S. Appl. No. 14/833,673, dated Dec. 2, 2016.
Notice of Allowance on U.S. Appl. No. 14/842,916 dated Oct. 2, 2017.
Notice of Allowance on U.S. Appl. No. 14/872,645 dated Oct. 13, 2016.
Notice of Allowance on U.S. Appl. No. 14/987,059, dated Feb. 14, 2020.
Notice of Allowance on U.S. Appl. No. 14/987,059, dated Jul. 8, 2019.
Notice of Allowance on U.S. Appl. No. 14/987,059, dated Nov. 7, 2019.
Notice of Allowance on U.S. Appl. No. 15/049,542 dated Feb. 28, 2018.
Notice of Allowance on U.S. Appl. No. 15/049,542 dated Jan. 4, 2018.
Notice of Allowance on U.S. Appl. No. 15/345,017 dated Feb. 2, 2021.
Notice of Allowance on U.S. Appl. No. 15/478,467 dated May 30, 2019.
Notice of Allowance on U.S. Appl. No. 15/717,392 dated Mar. 22, 2019.
Notice of Allowance on U.S. Appl. No. 15/726,509, dated Sep. 25, 2019.
Office Action issued on U.S. Appl. No. 11/276,855, dated Jul. 22, 2010.
Office Action on U.S. Appl. No. 10/530,577, dated May 29, 2015.
Office Action on U.S. Appl. No. 11/207,438 dated Aug. 31, 2010.
Office Action on U.S. Appl. No. 11/207,438 dated Mar. 15, 2010.
Office Action on U.S. Appl. No. 11/276,852, dated Feb. 10, 2009.
Office Action on U.S. Appl. No. 11/276,852, dated Jan. 16, 2014.
Office Action on U.S. Appl. No. 11/276,852, dated Jun. 26, 2012.
Office Action on U.S. Appl. No. 11/276,852, dated Mar. 17, 2011.
Office Action on U.S. Appl. No. 11/276,852, dated Mar. 4, 2010.
Office Action on U.S. Appl. No. 11/276,852, dated Mar. 5, 2013.
Office Action on U.S. Appl. No. 11/276,852, dated Oct. 4, 2010.
Office Action on U.S. Appl. No. 11/276,852, dated Oct. 5, 2011.
Office Action on U.S. Appl. No. 11/276,852, dated Oct. 16, 2009.
Office Action on U.S. Appl. No. 11/276,853, dated Apr. 4, 2014.
Office Action on U.S. Appl. No. 11/276,853, dated Aug. 7, 2009.
Office Action on U.S. Appl. No. 11/276,853, dated Dec. 28, 2009.
Office Action on U.S. Appl. No. 11/276,853, dated Dec. 8, 2008.
Office Action on U.S. Appl. No. 11/276,853, dated Jul. 12, 2010.
Office Action on U.S. Appl. No. 11/276,853, dated May 26, 2011.
Office Action on U.S. Appl. No. 11/276,853, dated Nov. 23, 2010.
Office Action on U.S. Appl. No. 11/276,853, dated Oct. 16, 2009.
Office Action on U.S. Appl. No. 11/276,854, dated Apr. 18, 2011.
Office Action on U.S. Appl. No. 11/276,854, dated Aug. 1, 2012.
Office Action on U.S. Appl. No. 11/276,854, dated Jun. 10, 2009.
Office Action on U.S. Appl. No. 11/276,854, dated Jun. 5, 2013.
Office Action on U.S. Appl. No. 11/276,854, dated Jun. 8, 2010.
Office Action on U.S. Appl. No. 11/276,854, dated Nov. 26, 2008.
Office Action on U.S. Appl. No. 11/276,854, dated Oct. 27, 2010.
Office Action on U.S. Appl. No. 11/276,855, dated Aug. 13, 2009.
Office Action on U.S. Appl. No. 11/276,855, dated Dec. 30, 2008.
Office Action on U.S. Appl. No. 11/276,855, dated Dec. 31, 2009.
Office Action on U.S. Appl. No. 11/276,855, dated Dec. 7, 2010.
Office Action on U.S. Appl. No. 11/276,855, dated Jan. 26, 2012.
Office Action on U.S. Appl. No. 11/276,855, dated Jul. 22, 2010.
Office Action on U.S. Appl. No. 11/276,855, dated Jun. 27, 2011.
Office Action on U.S. Appl. No. 11/616,156, dated Jan. 18, 2011.
Office Action on U.S. Appl. No. 11/616,156, dated Oct. 13, 2011.
Office Action on U.S. Appl. No. 11/616,156, dated Sep. 17, 2013.
Office Action on U.S. Appl. No. 11/718,867 dated Dec. 29, 2009.
Office Action on U.S. Appl. No. 11/718,867 dated Jan. 8, 2009.
Office Action on U.S. Appl. No. 11/718,867 dated Jul. 11, 2008.
Office Action on U.S. Appl. No. 11/718,867 dated Jun. 15, 2009.
Office Action on U.S. Appl. No. 12/573,967, dated Apr. 1, 2014.
Office Action on U.S. Appl. No. 12/573,967, dated Aug. 13, 2012.
Office Action on U.S. Appl. No. 12/573,967, dated Mar. 1, 2012.
Office Action on U.S. Appl. No. 12/573,967, dated Nov. 21, 2014.
Office Action on U.S. Appl. No. 12/573,967, dated Oct. 10, 2013.
Office Action on U.S. Appl. No. 13/621,987 dated Feb. 27, 2015.
Office Action on U.S. Appl. No. 13/621,987 dated Oct. 8, 2014.
Office Action on U.S. Appl. No. 13/705,386, dated May 13, 2013.
Office Action on U.S. Appl. No. 13/760,600 dated Aug. 30, 2016.
Office Action on U.S. Appl. No. 13/760,600 dated Jan. 23, 2017.
Office Action on U.S. Appl. No. 13/760,600 dated Jun. 15, 2017.
Office Action on U.S. Appl. No. 13/760,600 dated Mar. 15, 2016.
Office Action on U.S. Appl. No. 13/760,600 dated Oct. 19, 2015.
Office Action on U.S. Appl. No. 13/760,600, dated Apr. 10, 2015.
Office Action on U.S. Appl. No. 13/855,241, dated Jan. 13, 2016.
Office Action on U.S. Appl. No. 13/855,241, dated Jul. 6, 2015.
Office Action on U.S. Appl. No. 13/855,241, dated Jun. 27, 2019.
Office Action on U.S. Appl. No. 13/855,241, dated Mar. 30, 2020.
Office Action on U.S. Appl. No. 13/855,241, dated Sep. 15, 2016.
Office Action on U.S. Appl. No. 14/106,254 dated Aug. 12, 2016.
Office Action on U.S. Appl. No. 14/106,254 dated Feb. 15, 2017.
Office Action on U.S. Appl. No. 14/106,254, dated May 2, 2016.
Office Action on U.S. Appl. No. 14/137,921 dated Feb. 4, 2021.
Office Action on U.S. Appl. No. 14/137,921 dated Jun. 25, 2020.
Office Action on U.S. Appl. No. 14/137,921 dated May 31, 2017.
Office Action on U.S. Appl. No. 14/137,921 dated May 6, 2016.
Office Action on U.S. Appl. No. 14/137,921 dated Oct. 6, 2016.
Office Action on U.S. Appl. No. 14/137,921 dated Oct. 8, 2015.
Office Action on U.S. Appl. No. 14/137,940 dated Aug. 10, 2018.
Office Action on U.S. Appl. No. 14/137,940 dated Jan. 25, 2018.
Office Action on U.S. Appl. No. 14/137,940 dated Jun. 3, 2016.
Office Action on U.S. Appl. No. 14/137,940 dated Jun. 9, 2017.
Office Action on U.S. Appl. No. 14/137,940 dated Nov. 3, 2016.
Office Action on U.S. Appl. No. 14/154,912, dated Dec. 7, 2017.
Office Action on U.S. Appl. No. 14/154,912, dated Jul. 20, 2017.
Office Action on U.S. Appl. No. 14/154,912, dated May 8, 2018.
Office Action on U.S. Appl. No. 14/154,912, dated Oct. 11, 2018.
Office Action on U.S. Appl. No. 14/331,718 dated Feb. 28, 2017.
Office Action on U.S. Appl. No. 14/331,772, dated Aug. 11, 2017.
Office Action on U.S. Appl. No. 14/590,102, dated Aug. 15, 2017.
Office Action on U.S. Appl. No. 14/691,120 dated Mar. 10, 2022.
Office Action on U.S. Appl. No. 14/691,120 dated Mar. 30, 2020.
Office Action on U.S. Appl. No. 14/691,120 dated Oct. 3, 2019.
Office Action on U.S. Appl. No. 14/691,120 dated Oct. 20, 2020.
Office Action on U.S. Appl. No. 14/691,120 dated Sep. 29, 2021.

(56) References Cited

OTHER PUBLICATIONS

Office Action on U.S. Appl. No. 14/691,120, dated Aug. 27, 2018.
Office Action on U.S. Appl. No. 14/691,120, dated Feb. 12, 2018.
Office Action on U.S. Appl. No. 14/691,120, dated Mar. 2, 2017.
Office Action on U.S. Appl. No. 14/691,120, dated Mar. 22, 2019.
Office Action on U.S. Appl. No. 14/691,120, dated Sep. 13, 2017.
Office Action on U.S. Appl. No. 14/709,642 dated Feb. 7, 2018.
Office Action on U.S. Appl. No. 14/709,642 dated Feb. 17, 2016.
Office Action on U.S. Appl. No. 14/709,642 dated Jul. 12, 2017.
Office Action on U.S. Appl. No. 14/709,642 dated Sep. 12, 2016.
Office Action on U.S. Appl. No. 14/751,529 dated Aug. 9, 2017.
Office Action on U.S. Appl. No. 14/751,529 dated Oct. 3, 2018.
Office Action on U.S. Appl. No. 14/751,529, dated Jun. 6, 2016.
Office Action on U.S. Appl. No. 14/751,529, dated Nov. 14, 2016.
Office Action on U.S. Appl. No. 14/791,873 dated May 14, 2018.
Office Action on U.S. Appl. No. 14/827,927 dated Jan. 19, 2021.
Office Action on U.S. Appl. No. 14/827,927 dated Jan. 31, 2020.
Office Action on U.S. Appl. No. 14/827,927 dated May 16, 2018.
Office Action on U.S. Appl. No. 14/827,927 dated May 16, 2019.
Office Action on U.S. Appl. No. 14/827,927 dated Sep. 9, 2019.
Office Action on U.S. Appl. No. 14/827,927, dated Aug. 28, 2018.
Office Action on U.S. Appl. No. 14/827,927, dated Jan. 31, 2019.
Office Action on U.S. Appl. No. 14/833,673, dated Feb. 11, 2016.
Office Action on U.S. Appl. No. 14/833,673, dated Jun. 10, 2016.
Office Action on U.S. Appl. No. 14/833,673, dated Sep. 24, 2015.
Office Action on U.S. Appl. No. 14/842,916 dated May 5, 2017.
Office Action on U.S. Appl. No. 14/872,645 dated Feb. 16, 2016.
Office Action on U.S. Appl. No. 14/872,645 dated Jun. 29, 2016.
Office Action on U.S. Appl. No. 14/987,059, dated Jan. 31, 2019.
Office Action on U.S. Appl. No. 14/987,059, dated May 11, 2018.
Office Action on U.S. Appl. No. 14/987,059, dated Oct. 11, 2018.
Office Action on U.S. Appl. No. 15/345,017 dated Aug. 24, 2020.
Office Action on U.S. Appl. No. 15/345,017 dated Aug. 9, 2019.
Office Action on U.S. Appl. No. 15/345,017 dated Jan. 31, 2019.
Office Action on U.S. Appl. No. 15/345,017 dated Jul. 11, 2018.
Office Action on U.S. Appl. No. 15/345,017 dated Mar. 20, 2020.
Office Action on U.S. Appl. No. 15/345,017 dated Nov. 29, 2019.
Office Action on U.S. Appl. No. 15/478,467, dated Jan. 11, 2019.
Office Action on U.S. Appl. No. 15/478,467, dated Jul. 13, 2018.
Office Action on U.S. Appl. No. 15/717,392 dated Dec. 3, 2018.
Office Action on U.S. Appl. No. 15/717,392 dated Jul. 5, 2018.
Office Action on U.S. Appl. No. 15/726,509, dated Jun. 3, 2019.
PCT/US2005/008296—International Search Report dated Aug. 3, 2005 for PCT Application No. PCT/US2005/008296, 1 page.
PCT/US2005/008297—International Search Report for Application No. PCT/US2005/008297, dated Sep. 29, 2005.
PCT/US2005/040669—International Preliminary Examination Report for PCT/US2005/040669, dated Apr. 29, 2008.
PCT/US2005/040669—Written Opinion for PCT/US2005/040669, dated Sep. 13, 2006.
PCT/US2010/053227—International Preliminary Report on Patentability for PCT/US2010/053227, dated May 10, 2012.
Petition for Inter Partes Review of U.S. Pat. No. 8,271,980, Challenging Claims 1-5 and 14-15, document filed on behalf of Unified Patents, LLC, in Case No. IPR2022-00136, 92 pages, Petition document dated Nov. 29, 2021.
Roblitz et al., "Resource Reservations with Fuzzy Requests", Concurrency and computation: Practice and Experience, 2005.
Snell et al., "The Performance Impact of Advance Reservation Meta-Scheduling", Springer-Verlag, Berlin, 2000, pp. 137-153.
Stankovic et al., "The Case for Feedback Control Real-Time Scheduling" 1999, IEEE pp. 1-13.
Takahashi et al. "A Programming Interface for Network Resource Management," 1999 IEEE, pp. 34-44.
Tanaka et al. "Resource Manager for Globus-Based Wide-Area Cluster Computing," 1999 IEEE, 8 pages.
U.S. Appl. No. 60/552,653, filed Apr. 19, 2005.
U.S. Appl. No. 60/662,240, filed Mar. 16, 2005, Jackson.
Liu, Simon: "Securing the Clouds: Methodologies and Practices." Encyclopedia of Cloud Computing (2016): 220. (Year: 2016).

Notice of Allowance on U.S. Appl. No. 14/827,927 dated Apr. 25, 2022.
Notice of Allowance on U.S. Appl. No. 16/913,745, dated Jun. 9, 2022.
Notice of Allowance on U.S. Appl. No. 17/700,808, dated May 26, 2022 and Jun. 6, 2022.
Office Action on U.S. Appl. No. 16/913,745 dated Jan. 13, 2022.
Office Action on U.S. Appl. No. 17/089,207 dated Jan. 28, 2022.
Office Action on U.S. Appl. No. 17/201,245 dated Mar. 18, 2022.
Office Action on U.S. Appl. No. 17/697,235 dated May 25, 2022.
Office Action on U.S. Appl. No. 17/697,368 dated Jun. 7, 2022.
Office Action on U.S. Appl. No. 17/697,403 dated Jun. 7, 2022.
Office Acton on U.S. Appl. No. 16/537,256 dated Dec. 23, 2021.
Office Acton on U.S. Appl. No. 16/913,708 dated Jun. 7, 2022.
Office Acton on U.S. Appl. No. 17/722,037 dated Jun. 13, 2022.
Notice of Allowance on U.S. Appl. No. 17/722,062 dated Jun. 15, 2022.
IQSearchText-202206090108.txt, publication dated Apr. 6, 2005, 2 pages.
Notice of Allowance on U.S. Appl. No. 17/700,767 dated Jun. 27, 2022.
Office Action on U.S. Appl. No. 17/722,076 dated Jun. 22, 2022.
Office Action on U.S. Appl. No. 17/412,832, dated Oct. 14, 2022.
Notice of Allowance on U.S. Appl. No. 16/913,708 dated Aug. 24, 2022.
Office Action on U.S. Appl. No. 17/697,368 dated Oct. 18, 2022.
Office Action on U.S. Appl. No. 17/697,403 dated Oct. 18, 2022.
Notice of Allowance on U.S. Appl. No. 17/700,767 dated Jul. 11 2022.
Notice of Allowance on U.S. Appl. No. 17/700,767 dated Oct. 14, 2022.
Notice of Allowance on U.S. Appl. No. 17/722,062 dated Oct. 7, 2022.
Office Action on U.S. Appl. No. 14/691,120, dated Sep. 8, 2022.
Office Action on U.S. Appl. No. 16/537,256 dated Jul. 7, 2022.
Notice of Allowance on U.S. Appl. No. 16/913,745, dated Sep. 27, 2022.
Notice of Allowance on U.S. Appl. No. 17/089,207, dated Jul. 7, 2022.
Office Action on U.S. Appl. No. 17/171,152 dated Aug. 16, 2022.
Office Action on U.S. Appl. No. 17/201,231 dated Oct. 5, 2022.
Notice of Allowance on U.S. Appl. No. 17/201,245 dated Sep. 14, 2022.
Notice of Allowance on U.S. Appl. No. 17/201,245 dated Sep. 22, 2022.
Office Action on U.S. Appl. No. 17/697,235 dated Sep. 20, 2022.
Notice of Allowance on U.S. Appl. No. 17/700,808, dated Sep. 14, 2022.
Notice of Allowance on U.S. Appl. No. 17/700,808, dated Sep. 26, 2022.
Notice of Allowance on U.S. Appl. No. 17/700,847, dated Jul. 7, 2022.
Office Action on U.S. Appl. No. 17/711,214, dated Jul. 8, 2022.
Office Action on U.S. Appl. No. 17/711,242, dated Jul. 28, 2022.
Notice of Allowance on U.S. Appl. No. 17/722,037, dated Jul. 18, 2022.
Office Action on U.S. Appl. No. 17/835,159 dated Aug, 31, 2022.
Reexamination Report on Japanese Application 2012-536877, dated Jan. 22, 2015, including English Translation, cited by applicant.
Abdelwahed, Sherif et al., "A Control-Based Framework for Self-Managing Distributed Computing Systems", WOSS'04 Oct. 31-Nov. 1, 2004 Newport Beach, CA, USA. Copyright 2004 ACM 1-58113-989-6/04/0010. cited by applicant.
Abdelzaher, Tarek, et al., "Performance Guarantees for Web Server End-Systems: A Control-Theoretical Approach", IEEE Transactions on Parallel and Distributed Systems. vol. 13. No. 1. Jan. 2002. cited by applicant.
Amini, A. Shaikh, and H. Schulzrinne, "Effective Peering for Multi-provider Content Delivery Services", In Proceedings of 23.sup.rd Annual IEEE Conference on Computer Communications (INFOCOM'04), pp. 850-861, 2004. cited by applicant.
Amir and D. Shaw, "WALRUS—A Low Latency, High Throughput Web Service Using Internet-wide Replication", In Proceedings of

(56) References Cited

OTHER PUBLICATIONS the 19.sup.th International Conference on Distributed Computing Systems Workshop, 1998. cited by applicant.
Appleby, K., et al., "Oceano-SLA Based Management of a Computing Utility", IBM T.J. Watson Research Center, P.O.Box 704, Yorktown Heights, New York 10598, USA. Proc. 7th IFIP/IEEE Int'l Symp. Integrated Network Management, IEEE Press 2001. cited by applicant.
Aweya, James et al., "An adaptive load balancing scheme for web servers", International Journal of Network Management 2002; 12: 3-39 (DOI: 10.1002/nem.421). Copyright 2002 John Wilev & Sons. Ltd. cited by applicant.
Azuma, T. Okamoto, G. Hasegawa, and M. Murata, "Design, Implementation and Evaluation of Resource Management System for Internet Servers", IOS Press, Journal of High Speed Networks, vol. 14 Issue 4, pp. 301-316, Oct. 2005. cited by applicant.
Baentsch, Michael et al., "World Wide Web Caching: The Application-Level View of the Internet", Communications Magazine, IEEE, vol. 35, Issue 6, pp. 170-178, Jun. 1997. cited by applicant.
Banga, Gaurav et al., "Resource Containers: A New Facility for Resource Management in Server Systems", Rice University, originally published in the Proceedings of the 3.sup.rd Symposium on Operating Systems Design and Implementation, New Orleans, Louisiana, Feb. 1999. cited by applicant.
Belloum, A et al., "A Scalable Web Server Architecture", World Wide Web Internet and Web Information Systems, 5, 5-23, 2002 Kluwer Academic Publishers. Manufactured in The Netherlands. 2000. cited by applicant.
Benkner, Siegfried, et al., "VGE- A Service-Oriented Grid Environment for On-Demand Supercomputing", Institute for Software Science, University of Vienna, Nordbergstrasse 15/C/3, A-1090 Vienna, Austria. Proceedings of the 5th IEEE/ACM International Workshop on Grid Computing. Pages 11-18. 2004.
Bent, Leeann et al., "Characterization of a Large Web Site Population with Implications for Content Delivery", WWW2004, May 17-22, 2004, New York, New York, USA ACM 1-58113-844-X/04/0005, pp. 522-533. cited by applicant.
Bian, Qiyong, et al., "Dynamic Flow Switching, A New Communication Service for ATM Networks", 1997. cited by applicant.
Bradford, S. Milliner, and M. Dumas, "Experience Using a Coordination-based Architecture for Adaptive Web Content Provision", In Coordination, pp. 140-156. Springer, 2005. cited by applicant.
Braumandl, R. et al., "ObjectGlobe: Ubiquitous query processing on the Internet", Universitat Passau, Lehrstuhl fur Informatik, 94030 Passau, Germany. Technische Universitaat Muunchen, Institutfur Informatik, 81667 Munchen, Germany. Edited by F. Casati, M.-C. Shan, D. Georgakopoulos. Published online Jun. 7, 2001—.sub.—cSpringer-Verlag 2001. cited by applicant.
Cardellini, Valeria et al., "Geographic Load Balancing for Scalable Distributed Web Systems", Proceedings of the 8th International Symposium on Modeling, Analysis and Simulation of Computer and Telecommunication Systems, pp. 20-27. 2000. cited by applicant.
Cardellini, Valeria et al., "The State of the Art in Locally Distributed Web-Server Systems", ACM Computing Surveys, vol. 34, No. 2, Jun. 2002, pp. 263-311. cited by applicant.
Casalicchio, Emiliano, et al., "Static and Dynamic Scheduling Algorithms for Scalable Web Server Farm", University of Roma Tor Vergata, Roma, Italy, 00133.2001. In Proceedings of the IEEE 9.sup.th EuromicroWorkshop on Parallel and Distributed Processing, pp. 369-376, 2001.
Chandra, Abhishek et al., "Dynamic Resource Allocation for Shared Data Centers Using Online Measurements" Proceedings of the 11th international conference on Quality of service, Berkeley, CA, USA pp. 381-398. 2003. cited by applicant.
Chandra, Abhishek et al., "Quantifying the Benefits of Resource Multiplexing in On-Demand Data Centers", Department of Computer Science, University of Massachusetts Amherst, 2003. cited by applicant.

Chawla, Hamesh et al., "HydraNet: Network Support for Scaling of Large-Scale Services",Proceedings of 7th International Conference on Computer Communications and Networks, 1998. Oct. 1998. cited by applicant.
Chellappa, Ramnath et al., "Managing Computing Resources in Active Intranets", International Journal of Network Management, 2002, 12:117-128 (DQI:10.1002/nem.427). cited by applicant.
Chen and G. Agrawal, "Resource Al ocation in a Middleware for Streaming Data", In Proceedings of the 2.sup.nd Workshop on Middleware for Grid Computing (MGC '04), pp. 5-10, Toronto, Canada, Oct. 2004. cited by applicant.
Chen, et al., "Replicated Servers Allocation for Multiple Information Sources in a Distributed Environment", Department of Computer Science, Hong Kong University of Science and Technology, Clear Water Bay, Kowloon, Hong Kong, Sep. 2000. cited by applicant.
Chen, Thomas, "Increasing the Observability of Internet Behavior", Communications of the ACM, vol. 44, No. 1, pp. 93-98, Jan. 2001. cited by applicant.
Chen, Xiangping et al., "Performance Evaluation of Service Differentiating Internet Servers", IEEE Transactions on Computers, vol. 51, No. 11, pp. 1368-1375, Nov. 2002. cited by applicant.
Clark, et al., "Providing Scalable Web Service Using Multicast Delivery", College of Computing, Georgia Institute of Technology, Atlanta, GA 30332-0280, 1995. cited by applicant.
Clarke and G. Coulson, "An Architecture for Dynamically Extensible Operating Systems", In Proceedings of the 4th International Conference on Configurable Distributed Systems (ICCDS'98), Annapolis, MD, May 1998. cited by applicant.
Colajanni, Michele et al., "Analysis of Task Assignment Policies in Sea able Distributed Web-server Systems", IEEE Transactions on Parallel and Distributed Systes, vol. 9, No. 6, Jun. 1998. cited by applicant.
Colajanni, P. Yu, V. Cardellini, M. Papazoglou, M. Takizawa, B. Cramer and S. Chanson, "Dynamic Load Balancing in Geographically Distributed Heterogeneous Web Servers", In Proceedings of the 18.sup.th International Conference on Distributed Computing Systems, pp. 295-302, May 1998. cited by applicant.
Conti, Marco et al., "Quality of Service Issues in Internet Web Services", IEEE Transactions on Computers, vol. 51, No. 6, pp. 593-594, Jun. 2002. cited by applicant.
Conti, Marco, et al., "Client-side content delivery policies in replicated web services: parallel access versus single server approach", Istituto di Informatica e Telematica (IIT), Italian National Research Council (CNR), Via G. Moruzzi, I. 56124 Pisa, Italy, Performance Evaluation 59 (2005) 137-157, Available online Sep. 11, 2004. cited by applicant.
Devarakonda, V.K. Naik, N. Rajamanim, "Policy-based multi-datacenter resource management", In 6.sup.th IEEE International Workshop on Policies for Distributed Systems and Networks, pp. 247-250, Jun. 2005. cited by applicant.
Dilley, John, et al., "Globally Distributed Content Delivery", IEEE Internet Computing, 1089-7801/02/$17.00 .COPYRGT. 2002 IEEE, pp. 50-58, Sep.-Oct. 2002. cited by applicant.
Doyle, J. Chase, 0. Asad, W. Jin, and A. Vahdat, "Model-Based Resource Provisioning in a Web Service Utility", In Proceedings of the Fourth USENIX Symposium on Internet Technologies and Systems (USITS), Mar. 2003. cited by applicant.
Edited by William Gropp, Ewing Lusk and Thomas Sterling, "Beowulf Cluster Computing with Linux," Massachusetts Institute of Technology, 2003. cited by applicant.
Ercetin, Ozgur et al., "Market-Based Resource Allocation for Content Delivery in the Internet", IEEE Transactions on Computers, vol. 52, No. 12, pp. 1573-1585, Dec. 2003. cited by applicant.
Fan, Li, et al., "Summary Cache: A Scalable Wide-Area Web Cache Sharing Protocol", IEEE/ACM Transactions on networking, vol. 8, No. 3, Jun. 2000. cited by applicant.
Feldmann, Anja, et al., "Efficient Policies for Carrying Web Traffic Over Flow-Switched Networks", IEEE/ACM Transactions on Networking, vol. 6, No. 6, Dec. 1998. cited by applicant.
Feldmann, Anja, et al., "Reducing Overhead in Flow-Switched Networks: An Empirical Study of Web Traffic", AT&T Labs-Research, Florham Park, NJ, 1998. cited by applicant.

(56) References Cited

OTHER PUBLICATIONS

Fong, L.L. et al., "Dynamic Resource Management in an eUtility", IBM T. J. Watson Research Center, 0-7803-7382-0/02/$17.00 .COPYRGT. 2002 IEEE. cited by applicant.

Foster, Ian et al., "The Anatomy of the Grid-Enabling Scalable Virtual Organizations", To appear: Inti J. Supercomputer Applications, 2001. cited by applicant.

Fox, Armando et al., "Cluster-Based Scalable Network Services", University of California at Berkeley, SOSP-Oct. 16, 1997 Saint-Malo, France, ACM 1997. cited by applicant.

Furmento et al., "Building computational communities from federated resources." European Conference on Parallel, Springer, Berlin, Heidelberg, pp. 855-863. (Year: 2001).

Garg, Rahul, et al., "A Sla Framework for QoS Provisioning and Dynamic Capacity Allocation", 2002. cited by applicant.

Gayek, P., et al., "A Web Content Serving Utility", IBM Systems Journal, vol. 43, No. 1, pp. 43-63. 2004. cited by applicant.

Genova, Zornitza et al., "Challenges in URL Switching for Implementing Globally Distributed Web Sites", Department of Computer Science and Engineering, University of South Florida, Tampa, Florida 33620. 0-7695-077 I-9/00 $10.00-IEEE. 2000. cited by applicant.

Grajcar, Martin, "Genetic List Scheduling Algorithm for Scheduling and Allocation on a Loosely Coupled Heterogeneous Multiprocessor System", Proceedings of the 36.sup.th annual ACM/IEEE Design Automation Conference, New Orleans, Louisiana, pp. 280-285. 1999. cited by applicant.

Grimm, Robert et al., "System Support for Pervasive Applications", ACM Transactions on Computer Systems, vol. 22, No. 4, Nov. 2004, pp. 421-486. cited by applicant.

Guo, L. Bhuyan, R. Kumar and S. Basu, "QoS Aware Job Scheduling in a Cluster-Based Web Server for Multimedia Applications", In Proceedings of the 19.sup.th IEEE International Parallel and Distributed Processing Symposium (IPDPS'05), Apr. 2005. cited by applicant.

Gupta, A., Kleinberg, J., Kumar, A., Rastogi, R. & Yener, B. "Provisioning a virtual private network: a network design problem for multicommodity flow," Proceedings of the thirty-third annual ACM symposium on Theory of computing [online], Jul. 2001, pp. 389-398, abstract [retrieved on Jun. 14, 2007],Retrieved from the Tnternet:<URL:http://portal.acm.org/citation.cfm?id=380830&dl= ACM&coll- -FGUIDE>. cited by applicant.

Haddad and E. Paquin, "Mosix: A Cluster Load-Balancing Solution for Linux", In Linux Journal, vol. 2001 Issue 85es, Article No. 6, May 2001. cited by applicant.

Hadjiefthymiades, Stathes et al., "Using Proxy Cache Relocation to Accelerate Web Browsing in Wireless/Mobile Communications", University of Athens, Dept. of Informatics and Telecommunications, Panepistimioupolis, llisia, Athens, 15784, Greece. WWW10, May 1-5, 2001, Hong Kong. cited by applicant.

He XiaoShan; QoS Guided Min-Min Heuristic for Grud Task Scheduling; Jul. 2003, vol. 18, No. 4, pp. 442-451 J. Comput. Sci. & Technol. cited by applicant.

HP "OpenView OS Manager using Radia software", 5982-7478EN, Rev 1, Nov. 2005; (HP_Nov_2005.pdf; pp. 1-4).

Hu, E.C et al., "Adaptive Fast Path Architecture", Copyright 2001 by International Business Machines Corporation, pp. 191-206, IBM J. Res. & Dev. vol. 45 No. Mar. 2, 2001. cited by applicant.

Huang, S. Sebastine and T. Abdelzaher, "An Architecture for Real-Time Active Content Distribution", In Proceedings of the 16.sup.th Euromicro Conference on Real-Time Systems (ECRTS 04), pp. 271-280, 2004. cited by applicant.

IBM Tivoli Workload Scheduler job Scheduling Console User's Guide Feature Level 1.2 (Maintenance Release Oct. 2003). Oct. 2003, IBM Corporation, http://publib.boulder.IBM.com/tividd/td/ TWS/SH19-4552-01/en.sub.-US/PDF/-jsc.sub.-user.pdf. cited by applicant.

J. Chase, D. Irwin, L. Grit, J. Moore and S. Sprenkle, "Dynamic Virtual Clusters in a Grid Site Manager", In Proceedings of the 12.sup.th IEEE International Symposium on High Performance Distributed Computing, pp. 90-100, 2003. cited by applicant.

Jackson et al., "Grid Computing: Beyond Enablement",; Cluster Resource, Inc., Jan. 21, 2005.

Jann, Joefon et al., "Web Applications and Dynamic Reconfiguration in UNIX Servers", IBM, Thomos J. Watson Research Center, Yorktown' Heights, New York 10598, 0-7803-7756-7/03/$17.00. 2003 IEEE. pp. 186-194. cited by applicant.

Jarek Nabrzyski, Jennifer M. Schopf and Jan Weglarz, "Grid Resources Management, State of the Art and Future Trends," Kluwer Academic Publishers, 2004. cited by applicant.

Jiang, Xuxian et al., "SODA: a Service-On-Demand Architecture for Application Service Hosting Utility Platforms", Proceedings of the 12th IEEE International Symposium on High Performance Distributed Computing (HPDC'03) 1082-8907/03 $17.00 .COPYRGT. 2003 IEEE, cited by applicant.

Kant, Krishna et al., "Server Capacity Planning for Web Traffic Workload", IEEE Transactions on Knowledge and Data Engineering, vol. 11, No. 5, Sep./Oct. 1999, pp. 731-474. cited by applicant.

Kapitza, F. J. Hauck, and H. P. Reiser, "Decentralized, Adaptive Services: The AspectlX Approach for a Flexible and Secure Grid Environment", In Proceedings of the Grid Services Engineering and Management Conferences (GSEM, Erfurt, Germany, Nov. 2004), pp. 107-118, LNCS 3270, Springer, 2004. cited by applicant.

Kavas et al., "Comparing Windows NT, Linux, and QNX as the Basis for Cluster Systems", Concurrency and Computation Practice & Experience Wiley UK, vol. 13, No. 15, pp. 1303-1332, Dec. 25, 2001.

Koulopoulos, D et al., "PLEIADES: An Internet-based parallel/ distributed system", Software-Practice and Experience 2002; 32:1035-1049 (DOI: 10.1002/spe.468). cited by applicant.

Kuz, Ihor et al., "A Distributed-Object Infrastructure for Corporate Websites", Delft University of Technology Vrije Universiteit Vrije Universiteit Delft, The Netherlands, 0-7695-0819-7/00 $10.00 0 2000 IEEE.

Lars C. Wolf et al. "Concepts for Resource Reservation in Advance" Multimedia Tools and Applications. [Online] 1997, pp. 255-278, XP009102070 The Netherlands Retreived from the Internet: URL http://www.springerlink.com/content/h25481221mu22451/fulltext. pdf [retrieved on Jun. 23, 2008]. cited by applicant.

Leinberger, W et al., "Gang Scheduling for Distributed Memory Systems", University of Minnesota-Computer Science and Engineering-Technical Report, Feb. 16, 2000, vol. TR 00-014. cited by applicant.

Liao, Raymond, et al., "Dynamic Core Provisioning for Quantitative Differentiated Services", IEEE/ACM Transactions on Networking, vol. 12, No. 3, pp. 429-442, Jun. 2004. cited by applicant.

Liu et al. "Design and Evaluation of a Resouce Selection Framework for Grid Applicaitons" High Performance Distributed Computing. 2002. HPDC-11 2002. Proceeding S. 11.sup.th IEEE International Symposium on Jul. 23-26, 2002, Piscataway, NJ, USA IEEE, Jul. 23, 2002, pp. 63-72, XP010601162 Isbn: 978-0-7695-1686-8. cited by applicant.

Lowell, David et al., "Devirtualizable Virtual Machines Enabling General, SingleNode, Online Maintenance", ASPLQS'04, Oct. 9-13, 2004, Boston, Massachusetts, USA, pp. 211-223, Copyright 2004 ACM, cited by applicant.

Lu, Chenyang et al., "A Feedback Control Approach for Guaranteeing Relative Delays in Web Servers", Department of Computer Science, University of Virginia, Charlottesville, VA 22903, 0-7695-1134-1/01 $10.00.2001 IEEE, cited by applicant.

Mahon, Rob et al., "Cooperative Design in Grid Services", The 8th International Conference on Computer Supported Cooperative Work in Design Proceedings. pp. 406-412. IEEE 2003. cited by applicant.

Mccann, Julie, et al., "Patia: Adaptive Distributed Webserver (A Position Paper)", Department of Computing, Imperial College London, SW1 2BZ, Uk. 2003. cited by applicant.

Montez, Carlos et al., "Implementing Quality of Service in Web Servers", LCMI-Depto de Automacao e Sistemas-Univ. Fed. de Santa Catarina, Caixa Postal 476-88040-900-Florianopolis-SC-Brasil, 1060-9857/02 $17.00. 2002 IEEE. cited by applicant.

Naik, S. Sivasubramanian and S. Krishnan, "Adaptive Resource Sharing in a Web Services Environment", In Proceedings of the 5.sup.th ACM/IFIP/USENIX International Conference on Middleware

(56) References Cited

OTHER PUBLICATIONS (Middleware '04), pp. 311-330, Springer-Verlag New York, Inc. New York, Ny, USA, 2004. cited by applicant.
Nakrani and C. Tovey, "On Honey Bees and Dynamic Server Allocation in Internet Hosting Centers", Adaptive Behavior, vol. 12, No. 3-4, pp. 223-240, Dec. 2004. cited by applicant.
Pacifici, Giovanni et al., "Performance Management for Cluster Based Web Services", IBM Tj Watson Research Center, May 13, 2003. cited by applicant.
Ranjan, J. Rolia, H. Fu, and E. Knightly, "QoS-driven Server Migration for Internet Data Centers", In Proceedings of the Tenth International Workshop on Quality of Service (IWQoS 2002), May 2002. cited by applicant.
Rashid, Mohammad, et al., "An Analytical Approach to Providing Controllable Differentiated Quality of Service in Web Servers", IEEE Transactions on Parallel and Distributed Systems, vol. 16, No. 11, pp. 1022-1033, Nov. 2005. cited by applicant.
Raunak, Mohammad et al., "Implications of Proxy Caching for Provisioning Networks and Servers", IEEE Journal on Selected Areas in Communications, vol. 20, No. 7, pp. 1276-1289, Sep. 2002. cited by applicant.
Reed, Daniel et al., "The Next Frontier: Interactive and Closed Loop Performance Steering", Department of Computer Science, University of Illinois, Urbana, Illinois 61801, International Conference on Parallel Processing Workshop, 1996. cited by applicant.
Reumann, John et al., "Virtual Services: A New Abstraction for Server Consolidation", Proceedings of 2000 USENIX Annual Technical Conference, San Diego, California, Jun. 18-23, 2000. cited by applicant.
Rolia, S. Singhal, and R. Friedrich, "Adaptive Internet data centers", In Proceedings of the International Conference on Advances in Infrastructure for Electronic Business, Science, and Education on the Internet (SSGRR '00), Jul. 2000. cited by applicant.
Rolia, X. Zhu, and M. Arlitt, "Resource Access Management for a Utility Hosting Enterprise Applications", In Proceedings of the 8th IFIP/IEEE International Symposium on Integrated Network Management (IM), pp. 549-562, Colorado Springs, Colorado, USA, Mar. 2003. cited by applicant.
Roy, Alain, "Advance Reservation API", University of Wisconsin-Madison, GFD-E.5, Scheduling Working Group, May 23, 2002. cited by applicant.
Ryu, Kyung Dong et al., "Resource Policing to Support Fine-Grain Cycle Stealing in Networks of Workstations", IEEE Transactions on Parallel and Distributed Systems, vol. 15, No. 10, pp. 878-892, Oct. 2004. cited by applicant.
Sacks, Lionel et al., "Active Robust Resource Management in Cluster Computing Using Policies", Journal of Network and Systems Management, vol. 11, No. 3, pp. 329-350, Sep. 2003. cited by applicant.
Shaikh, Anees et al., "Implementation of a Service Platform for Online Games", Network Software and Services, IBM T.J. Watson Research Center, Hawthorne, NY 10532, SIGCQMM'04 Workshops, Aug. 30 & Sep. 3, 2004, Portland, Oregon, USA. Copyright 2004 ACM, cited by applicant.
Shen, H. Tang, T. Yang, and L. Chu, "Integrated Resource Management for Cluster-based Internet Services", In Proceedings of the 5.sup.th Symposium on Operating Systems Design and Implementation (OSDI '02), pp. 225-238, Dec. 2002. cited by applicant.
Shen, L. Chu, and T. Yang, "Supporting Cluster-based Network Services on Functionally Symmetric Software Architecture", In Proceedings of the Acm/IEEE SC2004 Conference, Nov. 2004. cited by applicant.
Si et al., "Language Modeling Framework for Resource Selection and Results Merging", SIKM 2002, Proceedings of the eleventh international conference on Information and Knowledge Management, cited by applicant.
Sit, Yiu-Fai et al., "Cyclone: A High-Performance Cluster-Based Web Server with Socket Cloning", Department of Computer Science and Information Systems, The University of Hong Kong, Cluster Computing vol. 7, issue 1, pp. 21-37, Jul. 2004, Kluwer Academic Publishers.
Sit, Yiu-Fai et al., "Socket Cloning for Cluster-BasedWeb Servers", Department of Computer Science and Information Systems, The University of Hong Kong, Proceedings of the IEEE International Conference on Cluster Computing, IEEE 2002. cited by applicant.
Snell, Quinn et al., "An Enterprise-Based Grid Resource Management System", Brigham Young University, Provo, Utah 84602, Proceedings of the 11th IEEE International Symposium on High Performance Distributed Computing, 2002. cited by applicant.
Soldatos, John, et al., "On the Building Blocks of Quality of Service in Heterogeneous IP Networks", IEEE Communications Surveys, The Electronic Magazine of Original Peer-Reviewed Survey Articles, vol. 7, No. 1. First Quarter 2005. cited by applicant.
Stone et al., UNIX Fault Management: A Guide for System Administration, Dec. 1, 1999, Isbn 0-13-026525-X, http://www.informit.com/content/images/013026525X/samplechapter/013026525-.pdf. cited by applicant.
Supercluster Research and Development Group, "Maui Administrator's Guide", Internet citation, 2002. cited by applicant.
Tang, Wenting et al., "Load Distribution via Static Scheduling and Client Redirection for Replicated Web Servers", Department of Computer Science and Engineering, 3115 Engineering Building, Michigan State University, East Lansing, Ml 48824-1226, Proceedings of the 2000 International Workshop on Parallel Processing, pp. 127-133, IEEE 2000. cited by applicant.
Taylor, M. Surridge, and D. Marvin, "Grid Resources for Industrial Applications", In Proceedings of the IEEE International Conference on Web Services (ICWS 04), pp. 402-409, San Diego, California, Jul. 2004. cited by applicant.
Urgaonkar, Bhuvan, et al., "Share: Managing CPU and Network Bandwidth in Shared Clusters", IEEE Transactions on Parallel and Distributed Systems, vol. 15, No. 1, pp. 2-17, Jan. 2004. cited by applicant.
Vidyarthi, A. K. Tripathi, B. K. Sarker, A. Dhawan, and L. T. Yang, "Cluster-Based Multiple Task Allocation in Distributed Computing System", In Proceedings of the 18.sup.th International Parallel and Distributed Processing Symposium KIPDPS'04), p. 239, Santa Fe, New Mexico, Apr. 2004. cited by applicant.
Villela, p. Pradhan, and D. Rubenstein, "Provisioning Servers in the Application Tier for E-commerce Systems", In Proceedings of the 12.sup.th IEEE International Workshop on Quality of Service (IWQoS '04), pp. 57-66, Jun. 2004. cited by applicant.
Wang, Z., et al., "Resource Allocation for Elastic Traffic: Architecture and Mechanisms", Bell Laboratories, Lucent Technologies, Network Operations and Management Symposium, 2000. 2000 IEEE/IFIP, pp. 157-170. Apr. 2000. cited by applicant.
Wesley et al., "Taks Allocation and Precedence Relations for Distributed Real-Time Systems", IEEE Transactions on Computers, vol. C-36, No. 6, pp. 667-679. Jun. 1987. cited by applicant.
Wolf et al. "Concepts for Resource Reservation in Advance" Multimedia Tools and Applications, 1997. cited by examiner.
Workshop on Performance and Architecture of Web Servers (PAWS-2000) Jun. 17-18, 2000, Santa Clara, CA (Held in conjunction with SIGMETRICS-2000). cited by applicant.
Xu, Jun, et al., "Sustaining Availability of Web Services under Distributed Denial of Service Attacks", IEEE Transactions on Computers, vol. 52, No. 2, pp. 195-208, Feb. 2003. cited by applicant.
Xu, Zhiwei et al., "Cluster and Grid Superservers: The Dawning Experiences in China", Institute of Computing Technology, Chinese Academy of Sciences, P.O. Box 2704, Beijing 100080, China. Proceedings of the 2001 IEEE International Conference on Cluster Computing. IEEE 2002. cited by applicant.
Yang, Chu-Sing, et al., "Building an Adaptable, Fault Tolerant, and Highly Manageable Web Server on Clusters of Non-dedicated Workstations", Department of Computer Science and Engineering, National Sun Yat-Sen University, Kaohsiung, Taiwan, R.O.C.. 2000. cited by applicant.
Zeng, Daniel et al., "Efficient Web Content Delivery Using Proxy Caching Techniques", IEEE Transactions on Systems, Man, and

(56) References Cited

OTHER PUBLICATIONS

Cybernetics-Part C Applications and Reviews, vol. 34, No. 3, pp. 270-280, Aug. 2004. cited by applicant.

Zhang, Qian et al., "Resource Allocation for Multimedia Streaming Over the Internet", IEEE Transactions on Multimedia, vol. 3, No. 3, pp. 339-355, Sep. 2001. cited by applicant.

\* cited by examiner

MEMCACHED SERVER FUNCTIONALITY IN A CLUSTER OF DATA PROCESSING NODES

CROSS REFERENCE TO RELATED APPLICATIONS

The present application is a continuation of U.S. application Ser. No. 16/198,619, filed Nov. 21, 2018, which is a continuation of U.S. application Ser. No. 15/357,332, filed Nov. 21, 2016 (now U.S. Pat. No. 10,140,245), which is a continuation of U.S. application Ser. No. 13/728,428, filed Dec. 27, 2012 (now U.S. Pat. No. 9,648,102), which is a continuation-in-part of U.S. application Ser. No. 13/453,086, filed Apr. 23, 2012 (now U.S. Pat. No. 8,599,863), which is a continuation-in-part of U.S. application Ser. No. 12/794,996, filed Jun. 7, 2010 (now abandoned), which claims priority to U.S. provisional application No. 61/256,723, filed Oct. 30, 2009, all of which have a common applicant herewith and are incorporated herein in their entirety by reference.

BACKGROUND

1. Field of the Invention

The embodiments of the present invention relate to allocation and disassociation of disparate computing resources of clustered computing nodes. More specifically, embodiments of the present invention relate to systems and methods for providing memcached server functionality in a cluster of data processing nodes such as for allowing access to cached information from one or more data processing nodes within a cluster of data processing nodes.

2. Description of Related Art

Conventionally, network systems used different topologies, e.g. Ethernet architecture employed a spanning tree type of topology. Recently, Ethernet fabric topology has been developed that provides a higher level of performance, utilization, availability and simplicity. Such Ethernet fabric topologies are flatter and self-aggregating in part because of the use of intelligent switches in the fabric that are aware of the other switches and can find shortest paths without loops. One benefit is that Ethernet fabric topologies are scalable with high performance and reliability. Ethernet fabric data center architectures are available from Juniper, Avaya, Brocade, and Cisco.

A "shared nothing architecture" is a distributed computing architecture in which each node is independent and self-sufficient. Typically, none of the nodes share memory or disk storage. A shared nothing architecture is popular for web development because of its scalability. What is deficient in typical shared nothing clusters is the ability to allow memory capacity to be provisioned based on workload on a per-node basis, to implement memcached functionality on a per-node basis across a plurality of nodes in a cluster, to load/store from remote memory, to perform remote DMA transactions, and to perform remote interrupts.

SUMMARY

The system and method of the present invention provide flexible methods of extending these distributed network systems beyond the typical shared nothing cluster to accommodate different protocols in varying network topologies. The systems and methods hereof provide the ability to load/store from remote memory, implement memcached functionality on a per-node basis across a plurality of nodes in a cluster, perform remote DMA transactions, perform remote interrupts, allow a wide range of use cases that greatly extend performance, power optimization, and functionality of shared nothing clusters. Several examples are described which include network acceleration, storage acceleration, message acceleration, and shared memory windows across a power-optimized interconnect multi-protocol fabric.

In one embodiment, a method is performed by a first server on a chip (SoC) node that is one instance of a plurality of nodes within a cluster of nodes. The method comprises a plurality of operations. An operation is performed for determine if a second one of the SoC nodes in the cluster has data stored thereon corresponding to a data identifier in response to receiving a data retrieval request including the data identifier. An operation is performed for determining if a remote memory access channel exists between the SoC node and the second one of the SoC nodes. An operation is performed for access the data from the second one of the SoC nodes using the remote memory access channel after determine that the second one of the SoC nodes has the data stored thereon and that the remote memory access channel exists between the SoC node and the second one of the SoC nodes. The operations can be performed by one or more processors that access, from memory allocated or otherwise accessible to the one or more processors, instructions that embody the operations and that are processible by the one or more processors.

In another embodiment, a non-transitory computer-readable medium has tangibly embodied thereon and accessible therefrom a set of instructions interpretable by one or more data processing devices of a first SoC node in a cluster of SoC nodes. The set of instructions is configured for causing the one or more data processing devices to implement operations for determining if a second SoC node in the cluster has data stored thereon corresponding to a data identifier, determining if a remote memory access channel exists between the first SoC node and the second SoC node, and accessing the data from the second SoC node using the remote memory access channel after determining that the second SoC node has data stored thereon and that the remote memory access channel exists between the first and second SoC nodes.

In another embodiment, a data processing system comprises a first server on a chip (SoC) node characterized by a SoC node density configuration enabling the second SoC node to serve in a role of providing information computing resources to one or more data processing systems and a second SoC node characterized by a memory configuration enabling the second SoC node to serve in a role of enabling memory resources thereof to be allocated to one or more other SoC nodes. The first SoC node is coupled to the second SoC node by a remote memory access channel. One or more processors of the first SoC node is configured for accessing and processing instructions for causing the first SoC node to determine if the second SoC node has data stored thereon corresponding to a data identifier received by the first SoC node from a particular one of the one or more data processing systems. One or more processors of the second SoC node is configured for accessing and processing instructions for causing the second SoC node to provide the data stored thereon to the first SoC node using the respective remote memory access channel.

These and other objects, embodiments, advantages and/or distinctions of the present invention will become readily apparent upon further review of the following specification, associated drawings and appended claims.

DETAILED DESCRIPTION

Figure 1:
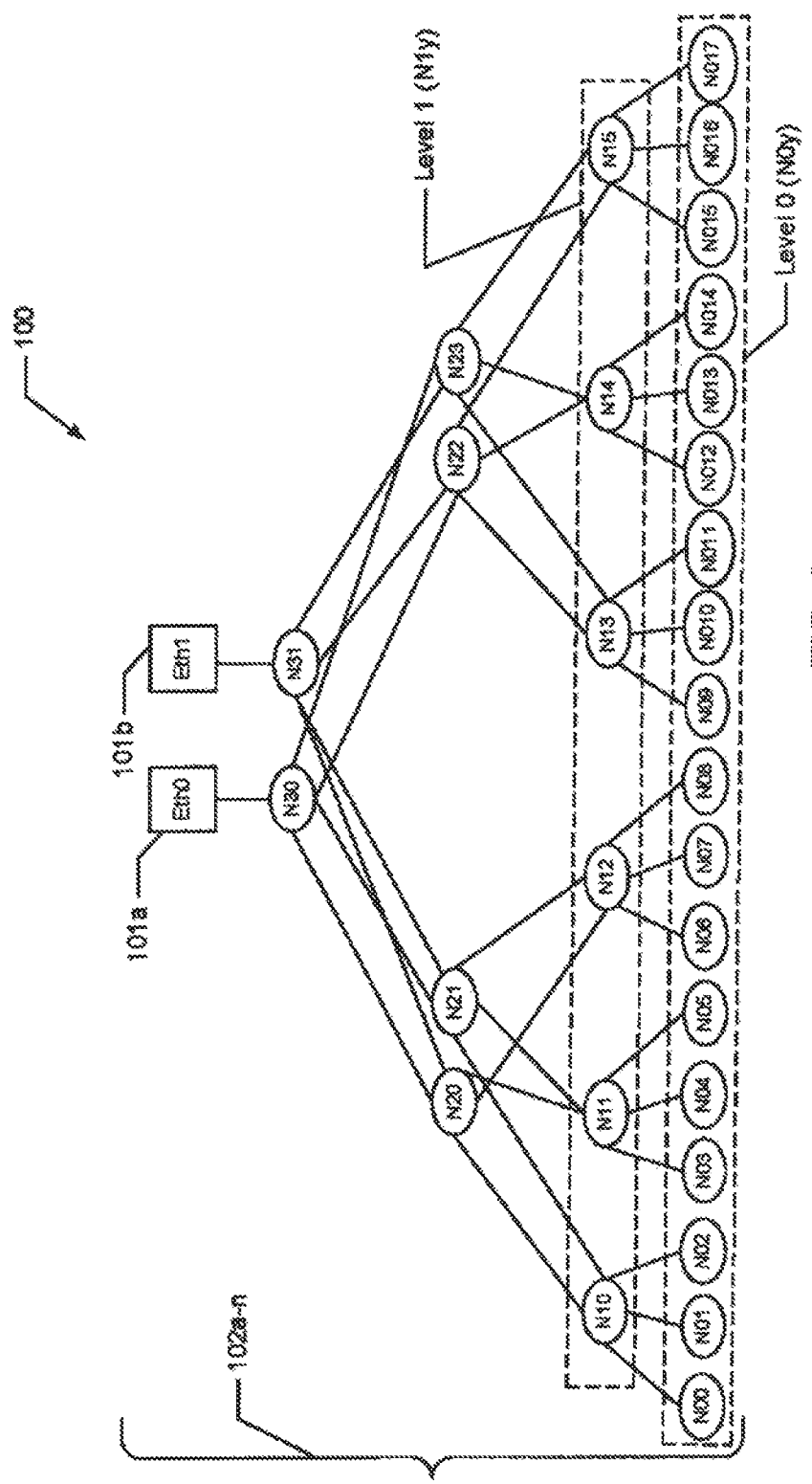
FIG. 1 is a high level diagram of a topology for a network system.

FIG. 1 shows an example of a high-level topology of a network system 100 that illustrates compute nodes connected by a switched interconnect fabric. Network ports 101a and 101b come from the top of the fabric to external network connectivity. These network ports are typically Ethernet, but other types of networking including Infiniband are possible. Hybrid nodes 102a-n are compute nodes that comprise both computational processors as well as a fabric packet switch. The hybrid nodes 102a-n have multiple interconnect links to comprise the distributed fabric interconnect (i.e., a node interconnect fabric that provides an inter-node communication channel between a plurality of SoC nodes).

A recommended implementation for the fabric interconnect is a high-speed SerDes interconnect, such as multi-lane XAUI. In the preferred solution, a four-lane XAU interconnect is used. Each of the four lanes can also have the speed varied from 1 Gb/sec (SGMII), XAUI rate (3.125 Gb/sec), and double XAUI (6.25 Gb/sec). The actual number of lanes and variability of speeds of each lane are implementation specific, and not important to the described innovations. Other interconnect technologies can be used that have a means to adaptively change the effective bandwidth, by varying some combination of link speeds and widths. Power consumption of a link is usually related to the delivered bandwidth of the link. By reducing the delivered bandwidth of the link, either through link speed or width, the power consumption of the link can be reduced.

Related application Ser. No. 12/794,996 (incorporated by reference) describes the architecture of a power-optimized, high performance, scalable inter-processor communication fabric. FIG. 1 shows a high-level topology 100 of a network system, such as described in the '996 Related Application, that illustrates XAUI connected SoC nodes connected by the switching fabric. The 10 Gb Ethernet ports Eth0 101a and Eth1 101b come from the top of the tree. Most, if not all of the hybrid nodes 102a-n comprise both computational processors as well as an embedded switch as described below in conjunction with FIGS. 2-3. The hybrid nodes 102a-n have five XAUI links connected to the internal switch. The switching layers use all five XAUI links for switching. For example, as shown in FIG. 1, level 0 leaf nodes 102d, e (i.e., N0n nodes, or Nxy, where x=level and y=item number) only use one XAUI link to attach to the interconnect, leaving four high-speed ports that can be used as XAUI, 10 Gb Ethernet, PCe, SATA, etc., for attachment to I/O. The vast majority of trees and fat tree-type network systems have active nodes only as leaf nodes, and the other nodes are pure switching nodes. This approach makes routing much more straightforward. Network system 100 has the flexibility to permit every hybrid node 102a-n to be a combination computational and switch node, or just a switch node. Most tree-type implementations have I/O on the leaf nodes, but system 100 lets the I/O be on any node. In general, placing the Ethernet at the top of the tree as at 101a/101b minimizes the average number of hops to the Ethernet.

In a preferred example, the hybrid nodes 102a-n shown in the tree-oriented topology of system 100 in FIG. 1 may represent independent nodes within a computing cluster. FIG. 1 illustrates one example implementation of individual nodes 102a-n of the cluster. When looking at a conventional implementation of a topology e.g. in FIG. 1, computing nodes are usually found in the lower level leaf nodes (e.g. N00-N017), and the upper level nodes do not have computing elements but are just network switching elements (N20-N31).

Figure 2:
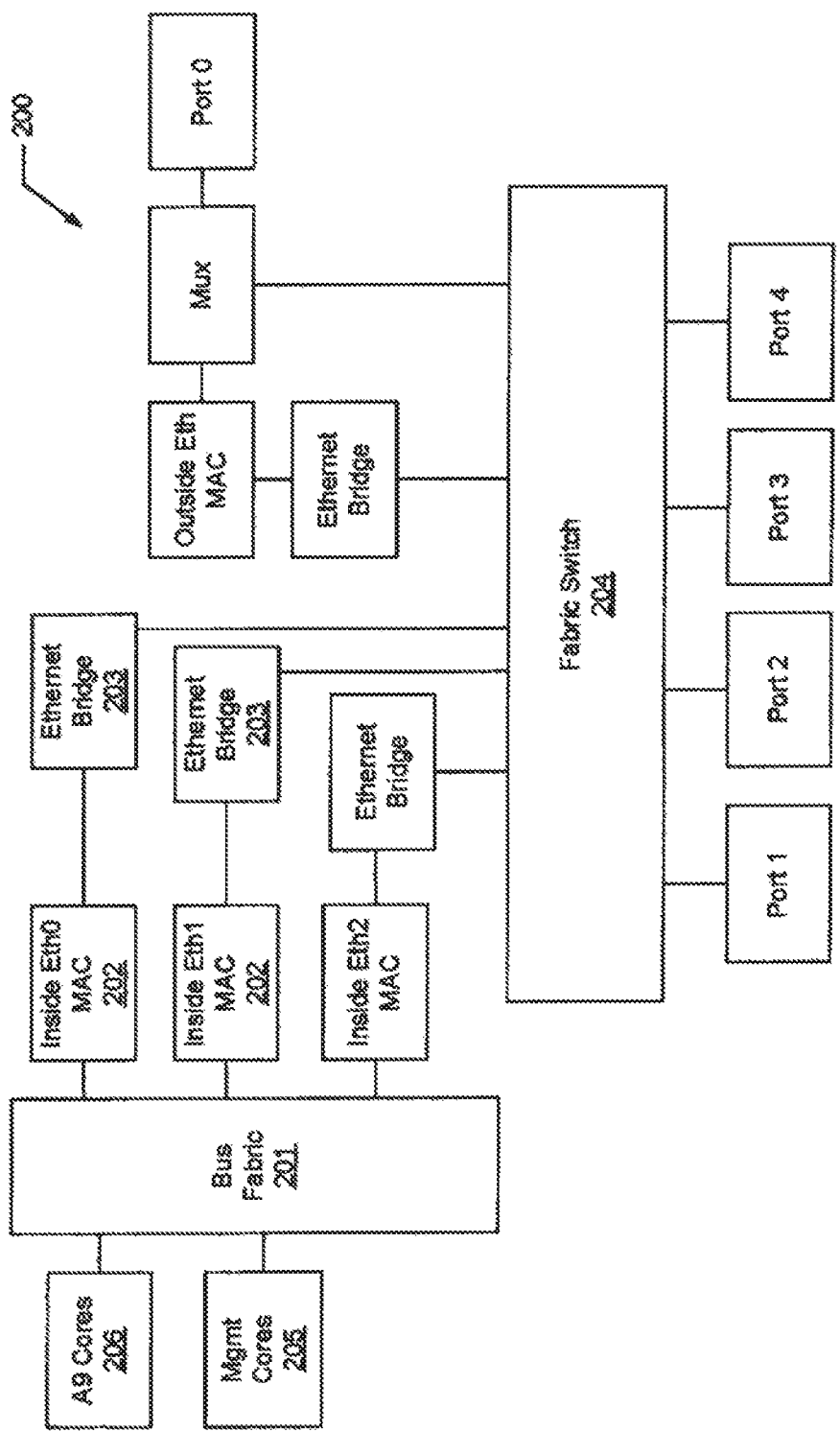
FIG. 2 is a block diagram of a network node in accordance with one embodiment of the present invention.

FIG. 2 illustrates one example of a "personality module" 200 in accordance with the present invention which is specifically designed for Ethernet protocol. Such an Ethernet personality module 200 can be used as a hybrid node for one or more of the nodes 102a-n of FIG. 1. With the node architecture shown in FIG. 2, the CPU Cores 206 of each personality module may be optionally enabled, or could be just left powered-off. With a personality module 200 used for the upper level switching nodes (N20-N30) in FIG. 1, the modules can be operated as pure switching elements (like traditional implementations), or the CPU Cores module 206 can be enabled and used as complete compute nodes within the computing cluster.

Note that the tree oriented interconnect fabric of FIG. 1 is simply one example of a type of server interconnect fabric. The concepts and inventions described herein have no dependency on the specific topology of interconnect fabric or protocol employed.

In more detail, the personality module 200 of FIG. 2 may be used as one or more of the hybrid nodes in the network system of FIG. 1. In FIG. 2, processors 205/206 communicate with the Ethernet MAC controllers 202 via the internal SOC processor bus fabric 201. Ethernet MAC controllers 202 generate Ethernet frames. The Ethernet Bridges 203 prepend a fabric routing header to the beginning of the Ethernet Frame. The Ethernet Bridges 203 contains the layer 2 Ethernet processing and computes the routing header based upon a distributed layer 2 Ethernet switch A skilled person will appreciate that processors utilized in embodiments of the present invention (e.g., processors 205/206) are not unnecessarily limited to any particular model or brand of processor.

The Ethernet Bridges 203 in FIG. 2 receives an Ethernet frame from the Ethernet MAC controllers 202 in FIG. 2, sending an augmented routing frame to the fabric switch 204. Note that all frames that are flowing within the fabric are routing frames, not Ethernet frames. The Ethernet frame/routing frame conversion is done only as the packet is entering or leaving the fabric via a MAC Note also that the routing logic within the switch may change fields within the routing frame. The Ethernet frame is never modified (except the adding/removing of the preamble, start of frame, and inter-frame gap fields).

The routing frame is composed of several fields providing sufficient data for the fabric switch 204 of FIG. 2 to make routing and security decisions without inspection of the underlying Ethernet frame which is considered an opaque payload. The resulting routing frame is thus a catenation of the routing frame header and the payload frame.

Related application Ser. No. 12/794,996 (incorporated by reference) disclosed in more detail an Ethernet protocol focused fabric switch. In the related '996 application two primary components are described:

An Ethernet Routing Header processor that inspects Ethernet frames, and adds/removes the fabric switch routing header.

The fabric switch that is responsible for transporting the packet between nodes by only using data from the routing header.

A key attribute of the Fabric Switch, 204 in FIG. 2, is that packets may be securely routed to their destination node/port by only using data in the routing header, without any inspection of the underlying data payload. Thus the data payload is considered opaque and invariant.

Figure 3:
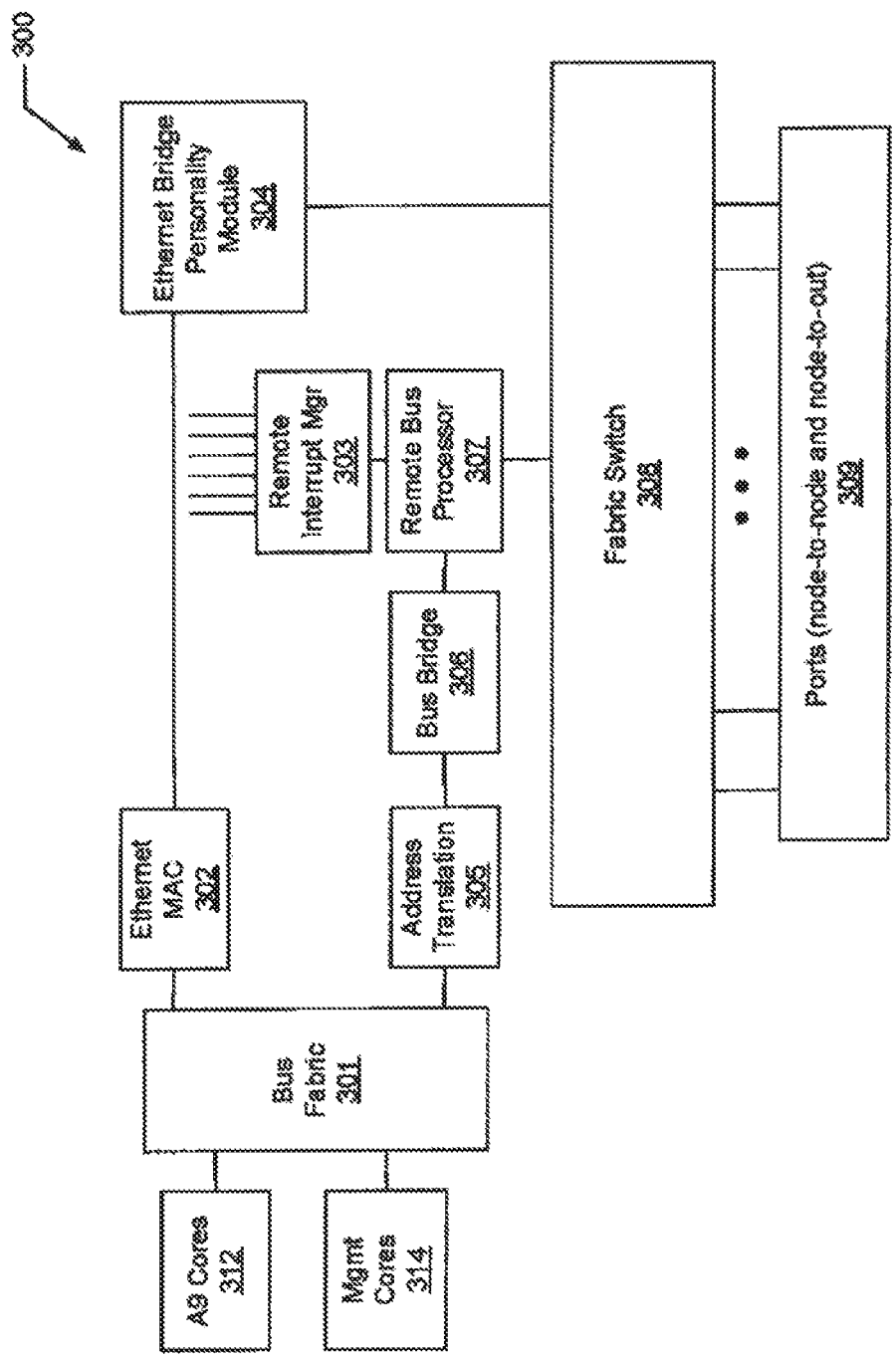
FIG. 3 is a block diagram of a network node in accordance with a second embodiment of the present invention.

FIG. 3 illustrates a preferred embodiment of a multi-protocol personality module 300 that is similar to the Ethernet protocol module of FIG. 2. The module of FIG. 3 is similar to the Ethernet fabric module of FIG. 2 in that it continues to be responsible for transporting packets between nodes by only using data from the routing header. However, the multi-protocol personality module 300 of FIG. 3 operates with multiple protocols to accommodate a network operating with different protocols. Protocol specific personality modules are added such that routing header processing is done in new and separate fabric personality modules that provide mappings from specific protocol semantics to fabric routing headers. The multi-protocol personality module 300 of FIG. 3, like the Ethernet module of FIG. 2, is responsible for adding a routing header for packets entering the fabric, and removing the routing header when packets are leaving the fabric. The routing header maintains in place as the packets are transported node to node across the fabric.

The multi-protocol personality module 300 of FIG. 3 includes a portion for processing Ethernet (302, 304) which function much like the module of FIG. 2, and a portion (e.g., components 303, 305, 306, 307) for allowing bus transactions to be transported across the fabric, offering the ability to remote memory, I/O, and interrupt transactions across the fabric. In some embodiments of the present invention, a Remote Bus Personality Module of the multi-protocol personality module 300 comprises the portion of the multi-protocol personality module 300 that allows bus transactions to be transported across the fabric thereby enabling the ability to remote memory, I/O, and interrupt transactions across the fabric. In this regard, the Remote Bus Personality Module enables functionality related to allowing bus transactions to be transported across the fabric thereby provides the ability to remote memory, I/O, and interrupt transactions across the fabric.

As can be seen from the block diagram of FIG. 3 depicting an exemplary multi-protocol module 300, the Fabric Switch 308 transports packets across nodes of inter-node fabric (i.e., an inter-node communication channel defined thereby) therebetween by inspection of only the routing header. The routing header is composed of several fields providing sufficient data for the fabric switch 308 to make routing and security decisions without inspection of the underlying opaque data payload. The resulting routing frame is thus a catenation of the routing frame header and the opaque payload frame. One example of a payload frame is an Ethernet frame. For example, as shown in Table I below, a routing frame might comprise:

TABLE 1

| Routing Frame Header | Ethernet Frame Packet | | | |
|---|---|---|---|---|
| RF Header | MAC destination | MAC Source | Ethertype/ Length | Payload (data and padding) | CRC32 |

An example of a routing header follows in Table 2, but the fields may vary by implementation:

TABLE 2

| Field | Width (Bits) | Notes |
|---|---|---|
| Domain ID | 5 | Domain ID associated with this packet. 0 indicates that no domain has been specified. |
| Mgmt Domain | 1 | Specifies that the packet is allowed on the private management domain. |
| Source Node | 12 | Source node ID |
| Source Port | 2 | 0 = MAC0, 1 = MAC1, 2 = MAC_management processor, 3 = MAC OUT |
| Dest Node | 12 | Destination node ID |
| Dest Port | 2 | 0 = MAC0, 1 = MAC1, 2 = MAC_management processor, 3 = MAC OUT |
| RF Type | 2 | Routing Frame Type (0 = Unicast, 1 = Multicast, 2 = Neighbor Multicast, 3 = Link Directed) |

TABLE 2-continued

| Field | Width (Bits) | Notes |
|---|---|---|
| TTL | 6 | Time to Live—# of hops that this frame has existed. Switch will drop packet if the TTL threshold is exceeded (and notify managment processor of exception). |
| Broadcast ID | 5 | Broadcast ID for this source node for this broadcast packet. |
| Checksum | | Checksum of the frame header fields. |

Since the Fabric Switch 308 makes routing decisions by inspection of only the routing header, and the data payload frame is considered both opaque and invariant, these characteristics can be leveraged to create an extensible set of personality modules. A multi-protocol personality module 300 such as shown in FIG. 3 provides a mapping from specific protocols to add and remove the fabric routing headers for that protocol.

When using a personality module 300 such as shown in FIG. 3 as a hybrid node 102a-n in the system of FIG. 1, as previously stated, all frames that are flowing within the fabric are routing frames, not Ethernet frames. The payload frame/routing frame conversion is done only as the packet is entering or leaving the fabric. Note also that the routing logic within the switch may change fields within the routing frame. The payload frame is never modified.

The Ethernet Bridge personality processor 304 in FIG. 3, is functionally identical to the Routing Header processor in Related application Ser. No. 12/794,996, but generalized from a single-protocol processor (such as FIG. 2), to a module having a number of protocol processing portions. The Ethernet Bridge Processor 304 adds the routing header as the packet comes from the Ethernet MAC 302 to the fabric switch 308, and removes the routing header as the packet comes from the fabric switch 308 to the MAC 302.

Similar to FIG. 2, the processors 312/314 communicate with the Ethernet MAC controllers 302 in FIG. 3 via the internal SOC processor bus fabric 301. Ethernet MAC controllers 302 generate Ethernet frames. The Ethernet Bridge 304 prepends a fabric routing header to the beginning of the Ethernet Frame. The Ethernet Bridge 304 contains the layer 2 Ethernet processing and computes the routing header based upon a distributed layer 2 Ethernet switch.

As disclosed above in reference to the multi-protocol personality module 300 of FIG. 3, the Remote Bus Personality Module includes the Remote Interrupt Manager 303, the Remote Address translation module 305, the Bus Bridge 306 and the Remote Bus Processor 307. In FIG. 3, the Bus Fabric 301 represents the internal bus fabric of a system on a chip (SOC) As discussed below, the SoC can be configured to provide server functionality and thus be referred to as a server on a chip. This bus fabric carries CPU mastered load/store transactions to memory and I/O, as well as I/O mastered transactions, e.g. initiated by I/O DMA controllers.

The functionality of the Remote Bus personality Module consists of
  The Remote Address translation module 305, which converts local addresses steered to the Remote Bus Personality Module (RBPM) to [Remote Node, Remote Node Address].
  The Bus Bridge 306, which converts a processor bus of arbitrary address and data width into a packed, potentially multi-flit packet In this regard, the Bus Bridge 306 converts a processor bus of arbitrary address and data width into packetized transfers across the fabric.
  The Remote Bus Processor 307, which adds and removes the fabric routing header, transports bus packets from Bus Bridge 306 and interrupts from Remote Interrupt Manager 303 over the fabric in-order with guaranteed delivery.

The Remote Address translation module 305 converts local addresses steered to the RBFPM to [Remote Node, Remote Node Address]. This is depicted in more detail in FIG. 4 which shows that there is a set of mapping tables from [local address, size] to [Node ID, Remote address]. This address translation can be implemented as a custom module, typically leveraging a CAM (Content Addressable Memory). Alternatively, this stage may be implemented with a standard IP block of an I/O MMU (memory management unit) which translates the intermediate physical address in a bus transaction to a physical address. In this case, these translation tables are configured so that the resulting physical address encodes the [Remote Node ID, and Remote Address].

The Bus Bridge 306 of FIG. 3 functions to interface to and packetize the CPU/I/O bus transactions. In this regard, the Bus Bridge 306 can function as a packetizer. This Bus Bridge 306 is conceptually designed as having a layered model. In any given implementation, these layers may or may not be present, and will have tuned functionality for the bus bridging that is being implemented.

The multiple layer design of the Bus Bridge 306 is:
Transaction layer
  The Transaction layer performs any necessary transforms that understand multiple bus channels or that understand the semantics of the transaction.
Transfer layer (also known as Transport layer)
  The Transfer layer performs any necessary transforms within a channel related to the overall data transfer. This could include data compression.
Data Link layer
  The Data Link layer performs arbitration, multiplexing and packing of channels to a physical packet representation.
  Implements any necessary flow control.
Physical layer
  The Physical layer performs transformation and optimization of the physical packet representation to packet size, width, and flit requirements to the fabric switch implementation. This Physical layer and/or the Link layer may actually produce multiple flits corresponding to a single physical bus packet.

The Remote Bus Processor 307 functions in a similar manner to the Ethernet Bridge Personality Processor 304 to add and remove the fabric routing header and transport bus packets from 306 to the fabric switch 308. Additionally, the Remote Bus Processor 307 connects interrupts from Remote Interrupt Manager 303 over the fabric with guaranteed delivery.

Example 1: Distributed One-Sided Cache Coherent Shared Memory Across the Fabric

In FIG. 1, one or more of the compute nodes could constitute servers, and the fabric connects two or more servers. The ability to open up memory sharing windows in another server across the fabric enables a wide-range of new capabilities that are not possible in traditional "shared nothing" clusters. In this example, the form that a load or store bus transaction issued by Server Node A is targeting a physical address in Server Node B. Such bus transactions may originate from any bus master in Node A, including processors, I/O bus masters (such as a SATA controller), or a DMA engine.

Figure 4:
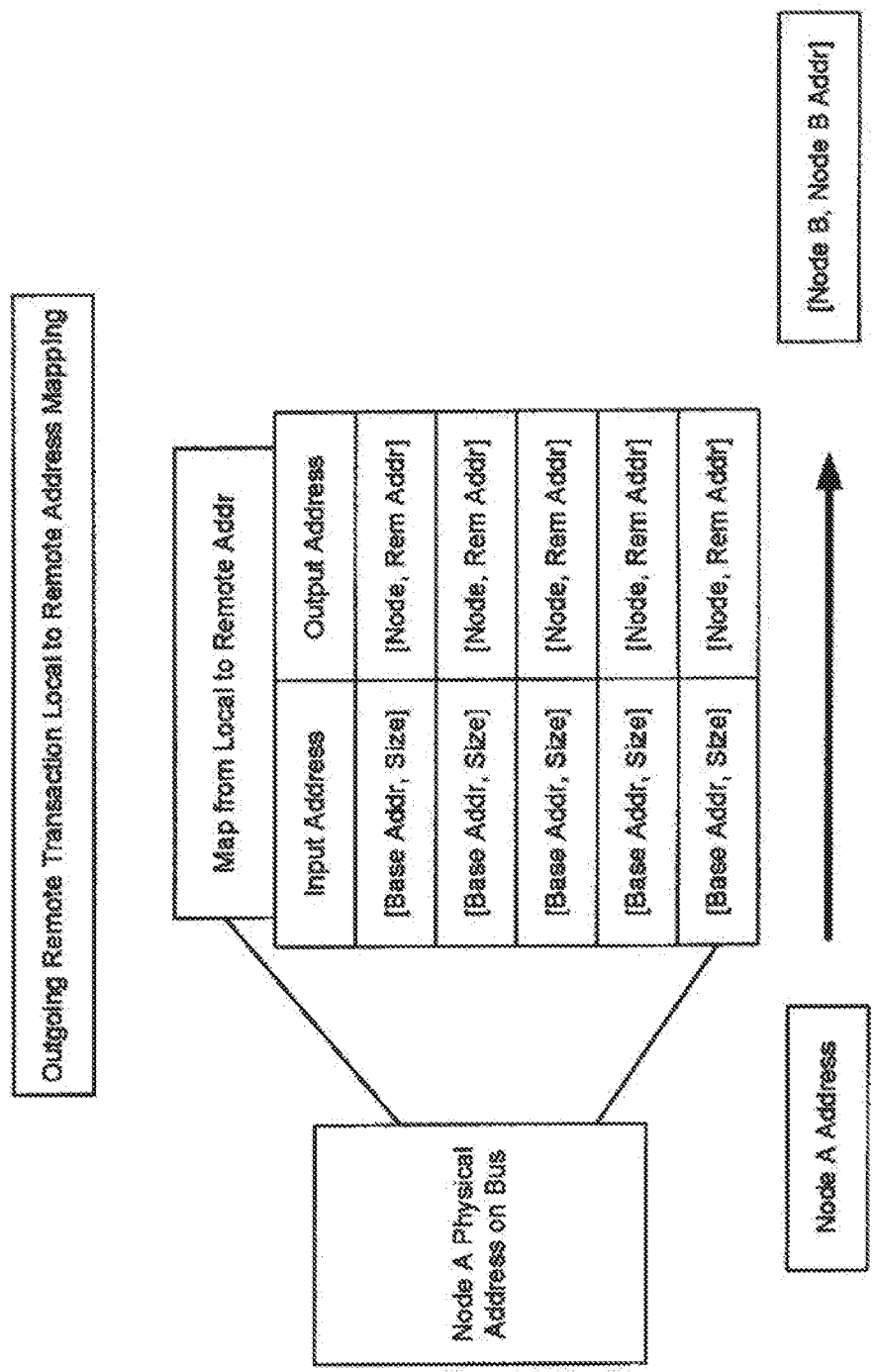
FIG. 4 is a diagram showing local to remote address mapping.

FIG. 4 illustrates the first stage of a remote shared memory access transaction using the Remote Bus Personality portion of the module of FIG. 3. As shown in FIG. 4, a bus master on Node A issues a load or store transaction to a range of physical addresses mapped to the Remote Bus Personality portion. The transaction appears as a bus transaction on FIG. 3, on Bus Fabric 301. The SOC busses of Bus Fabric 301, such as an ARM AXI, have configurable address and data widths, as an example 40 address bits, and 64-128 data bits.

The transaction flows through the Bus Bridge 306 as illustrated in FIG. 3 packetizing the bus transaction and creating one or more flits optimized for the fabric switch 308. The packetized transaction flows through the Remote Bus Processor 307 to create the routing header for the fabric. The remote bus packets are required to be delivered to destination server B in-order and with guaranteed delivery. If the underlying fabric and fabric switch do not implicitly have these characteristics, then the Remote Bus Processor 307 is required to implement in-order and guaranteed delivery.

The resulting routing frame flows into the fabric switch 308 on Node A, is routed through the intervening fabric (See FIG. 1), which may consists of multiple routing hops, and is delivered to the fabric switch on target Node B. For example, comparing FIG. 1, Node A might be node N30 and target Node B could be represented as node N014. The packet from fabric switch 308 of Node A is identified as a remote bus transaction, and is delivered to the Remote Bus Processor 307 on Node B.

Node B's Remote Bus Processor 307 implements the receiving side of in-order and guaranteed delivery in conjunction with the transmitting side. This can include notification of the sender of errors, missing flits, and request for retransmission. The Remote Bus Processor 307 of Node B then strips the routing header, sending the packetized transaction into the Bus Bridge 306. The Bus Bridge module 306 of Node B unpacks the packetized transaction (which may have included collecting multiple flits), and reconstitutes a valid transaction posted to Node B's bus. Any responses to that bus transaction are seen by this subsystem, and sent back to Node A following the same mechanism.

There are several functional and performance issues related to this cache coherency example First, coherent memory transactions issued by CPUs in node A will not snoop caches on remote nodes to maintain efficiency. Second, incoming remote transactions from a Remote Bus Personality section can be implemented as one-sided cache coherent. This means that incoming loads or stores can optionally be configured to snoop and perform coherency protocols against processor caches. Finally, this provides a powerful, easy to use cache coherent programming mode without the performance and availability problems related to a full CC-NUMA (cache coherent—non-uniform memory access) design.

Example 2: Remote Bus Personality Module—Remote Interrupts

In many SOC bus infrastructures, interrupts are individual lines that feed into an interrupt controller for the processor (s) such as the Remote Interrupt Manager 303 of FIG. 3. These individual interrupt lines are sometimes OR'd with each other to map multiple interrupt sources to a single interrupt line.

For example, if server A (such as Node N30 of FIG. 1) processor generates an interrupt on server B (such as Node N14 of FIG. 1): First, Server A writes to a remote CSR (control status register) on server B which maps to the requested interrupt, such as the an interrupt line of Interrupt Manager 303 of FIG. 3. The interrupt line is made active and interrupts the Remote Bus Processor 307 on server B.

As another example, an I/O interrupt on server A can be reflected to an interrupt on server B. An I/O controller on server A (like a SATA controller) raises an interrupt line that is being monitored by the Remote Interrupt Manager 303, FIG. 3. The Remote Interrupt Manager 303 gets woken by an interrupt line that it is being monitored Remote Interrupt Manager 303 creates a packet tagged as an interrupt packet and sends it into the Remote Bus Processor 307. This interrupt packet flows through the fabric as described above. When the interrupt packer reaches server B, the interrupt packet is delivered to Remote Bus Processor 307, which notes the specially tagged interrupt packet and sends it to the remote interrupt manager 303 of server B. Remote interrupt manager 303 causes the specified interrupt line to go active in server B.

Example 3: Remote Address Translation and Security

Referring to FIG. 3, block 314 is a management CPU core (See also Mgmt Core 205 of FIG. 2). This management CPU 314 is a key part of maintaining fabric security for remote bus transactions. The management CPU 314 maintains multi-node fabric transaction security on both sides of the transaction.

Each Remote Bus Processor 307 is allocated a range of addresses in physical address space. An exemplary process for the secure mapping of an address range from Server B into Server A's address space is as follows.

Figure 5:
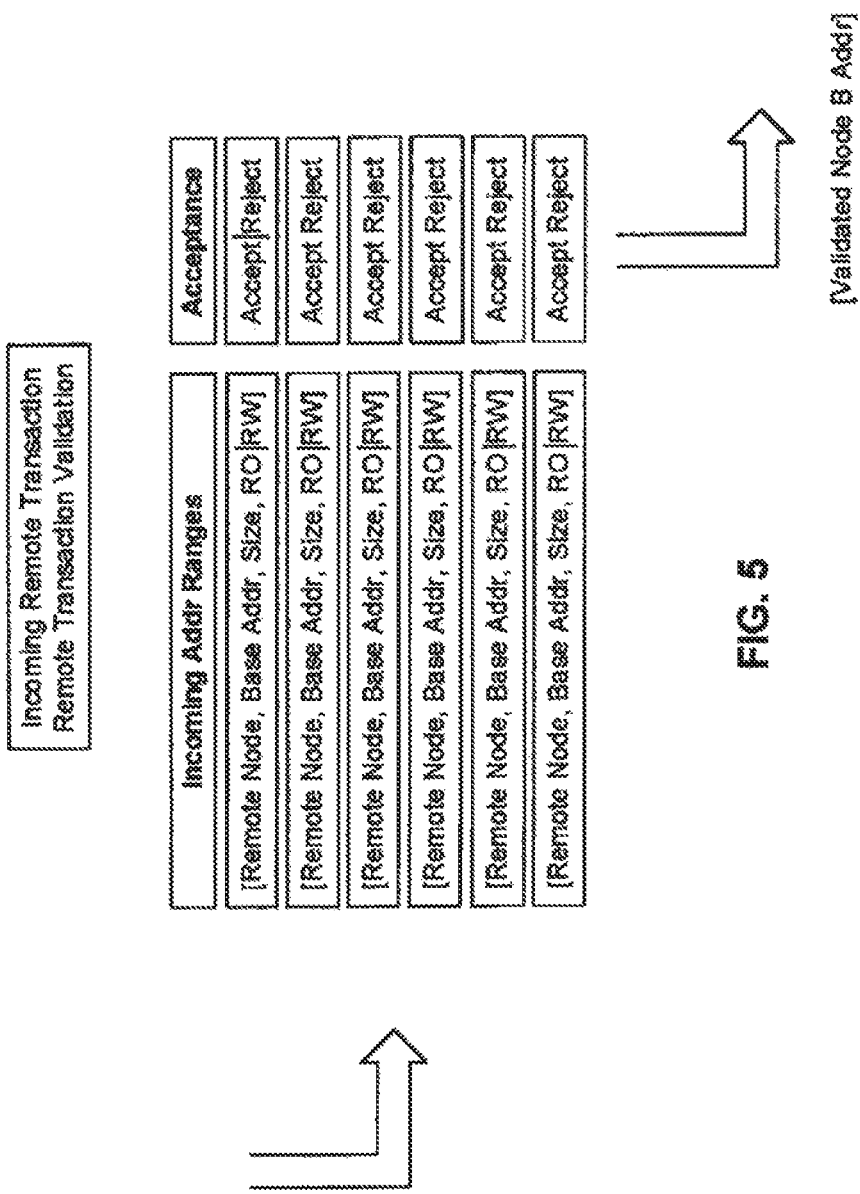
FIG. 5 is a diagram showing validation of a remote transaction.

1. Main OS processor on Server A (block 312 in FIG. 3) sends a mapping request of tuple (node #, physical address in node #'s address space, and window length) to local management processor.
2. Management CPU 314 on Server A has the ability to accept or deny the remote mapping request. Upon local acceptance, management CPU on server A sends a secure management request with the remote mapping request to management CPU 314 on server B.
3. Management CPU 314 on server B has the ability to accept or deny the remote mapping request from Server A.
4. Upon acceptance, management CPU 314 on server B installs a mapping into the I/O MMU on server B, mapping an IPA window to the requested physical address. Additionally the Remote Bus Processor 307 on server B installs a mapping that designates that remote node A has access to that window.
   Mappings can be granted as read-only, write-only, or read-write.
   These mappings are illustrated in FIG. 5.
   These mappings can be implemented using a standard IP block like an I/O MMU, or with custom logic typically using a CAM.
5. Management CPU 314 on server B returns the base intermediate physical address of the window.

6. Management CPU 314 on server A installs a mapping into the local I/O MIVIU mapping from an IPA window on server A to the server B IPA window base address.
7. Management CPU 314 on server A returns the allocated local IPA address for the requested window to the requesting client on the main OS processor 312.

In the described examples, DMA engines on both the local (server A) and remote (server B) sides can be used to hardware facilitate data movement in either direction. Users are not constrained to the classic push OR pull data movement model. Further, many SOC bus transaction models have some notion of trust or security zone associated with that bus transaction. As an example, ARM AXI has the notion of TrustZone, where transactions are marked as being in Trusted World or Normal World. The Remote Bus portion in the Personality Module 300 illustrated in FIG. 3 annotates the bus transaction packet with the trust or security zone with the incoming bus transaction. When the remote server (e.g. server B) is issuing the remote transaction into the local bus fabric, a configuration option is used to define whether the transactions get issued with either the security zone of the requesting processor, or issued at a specific security zone level.

Example 4: Remote Bus Personality Module I/O Physicalization

Figure 6:
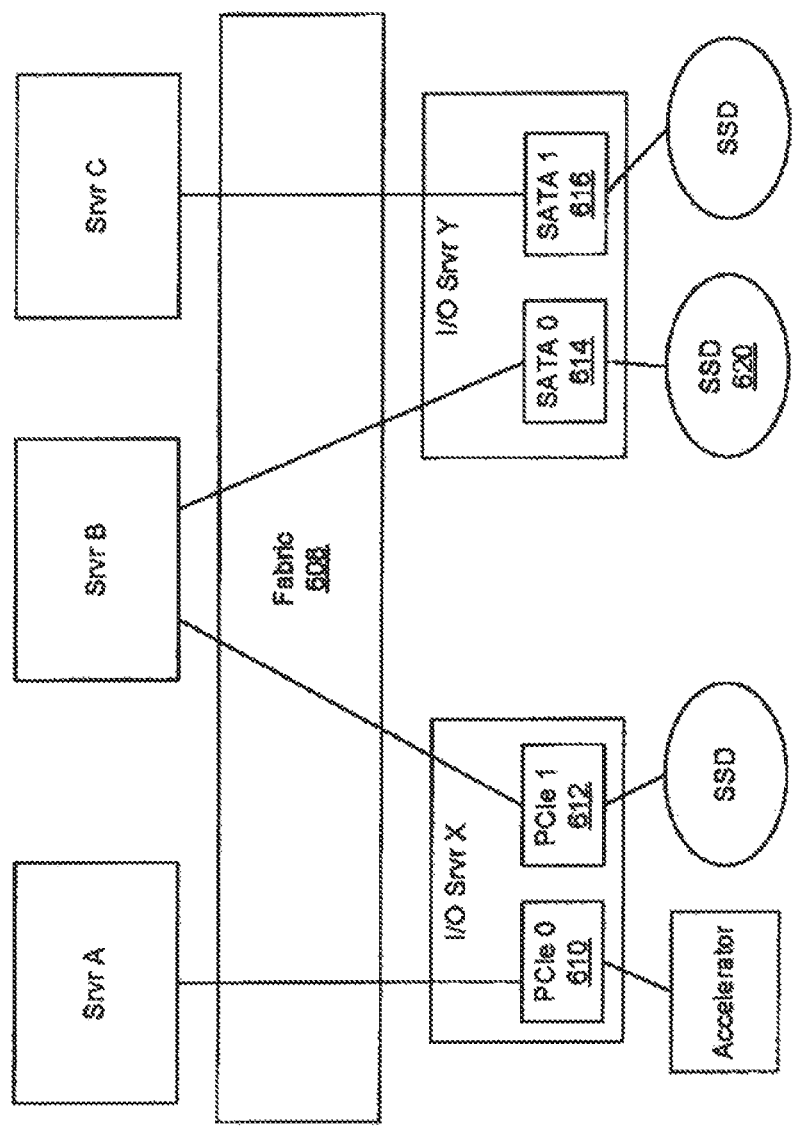
FIG. 6 is a schematic depicting an I/O physicalization.

FIG. 6 illustrates using the Remote Bus Personality portion of the Module 300 of FIG. 3 (i.e., the Remote Bus Personality Module) for I/O Physicalization. Some data center customers desire to have compute servers that have no embedded storage or I/O within the server, and then separate I/O boxes/chassis within the data center rack. The Remote Bus Personality Module of FIG. 3 allows multiple servers, designated as Srvr A, B, and C in FIG. 6, to use unmodified device drivers within the operating systems running in servers A, B, and C to access physically remote I/O devices across the server fabric. The server operating system, device drivers, and applications believe that they are communicating with server local devices. Use of the Remote Bus Personality Module of FIG. 3 allows the device/O and interrupts to the actual I/O device to be bi-directionally remoted across the fabric with no changes or visibility to software.

Device drivers running on CPUs in the Server boxes (A, B, C) of FIG. 6 access I/O registers transparently across Fabric 608 in the remoted peripheral controller cards, illustrated as remote PCIe controllers 610/612 and remote SATA controllers 614/616 in FIG. 6. Direct memory access ("DMA") engines am located either in the server boxes, or alternatively in the I/O boxes embedded within the peripheral controllers, and the DMA traffic is remoted bi-directionally transparently across Fabric 608. Additionally, interrupts generated by the remote peripheral controllers are transparently transmitted across Fabric 608 and presented to the processors in servers A, B, or C. In this manner, the Remote Bus Personality Module enables remote memory access functionality which includes the ability to allow memory capacity to be provisioned based on workload on a per-node basis, to load/store from remote memory, to perform remote DMA transactions, and to perform remote interrupts.

The address maps, both I/O and memory, and interrupt maps are maintained and transmitted transparently across Fabric 608. In this example, the data flow is completely optimized. An example storage block transfer from SATA controller 614/616 of FIG. 6 would typically become:

The device driver on Srvr B is reading a block from remote SATA 614 connected SSD 620 to a pre-allocated block buffer on a physical address PA1.
The device driver programs and initiates the read by writing the appropriate control registers in remote SATA controller 614.
Remote SATA controller 614 contains an embedded DMA engine which initiates the DMA, reading the data from the remoted SSD, and landing the data directly into physical address PA1 in Srvr B's address space.
No network communication or additional data copies were needed in this optimized transfer.

Figure 7:
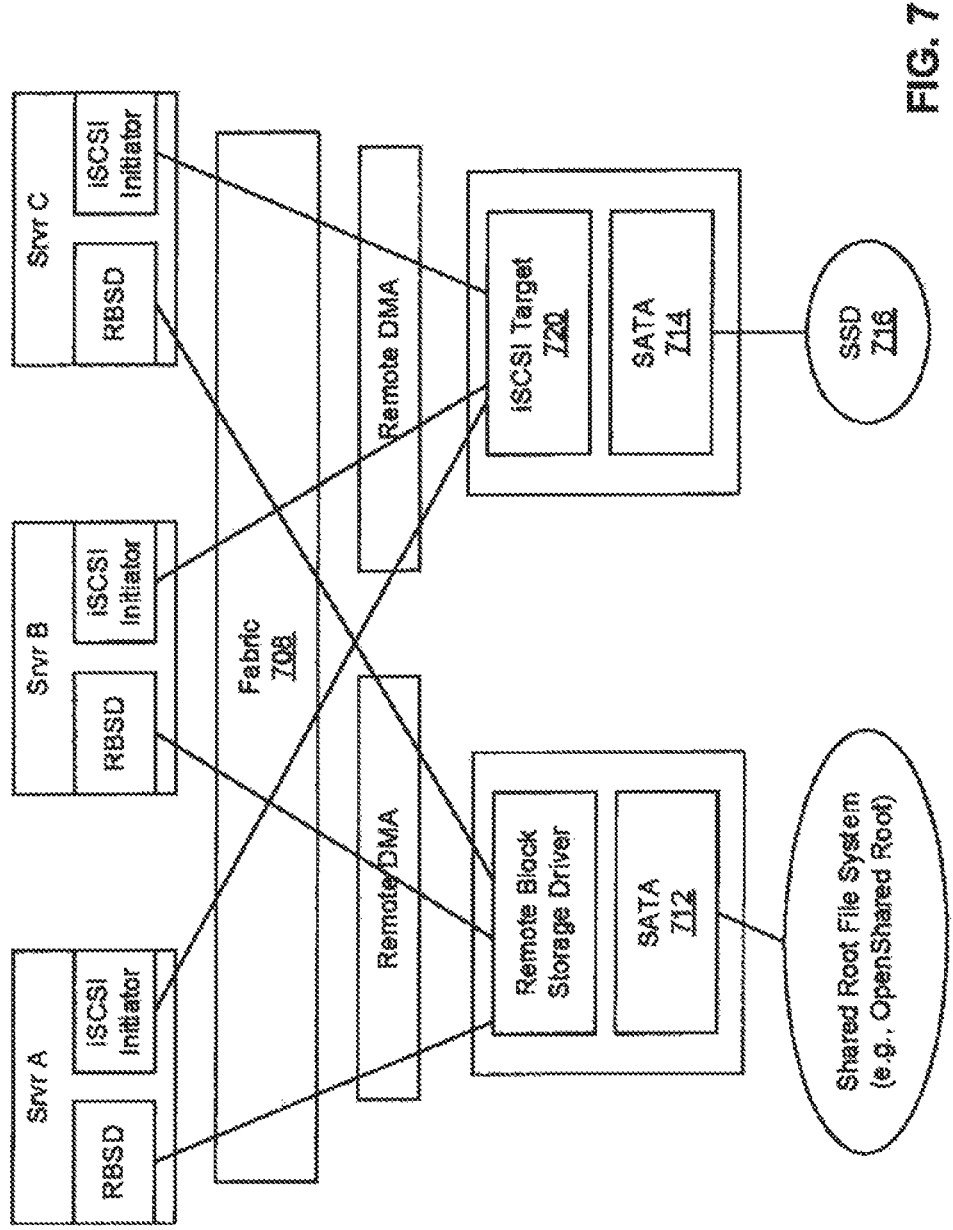
FIG. 7 is a schematic showing high performance distributed shared storage.

Example 5: Remote Bus Personality Module Enabling High Performance Distributed Shared Storage FIG. 7 illustrates an alternate distributed storage example. Distributed storage functionality is an embodiment of remote memory access functionality in which the remote memory is non-volatile memory (i.e., storage type memory), In this case the computational servers are illustrated as Srvr A, B, C. The I/O server boxes containing the storage peripherals in this use case have processors as well. This high performance shared storage example has one additional data movement from the example 4, I/O physicalization. But this example 5 adds the additional capabilities that the I/O devices and controllers can be shared by multiple servers.

In FIG. 7 a method of storage block transfer from a SATA controller is as follows.

The device driver on Srvr A is reading a block from remote SATA 714 connected SSD 716 to a pro-allocated block buffer on a physical address PA1.
The read is initiated by sending a lightweight message across Fabric 708 from Srvr A to Target I/O server 720 that contains the description of the read (device, block, size) and the physical address in Srvr A that the data should be moved to.
The driver on SATA device 714 on Target I/O server 720 initiates the DMA read to its local buffer from its local SATA controller.
Upon the completion of the DMA transfer to the I/O servers buffer, the device driver on the I/O server 720 uses a local DMA engine to initiate a fabric remoted DMA transfer from its local buffer to the physical address of the buffer in the requesting server's address space.
The device driver programs and initiates the read by writing the appropriate control registers in controller of remote SATA 714.

This example requires one additional data movement as compared to the I/O Physicalization example 4, but is far more efficient than a traditional network oriented SAN or NAS remote storage data movement.

The discussion now turns to disassociation of memory (e.g., preferably mutable memory) from a cluster of nodes while enabling those nodes the ability to do full load/store/barrier instructions to a memory pool (e.g., aggregation of memory resources provided at a centralized location) through allocation of memory of the memory pool to the nodes based on workload on a per-node basis. Such implementation is referred to herein as pooled memory functionality. Implementing pooled memory functionality in this manner supports allocation of memory privately on a per node basis and allocation of memory to all or a portion of the nodes in a non-coherent, shared manner. Furthermore, in view of the disclosures made herein, a skilled person will appreciate that remote memory access functionality in accordance with the present invention supports implementation of near shared memory using, for example, HMC (hybrid memory cubes) memory resources and supports implementation of far shared memory over a SoC node fabric using, for example, both HMC and DDR memory resources.

Figure 8A:
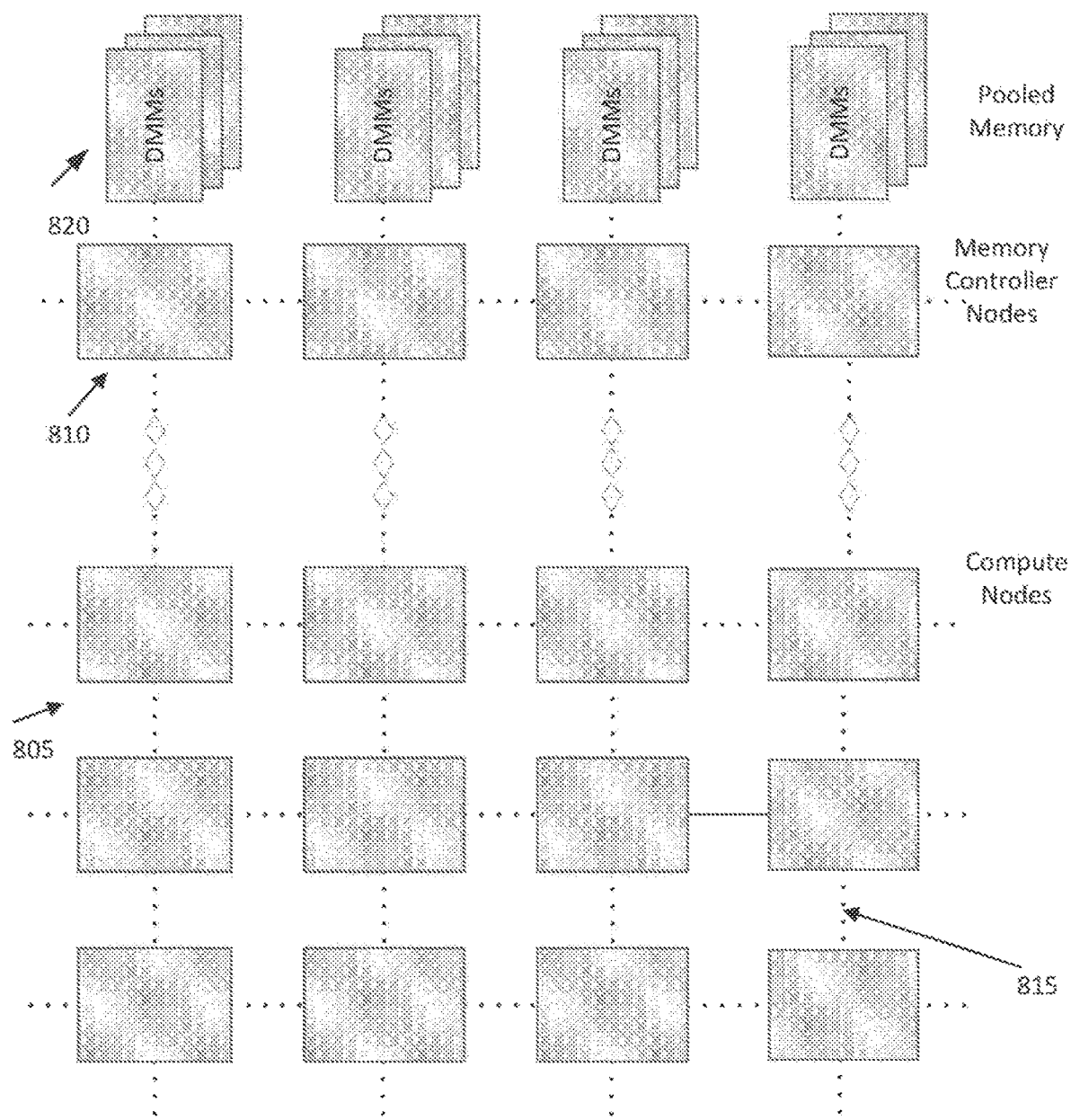
FIG. 8A is a diagram showing a node cluster architecture in accordance with one embodiment of the present invention.

A node cluster architecture 800 is shown in FIG. 8A. The node cluster architecture 800 is configured for providing remote memory access functionality in accordance with the present invention. More specifically, the node cluster architecture 800 includes a plurality of compute nodes 805 and a plurality of memory controller nodes 810 that are connected via a fabric 815 (i.e., links extending between fabric switches of interconnected nodes). Each one of the memory controller nodes 810 has memory 820 coupled thereto. Jointly, the memory 820 attached to all or a portion of the memory control nodes 810 is referred to herein as pooled memory. Preferably, aside from resident memory provisioning, the underlying architecture of the compute nodes 805 and the memory controller nodes 810 is entirely or substantially the same.

A plurality of the compute nodes 805 can be provided on a single card (i.e., a compute node card) and a plurality of the memory controller nodes 810 can be provided on a single card (i.e., a memory controller node card). The compute node card and memory controller node card can have identical overall planar dimensions such that both types of cards have a common or identical planar form factor, Each compute node 805 and each memory controller node 810 can have a plurality of SoC units thereon that provide information processing functionality. By definition, a compute node card will be populated more densely with SoC units that will be a memory controller node card. Preferably, but not necessarily, an architecture of the SoC units of the compute node cards is substantially the same or identical to that of the memory controller node cards, The compute nodes 805 are each provisioned (i.e., configured) with a limited amount of local memory 807 and are packaged together (i.e., integrated with each other) with the goal of optimizing compute density within a given form factor (i.e., maximizing computer density in regard to cost, performance, space, heat generation, power consumption and the like). The memory controller nodes 810 are provisioned with a relatively large amount of local memory and together provide the pooled memory resource at a chassis, rack or cluster level (i.e., to maximizing poled memory in regard to cost, performance, space, heat generation, power consumption and the like for a given form factor). Put differently, a compute node card has insufficient memory resources for enabling intended data computing performance (e.g., data processing throughput) of compute nodes thereof and a memory controller node card has insufficient node CPU resources for enabling intended data computing performance (e.g., put/get and/or load/store utilization) of the pooled memory thereof. In this regard, intended data computing functionality of the server apparatus requires that the server apparatus include at least one computer node card and at least one memory controller card.

Figure 8B:
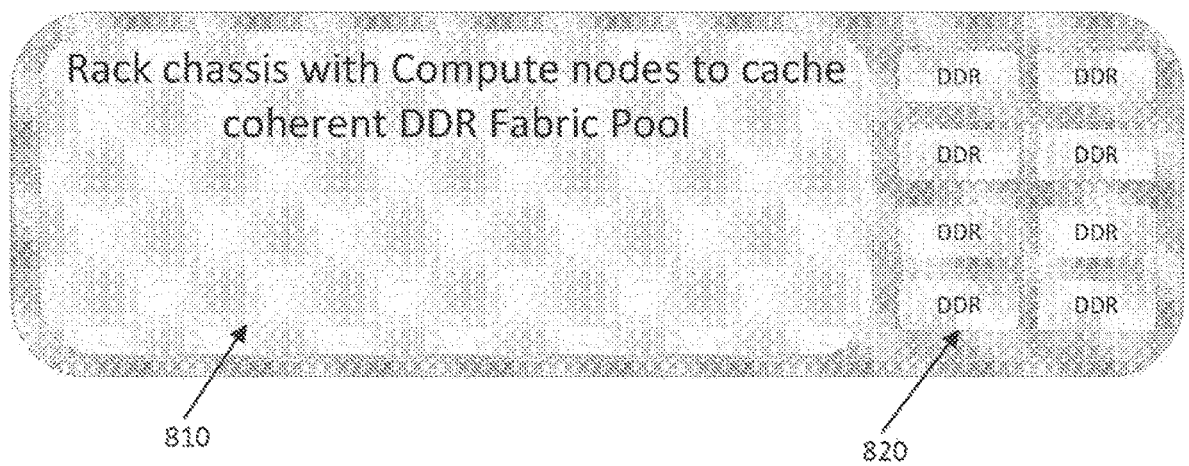
FIG. 8B is a diagram showing a memory controller node chassis in accordance with one embodiment of the present invention.
Figure 8C:
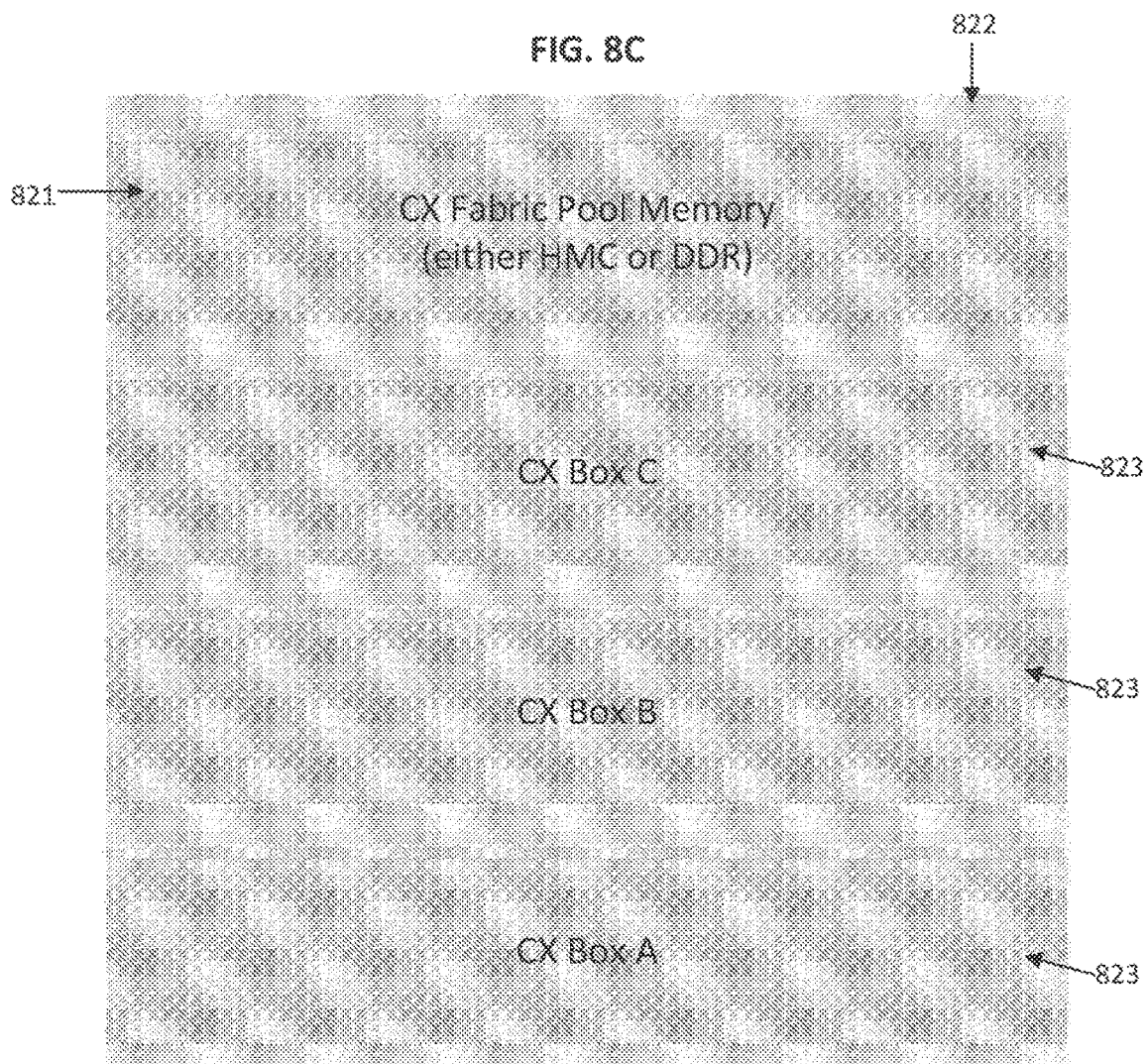
FIG. 8C is a diagram showing a rack with a plurality of compute node chassis utilized in a rack with the memory controller node chassis of FIG. 8B in accordance with one embodiment of the present invention.

Each compute node 805 can be allocated a portion of the pooled memory 820, which then serves as allocated memory to that particular one of the compute nodes 805. In this regard, the pooled memory 820 can be selectively allocated to and be selectively accessed by each one of the nodes (i.e., via pooled memory functionality). As shown in FIG. 8B, the one or more memory controller nodes 810 and associated pooled memory 820 (e.g., DDR as shown or HMC) can be implemented in the form of a memory controller node chassis 821. As shown in FIG. 8C, the memory controller node chassis 821 can be utilized in a rack 822 with a plurality of compute node chassis 823 that share memory resources of the memory controller node chassis 821. In this regard, one or more compute nodes 805 (or cards comprising same) and one or more memory controller nodes 810 with associated pooled memory 820 (or cards comprising same) can be referred to as a pooled memory server apparatus. It is also disclosed herein that a pooled memory server apparatus configured in accordance with the present invention can include a storage controller node chassis that is similar to the memory controller chassis except with storage resources (e.g., non-volatile storage resources such as hard disk drives) as opposed to memory resources (e.g., RAM).

In view of the disclosures made herein, a skilled person will appreciate that an underlying goal of the node cluster architecture 800 is to provide a fabric attached pool of memory (i.e., pooled memory) that can be flexibly assigned to compute nodes. For example, in the case of a dense node board such as that offered by Calxeda Inc under the trademark EnergyCard, every node of the compute node card (i.e., a plurality of nodes on a single board substrate) has a constrained, small number of DIMMs (e.g., every compute node having a constrained, small no. of DIMMs (e.g., 1)) and requires every node to have a relatively constrained amount of DRAM (e.g., every compute node to have something 4-8 GB of DRAM). But, in practical system implementations, some nodes will need different memory provisioning for specific requirements thereof (e.g., for Hadoop NameNode functionality, for Memcache functionality, for database functionality).

Pooled memory in accordance with embodiments of the present invention, which is attached to computer nodes though a fabric (i.e., fabric memory pools), support standardized dense node cards such as the Calxeda brand EnergyCard but allows them to be memory provisioned differently. In one specific implementation (shown in FIG. 8A), the bulk of the node cards in a cluster are cards with compute nodes (i.e., compute node cards). These compute node cards are configured with memory that is optimized with respect to capacity, power, and cost (e.g., one DIMM per channel). A variant of the compute node cards are cards are configured with associated pooled memory (i.e., pooled memory cards). The pooled memory cards, which are memory controller node cards in combination with associated pooled memory thereon, can be configured as maximum DRAM capacity cards. For example, the pooled memory cards can utilize multiple DIMMs per channel, RDIMMs at high densities (and higher power) or the like. This additional DRAM power is amortized across the fabric because there are likely a relatively small number of these pooled memory cards in comparison to compute node cards.

Embodiments of the present invention allow for pooled memory cards to be physically provisioned in a variety of different configurations. In support of these various physical provisioning configurations, pooled memory cards can be provisioned based on DIMM density (e.g., maximized DIMM density) or can be provisioned based on DRAM capacity (e.g., maximized DRAM capacity). In regard physical placement of the pooled memory cards, various rack and chassis positioned are envisioned. In one implementation (i.e., chassis provisioning), all or a portion of the pooled memory cards are configured for maximum DRAM capacity and serve as a chassis fabric memory pool. In another implementation (i.e., rack provisioning), a memory appliance (1U or 2U) is fabric connected within the rack using pooled memory cards are configured for maximum DRAM capacity. In another implementation (i.e., end of row provisioning), an entire rack is provided with pooled memory cards and serves as a memory rack that is at the end of a row of racks with computer nodes (i.e., compute racks). In still another implementation (i.e., distributed provisioning), all pooled memory cards are configured for maximum DRAM capacity and Linux NUMA APIs are used to create a distributed far memory pool. Additionally, Linux can even round-robin pages across the NUMA memory pool.

Figure 9:
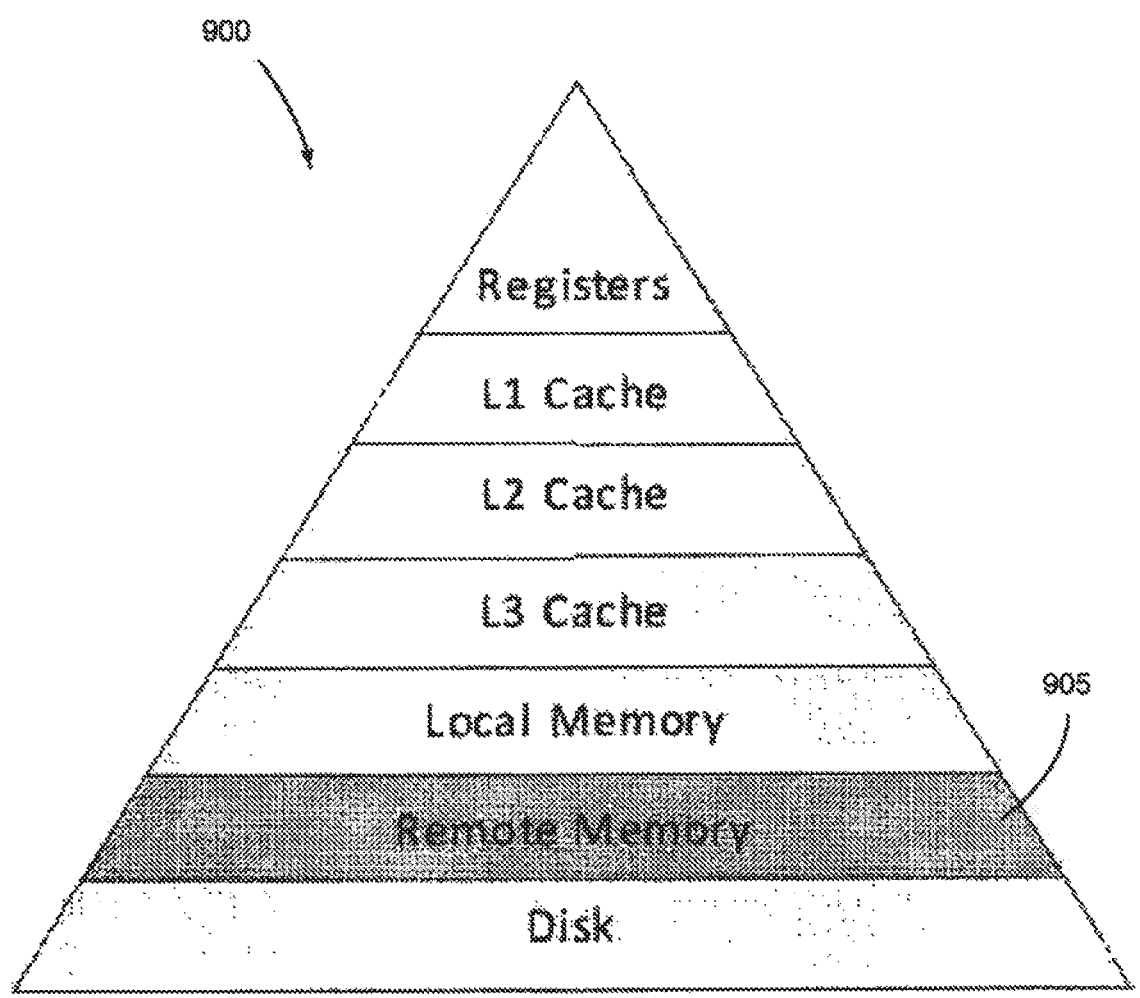
FIG. 9 is a diagram showing a memory hierarchy structure for computer nodes in accordance with one embodiment of the present invention.

FIG. 9 shows a memory hierarchy structure 900 of each one of the computer nodes 805. As shown, the memory hierarchy structure 900 of each one of the computer nodes 805 has various memory resources. Of particular interest to remote memory access functionality implemented in accordance with the present invention is Remote Memory Layer 905, which introduces an additional level into the memory hierarchy structure 900 of each compute node. The Remote Memory Layer 905 enables a SoC (i.e., system) architecture where memory resources can be pooled at the cluster level and allocated amongst the nodes in a cluster (i.e., a plurality of nodes interconnected by a fabric). The Remote Memory Layer 905 allows memory capacity per node to be changed based on workload needs by changing the amount of pooled memory that is provisioned per node. This disaggregation and pooling of memory resources at the cluster level provides for better overall memory capacity utilization and lower power. Furthermore, the Remote Memory Layer 905 supports two types of accesses to remote memory that is mapped into a node's physical address space: a) coarse-grain accesses that rely in virtual-memory paging and involves transferring pages between remote and local memories and, b) fine-grain accesses that trigger cacheline transfers from the remote memory as a result of loads/stores from a node's operating system CPU to remote memory.

Figure 10:
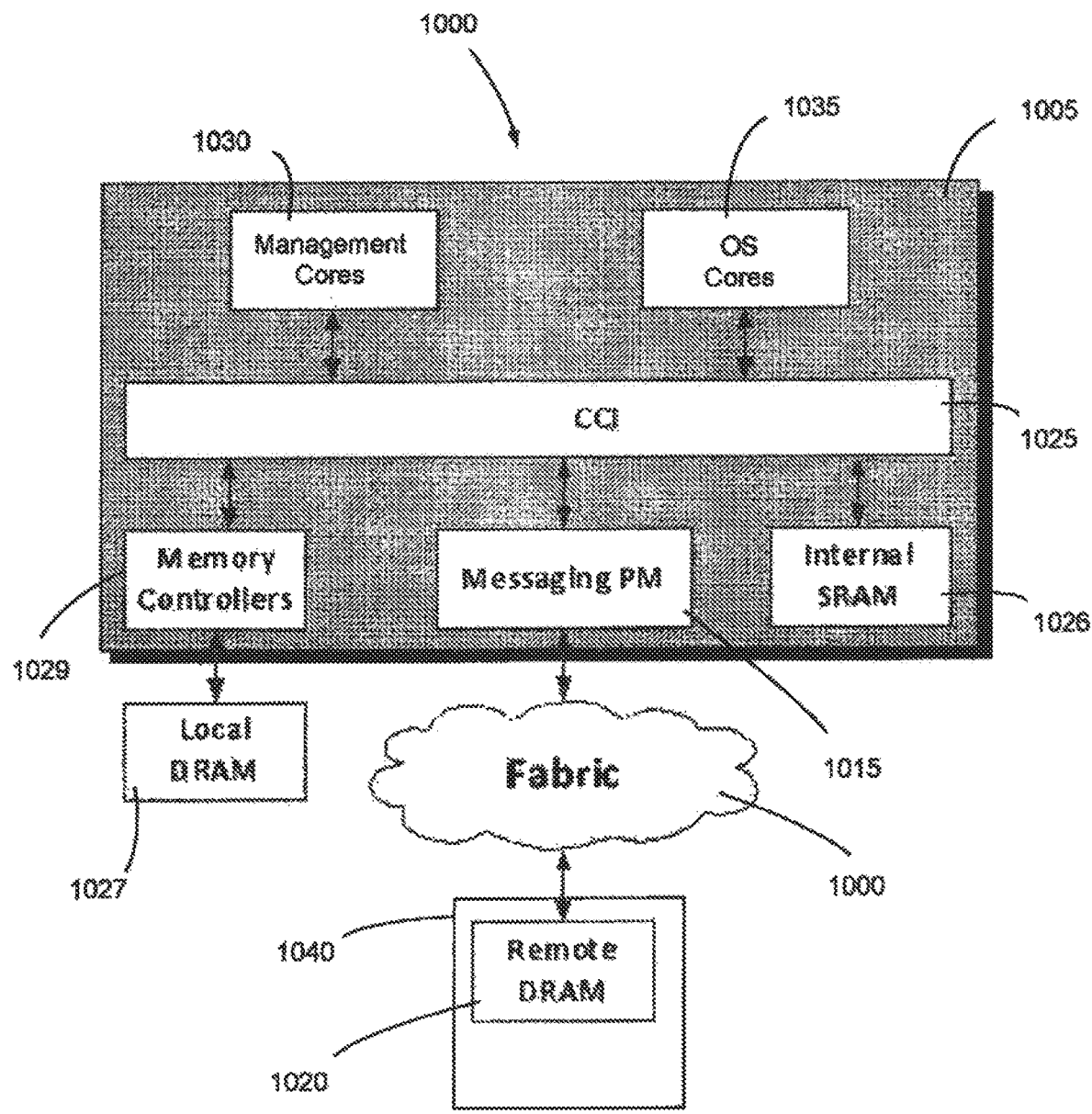
FIG. 10 is a diagram showing a functional block diagram configured for implementing remote memory access functionality in accordance with one embodiment of the present invention.

FIG. 10 shows a functional block diagram 1000 configured for implementing remote memory access functionality. The functional block diagram 1000 supports remote memory by a compute node 1005 (i.e., one of a plurality of computer nodes) across a fabric 1010. A Messaging Personality Module (i.e., the Messaging PM 1015) of the compute node 1005 serves as a hardware interface to remote DRAM 1020 (i.e., remote memory). The Messaging PM 1015 is connected to a cache coherent interconnect 1025 of the computer node 1005 such as through AXI Master and Slave interfaces thereof. The cache coherent interconnect 1025 has direct access to internal SRAM 1026 of the computer node 1005. Local DRAM 1127 (e.g., on a card level substrate on which the node is mounted) is coupled to the cache coherent interconnect 1025 via one or more memory controllers 129. Remote memory addresses of the remote DRAM 1020 are mapped to the Messaging PM 1005 through the AXI Master Port on the cache coherent interface 1025. Loads and stores to the remote DRAM 1020 by management cores 1030 (i.e., management processors) and operating system cores 1035 (i.e., OS processors) are diverted to the Messaging PM 1015, which then encapsulates these accesses in fabric packets and transports them to a memory controller node 1040 that serves the remote DRAM 1020 (i.e., the receiving controller node 1140). The memory controller node 1040 that serves the remote DRAM 1020 includes an instance of the Messaging PM. The receiving Messaging PM 1040 performs the requested access by reading or writing the local memory (e.g., local DRAM) of the memory controller node through its cache coherent interconnect.

In one embodiment, the functional block diagram 1000 is implemented via components of the multi-protocol personality module 300 discussed above in reference to FIG. 3. The Messaging PM 1005 can be embodied by the Remote interrupt Manager 303, the Remote Address translation module 305, the Bus Bridge 306 and the Remote Bus Processor 307. The cache coherent interconnect 1025 can be embodied by the bus fabric 301. The fabric 1010 can be implemented via one or more ports accessible to the fabric switch 308 for enabling access to the remote DRAM 1020.

In some embodiments of the present invention, the allocation of pooled memory (i.e., memory associated with one or more memory controller nodes) to individual compute nodes can managed by a cluster-level memory manager. This memory manager can be a software entity that is a standalone management entity or that is tightly integrated into other cluster-level management entities such as, for example, a job scheduler, a power management entity, etc. The allocation of the remote memory that is mapped into address space of a compute node to applications running on that computer node can be managed by an operating system (OS) or a virtual memory manager (VMM) using known virtual memory management and memory allocation techniques. For example, the OS and/or VMM can employ non-uniform memory access (NUMA) memory allocation techniques to distinguish between allocation of local memory and remote memory.

In view of the disclosures made herein, a skilled person will recognize that embodiments of the present invention enable various mechanisms of pooled memory functionality to be implemented. Pooled memory functionality is a specific implementation of remote memory access functionality. Examples of these mechanisms of pooled memory functionality include, but are not limited to, remote memory being mapped to physical address space of a node, load/store access being carried out from a CPU of a node, get/put access from user space, and DMA memory content transactions from remote memory to local memory. The benefits of these mechanisms of pooled memory functionality include, but are not limited to, disaggregated memory that can be used across multiple SoC generations, computer nodes can be assigned total memory based on workload characteristics, get/put into remote memory enables low-latency optimizations (e.g., via key/value stores, memcached, etc).

The remote memory architecture embodied within the functional block diagram 1000 can support two primary styles of pooled memory functionality. A first one of these styles of pooled memory functionality relates to shared remote memory. A second one of these styles of pooled memory functionality relates to disaggregated private memory. These use cases differ in whether an allocated portion of the pooled memory (i.e., remote memory) is mapped into the address space of a compute node and in how the allocated portion of the pooled memory is accessed.

The style of pooled memory functionality relating to shared remote memory involves remote memory get/put operations. In this style of pooled memory functionality, processor initiated bus cycles (i.e. load/stores) would not be directly remoted across the fabric. Rather, very low-latency user-space proxies for direct load/stores would be provided. These remote memory accesses represent get/put and/or load/store operations.

Figure 11:
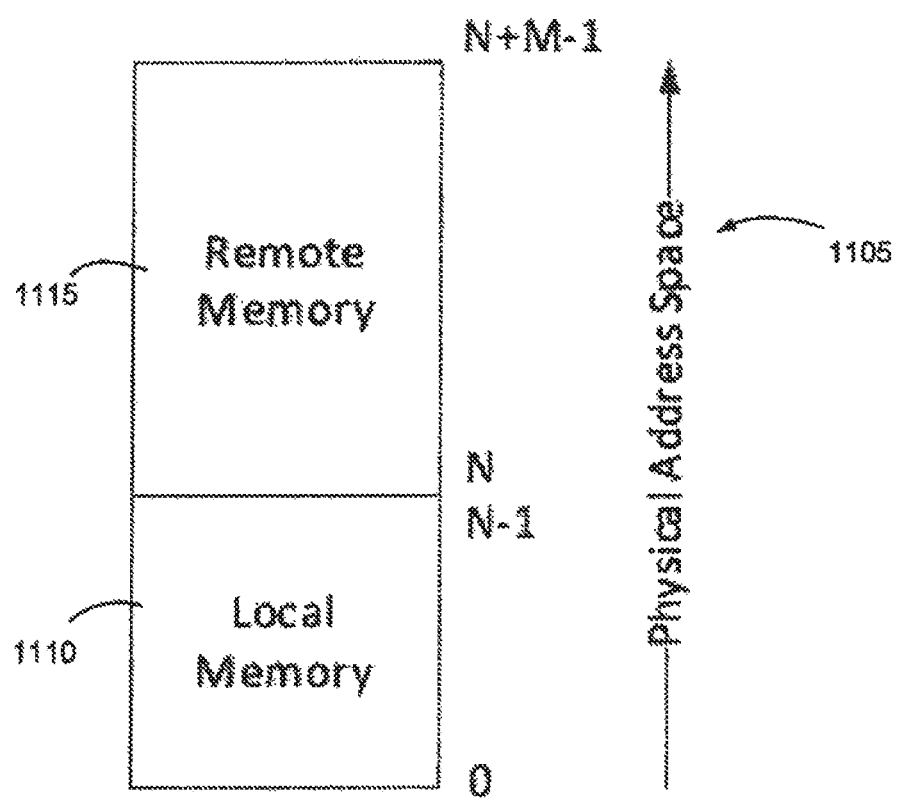
FIG. 11 is a diagram showing physical address space of a particular one of the compute nodes shown in FIG. 8.

In the case pooled memory functionality relating to disaggregated private memory, as shown in FIG. 11, a physical address space 1105 of a particular compute node (e.g., a particular one of the compute nodes 805 shown in FIG. 8A) has local physical memory 1110 residing at its bottom portion and has the allocated remote memory (i.e., allocated remote memory 1115) mapped into its higher physical addresses. The allocated remote memory is not shared with any other nodes but is cacheable by management and OS cores of the node. Furthermore, the allocated remote memory is not directly accessible by user-space applications. In other words, accesses to allocated remote memory use physical addresses generated either by the paging mechanism implemented by the OS/VMM or by a memory management unit of the node's central processing unit. Accesses to allocated remote memory will typically higher latencies compared to accesses to local memory. This is due at least in part to memory bandwidth of the allocated remote memory being constrained by bi-section bandwidth of the fabric interconnecting the computer nodes and will likely be lower than the memory bandwidth of the local memory. Therefore, well-known memory hierarchy concepts such as caching and pre-fetching can be utilized for optimizing accesses to the allocated remote memory.

A primary goal of disaggregated private memory is to provide a fabric attached pool of memory (i.e., fabric attached pooled memory) that can be flexibly assigned to compute nodes. Native load/store transactions supported over a fabric, Examples of these native load/store transactions include, but are not limited to, transactions associated with global fabric address space, transactions associated with compute nodes carrying out read/write operations to remote memory, and transactions associated with remote DMA of memory content into physical memory of a compute node. In implementing disaggregated private memory in accordance with embodiments of the present invention, compute nodes will have private memory (e.g., private mutable memory) and can share a pool of fabric accessible memory (e.g., cacheable, non-coherent shared memory). Furthermore, fabric pool memory configured in accordance with embodiments of the present invention can be implemented within a chassis or across a largest possible fabric (e.g., across one or more rack).

Implementations of disaggregated private memory as disclosed herein can be considered as a class of remote NUMA memory (i.e., one-sided cache coherent which is also known as I/O coherent). For example, certain commercially available operating systems (e.g., Linux brand operating systems) have support for NUMA memory in the form of a NUMA subsystem, More specifically, Linux brand operating systems have NUMA awareness such as via numactl (e.g., control NUMA policy for processes or shared memory), Lib numa (e.g., NUMA policy API), and enhanced topology detection. Additionally, malloc-type memory allocation functionality is configured to ensure that the regions of memory that are allocated to a process are as physically close as possible to the core on which the process is executing, which increases memory access speeds. A node cluster architecture configured in accordance with the present invention can be configured to integrate with such a NUMA subsystem for allowing kernel and applications to have control of memory locality without having to expose new APIs and malloc-type memory allocation functionality for increasing memory access speeds.

Implementations of disaggregated private memory as disclosed herein can utilize device controllers (e.g., memory device controllers) that are physically allocated to remote nodes. This type of implementation is exemplified herein in the discussion relating to Example 4 and FIG. 6. Utilizing device controllers that are physically allocated to remote nodes allows the centralization of memory controllers and memory devices on a set of nodes. For example, the memory controllers and memory devices can be allocated to remote nodes at run-time whereby drivers continue to run on nodes acting as servers, drivers directly access remote memory controllers (e.g., of memory controller nodes), and DMA/interrupts are implemented transparent over the fabric that interconnects the nodes.

Example 6: Memcached Server Revolution

Figure 12:
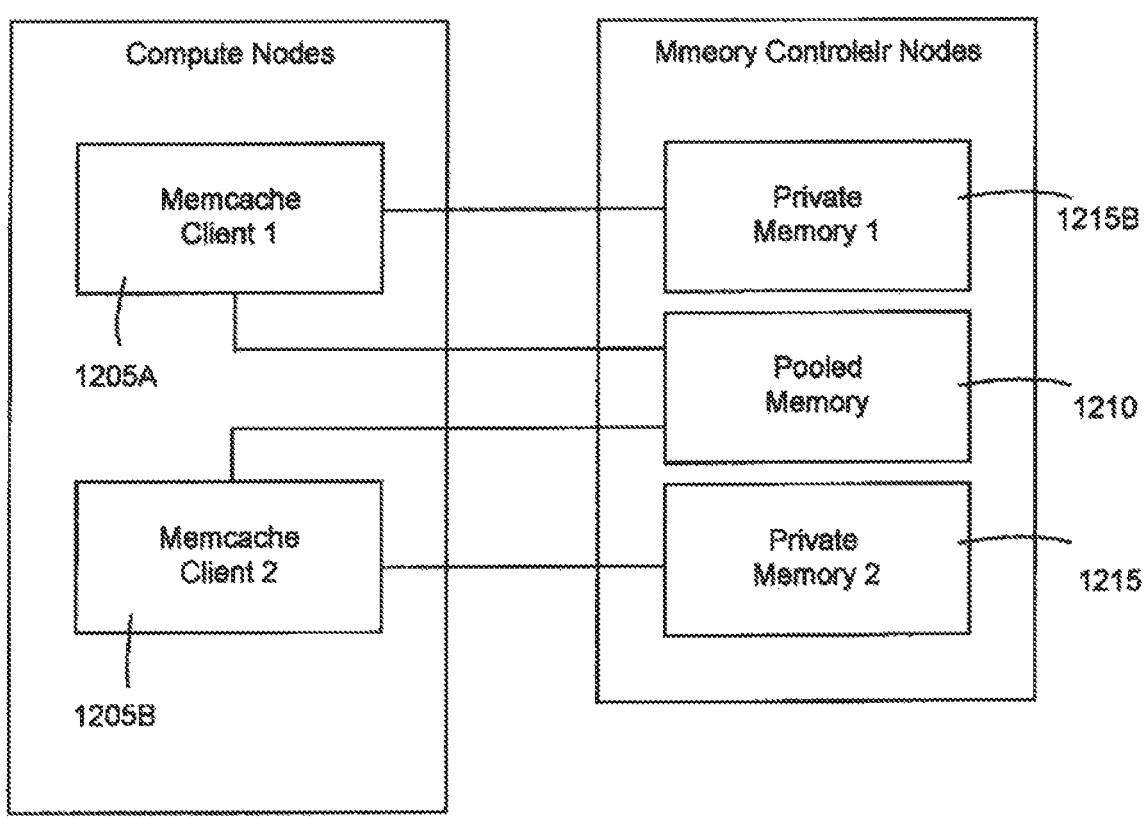
FIG. 12 is a diagram showing an embodiment of the present invention configured for providing memcached server functionality.

FIG. 12 illustrates an embodiment of the present invention configured for providing memcached server functionality 1200. The memcached server functionality 1200 utilizes pooled memory disclosed herein in accordance with the present invention. Memcached server functionality in accordance with the present invention is applicable to a large class of key-value store storage. Advantageously, implementation of the memcached server functionality 1200 in accordance with the present invention allows memcached clients 1205A, 1205B (e.g. web servers) to reach back to a pooled memory 1210 (i.e., memcached memory pool) to get cached values of data without having to go back to their respective database tier. For example, the pooled memory 1210 can be implemented as NUMA fabric pooled memory. The memcached clients 1205A, 1205B can be embodied by one or more compute nodes that are each allocated respective private mutable private memory 1215A, 1215B from pooled memory associated with one or more memory controller nodes. To this end, the memcached clients 1205, the pooled memory 1210, and the private mutable private memory 1215 can be embodied by the pooled memory server apparatus discussed above in reference to FIGS. 8a-8c.

The memcached clients 1205A, 1205B each map access information (e.g., a key) directly and reach into the pooled memory 1210 to obtain the data with a direct memory load. In this manner, unlike the traditional memcached approach, there is no networking needed for access memcached data. Each one of the memcached servers 1210a-e hashes into local DRAM and returns the hashed value over TCP/IP or UDP, which serves as the communication protocol between the memcached servers and each one of the memcached clients 1205.

In regard to a specific example in which a cluster of SoC nodes (i.e., including Node A and Node B) that are interconnected by a node interconnect fabric, Node A (e.g., through web server functionality thereof) requests an account lookup for Account #100. Web server request goes through a Memcached client API into a memcached client library with a cache data request for Key ID #100. The memcached client library hashes Key ID #100 to the memcached server that holds that data whereby it hashes to Node B that is providing memcached server functionality. The memcached client library determines that Node A and Node B have a remote memory capable fabric between them (e.g., are configured for providing remote memory access functionality in accordance with the present invention). The memcached client library on Node A performs a server-side hash of Key ID #100 and uses a remote memory access to node B to determine if this data is currently encached and, if so, the memory address that contains the data. In the case where it is determined that the data is currently encached, the memcached client library on Node A directly access the remote cached data from Node B's memory address space (e.g., memory address space of Node B's memcached server functionality). The memcached client library then returns the data to the requesting web server on Node A.

Example 7: High Frequency Trading Backend

In support of high frequency trading, stock exchange tick data can stream as multicast packets at rates up to 6 MB/sec or more. The tick data can be highly augmented with derived data thereof. A fabric memory pool apparatus is used to store the tick data in one place and accessed by a plurality of trading servers. Referring to the pooled memory server apparatus discussed above in reference to FIGS. 8a-8c, the fabric memory pool apparatus can be embodied in the form of the memory controller node chassis 821 and the trading servers can be embodied in the form of the compute node chassis 823, The tick data is only appended such that the tick data does not have to be multicast and replicated. Furthermore, all compute nodes of the trading servers get direct read-only shared access to the tick data (i.e., via pooled memory of the memory controller nodes) whereby the tick data is still CPU cacheable for frequently accessed data.

Example 8: Message Passing Interface Remote Memory Access (One Sided)

The underlying premise of message passing interface (MPI) remote memory access (RMA) relates to any allocated memory is private to the MPI process by default. As needed, this allocated private memory can be exposed to other processes as a public memory region. To do this, an MPI process declares a segment of its memory to be part of a window, allowing other processes to access this memory segment using one-sided operations such as PUT, GET, ACCUMULATE, and others, Processes can control the visibility of data written using one-sided operations for other processes to access using several synchronization primitives. Referring to the pooled memory server apparatus discussed above in reference to FIGS. 8a-8c, memory of the MPI process can be embodied in the form of the memory controller node chassis 821.

MPI 3rd generation (i.e., MPI-3) RMA offers two new window allocation functions. The first new window allocation function is a collective version that can be used to allocate window memory for fast access. The second new window allocation function is a dynamic version which exposes no memory but allows the user to "register" remotely-accessible memory locally and dynamically at each process. Furthermore, new atomic operations, such as fetch-and-accumulate and compare-and-swap offer new functions for well-known shared memory semantics and enable the implementation of lock-free algorithms in distributed memory.

Example 9: Partitioned Global Address Space Languages (PGAS)

Figure 13A:
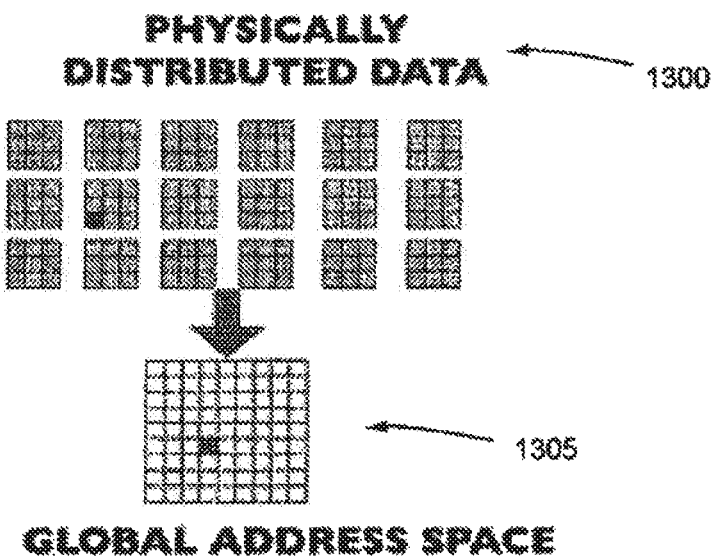
FIG. 13A is a diagram showing an embodiment of the present invention configured for implementing memory storage functionality using Partitioned Global Address Space (PGAS) languages.
Figure 13B:
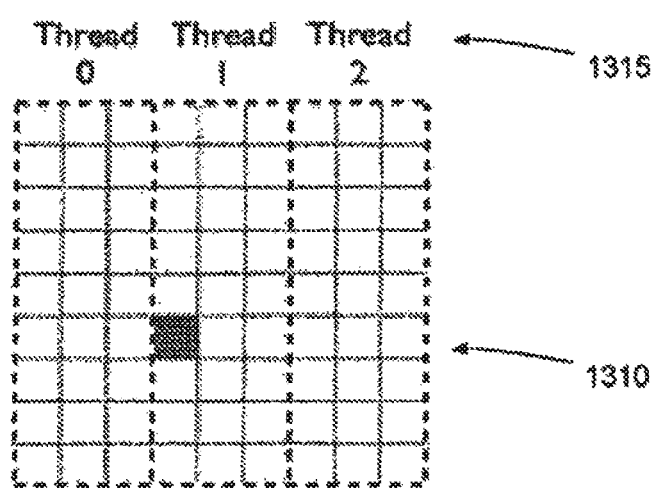
FIG. 13B is a diagram showing a global memory space that is partitioned between participating threads for pooled memory functionality using PGAS languages.

Examples of common PGAS languages include, but are not limited to, Unified Parallel C, Co-Array Fortran, Titanium, X-10, and Chapel. As shown in FIG. 13A, in these PGAS languages, memory distributed over many compute nodes (i.e., distributed memory 1300) is seen as one global memory (i.e., global memory 1305) that can be accessed by all the processes without requiring explicit communication like in MPI. Hidden communication is based on one-sided communication. As shown in FIG. 138, PGAS languages introduce the concept of a global memory space 1310 that is partitioned between the participating threads 1315 (e.g., ranks in MPI) with each process being able to access both local memory (e.g., distributed memory 1300 local to a particular computer node) and remote memory (e.g., distributed memory 1300 local to a different computer node than the particular computer node). Access to local memory is via standard sequential program mechanisms whereas access to remote memory is directly supported by the new features of the PGAS language and is usually done in a "single-sided" manner (unlike the double-sided of MPI). The single-sided programming model is more natural than the MPI alternative for some algorithms. In accordance with embodiments of the present invention, RDMA and remote memory functionalities allow efficient PGAS capability to be provided. Referring to the pooled memory server apparatus discussed above in reference to FIGS. 8a-8c, the global memory 1305 can be embodied in the form of the memory controller node chassis 821.

Example 10: Disaggregated Server Resources

Currently, disaggregation of server resources is limited to separating compute resources (e.g., CPU and RAM) from storage via separate chassis that are connected via an interface such as, for example, PCIe or SAS. However, data centers and other types of server operating entities will benefit from disaggregation of CPU resources, storage resources, and memory resources. This will allow server operating entities to replace/update CPU resources, storage resources, and memory resources (i.e., server resources) at their respective lifecycle timeframe without having to replace/update one server resource at the particular lifecycle timeframe of another server resource Advantageously, embodiments of the present invention can provide for such disaggregation of CPU resources, storage resources, and memory resources. In particular, embodiments of the present invention provide for the disaggregation of RAM (i.e., memory resources) from compute node cards (i.e., CPU resources) so that CPU resources can be replaced/updated as new CPU resources (e.g., processors) are released whereas memory resources (e.g., RAM, non-volatile storage, etc) can remain in use as long as they are efficient and/or effectively functional. To this end, referring to the pooled memory server apparatus discussed above in reference to FIGS. 8a-8c, the memory resources can be embodied in the form of the memory controller node chassis 821 (i.e., a first physical enclosure unit), the CPU resources can be embodied in the form of the compute node chassis 823 (i.e., a second physical enclosure unit), and the storage resources can be embodied in the form of the storage controller node chassis (i.e., a third physical enclosure unit). Memory resources can be in the form of one or more HMCs.

Example 11: Hybrid Memory Cube (HMC) Deployed Near Memory Pool

Figure 14A:
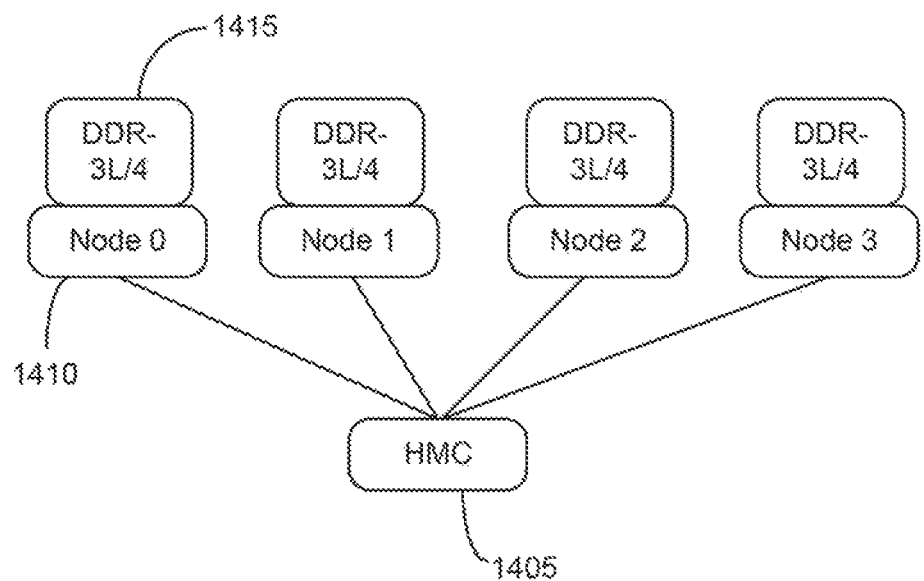
FIG. 14A is a diagram showing an embodiment of the present invention configured for implementing hybrid memory cube (HMC) deployed near memory pools.
Figure 14B:
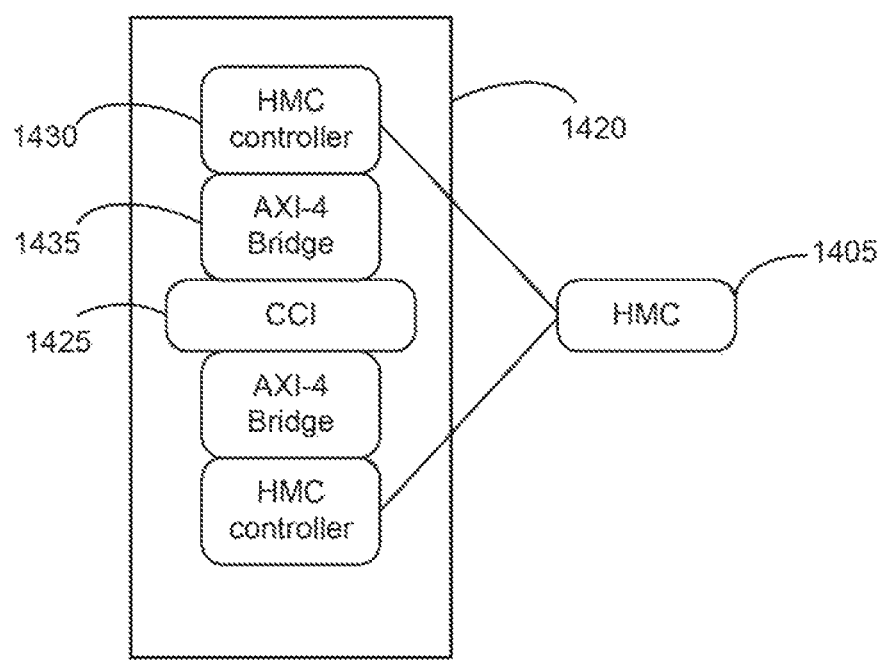
FIG. 14B is a diagram showing a private HMC of compute nodes coupled to a HMC deployed near memory pool.

As shown in FIG. 14A, pooled memory functionality in accordance with the present invention can be implemented in the form of HMC deployed near memory pools. In such an implementation, a HMC unit (i.e., pooled memory) is shared by a plurality of compute nodes 1410 (i.e., the shared HMC unit 1405). For example, the compute nodes 1410 can all be of a common compute node card such as the Caixeda brand EnergyCard. As shown, each one of the compute nodes 1410 can also have respective base memory 1415. In this manner, the compute nodes 1410 can have non-coherent, shared memory and, optionally, private mutable memory. Referring to the pooled memory server apparatus discussed above in reference to FIGS. 8a-8c, the HMC unit can be embodied in the form of the memory controller node chassis 821 and the compute nodes 1410. CPU resources can be embodied in the form of the compute node chassis 823 and the HMC unit 1405 can be embodied in the form of the memory controller chassis. As a skilled person will appreciate, the near memory pools implemented with HMC units do not require a fabric for data communication. As shown in FIG. 14B, each one of the compute nodes 1410 has a respective private HMC 1420. The private HMC 1420 and the shared HMC 1405 each provide HMC links for supporting communication of data therebetween (e.g., 16-lane HMC link with 40 GB/sec link capacity). For example, the HMC units can each include a cache coherent interconnect 1425 (e.g., a fabric bus) having two memory ports (e.g., 25 GB/sec link capacity each) each coupled to a respective HMC controller 1430 by a bridge 1435. In view of the disclosures made herein, a skilled person will appreciate the compute nodes 1410 can be SoC nodes that are interconnected to each other through a node interconnect fabric and that access to the memory resources of the HMC unit 1405 is made over a respective communication link of the HMC unit 1405 without traversing any communication channel of the node interconnect fabric.

Example 12: Far Memory Pool Using Pooled Memory Functionality

Pooled memory functionality in accordance with the present invention can be implemented in the form of far memory pools. In such an implementation, pooled memory is shared by a plurality of compute nodes such as those of a compute node chassis configured in accordance with the present invention. The shared memory can be in the form of cache coherent DDR or cache coherent HMC such as that of a memory controller chassis configured in accordance with the present invention. The shared memory is accessed via a fabric that interconnects the computer nodes. Preferably, but not necessarily, the compute nodes are all of a common compute node card such as the Calxeda brand EnergyCard. Each one of the compute nodes can also have respective base memory. In this manner, the compute nodes can have non-coherent, shared memory and, optionally, private mutable memory.

In summary, in view of the disclosures made herein, a skilled person will appreciate that a system on a chip (SOC) refers to integration of one or more processors, one or more memory controllers, and one or more I/O controllers onto a single silicone chip. Furthermore, in view of the disclosures made herein, the skilled person will also appreciate that a SOC configured in accordance with the present invention can be specifically implemented in a manner to provide functionalities definitive of a server. In such implementations, a SOC in accordance with the present invention can be referred to as a server on a chip. In view of the disclosures made herein, the skilled person will appreciate that a server on a chip configured in accordance with the present invention can include a server memory subsystem, a server I/O controllers, and a server node interconnect. In one specific embodiment, this server on a chip will include a multi-core CPU, one or more memory controllers that supports ECC, and one or more volume server I/O controllers that minimally includes Ethernet and SATA controllers. The server on a chip can be structured as a plurality of interconnected subsystems, including a CPU subsystem, a peripherals subsystem, a system interconnect subsystem, and a management subsystem.

An exemplary embodiment of a server on a chip that is configured in accordance with the present invention is the ECX-1000 Series server on a chip offered by Caxeda incorporated. The ECX-1000 Series server on a chip includes a SOC architecture that provides reduced power consumption and reduced space requirements. The ECX-1000 Series server on a chip is well suited for computing environments such as, for example, scalable analytics, webserving, media streaming, infrastructure, cloud computing and cloud storage. A node card configured in accordance with the present invention can include a node card substrate having a plurality of the ECX-1000 Series server on a chip instances (i.e., each a server on a chip unit) mounted on the node card substrate and connected to electrical circuitry of the node card substrate. An electrical connector of the node card enables communication of signals between the node card and one or more other instances of the node card.

The ECX-1000 Series server on a chip includes a CPU subsystem (i.e., a processor complex) that uses a plurality of ARM brand processing cores (e.g., four ARM Cortex brand processing cores), which offer the ability to seamlessly turn on-and-off up to several times per second. The CPU subsystem is implemented with server-class workloads in mind and comes with a ECC L2 cache to enhance performance and reduce energy consumption by reducing cache misses. Complementing the ARM brand processing cores is a host of high-performance server-class I/O controllers via standard interfaces such as SATA and PCI Express interfaces. Table 3 below shows technical specification for a specific example of the ECX-1000 Series server on a chip.

TABLE 3

| Example of ECX-1000 Series server on a chip technical specification | | |
|---|---|---|
| Processor Cores | 1. | Up to four ARM ® Cortex ™-A9 cores @ 1.1 to 1.4 GHz |
| | 2. | NEON ® technology extensions for multimedia and SIMD processing |
| | 3. | Integrated FPU for floating point acceleration |
| | 4. | Calxeda brand TrustZone ® technology for enhanced security |
| | 5. | Individual power domains per core to minimize overall power consumption |
| Cache | 1. | 32 KB L1 instruction cache per core |
| | 2. | 32 KB L1 data cache per core |
| | 3. | 4 MB shared L2 cache with ECC |
| Fabric Switch | 1. | Integrated 80 Gb (8 × 8) crossbar switch with through-traffic support |
| | 2. | Five (5) 10 Gb external channels, three (3) 10 Gb internal channels |
| | 3. | Configurable topology capable of connecting up to 4096 nodes |
| | 4. | Dynamic Link Speed Control from 1 Gb to 10 Gb to minimize power and maximize performance |
| | 5. | Network Proxy Support to maintain network presence oven with node powered off |
| Management Engine | 1. | Separate embedded processor dedicated for systems management |
| | 2. | Advanced power management with dynamic power capping |
| | 3. | Dedicated Ethernet MAC for out-of-band communication |
| | 4. | Supports IPMI 2.0 and DCMI management protocols |
| | 5. | Remote console support via Serial-over-LAN (SoL) |
| Integrated Memory Controller | 1. | 72-bit DDR controller with ECC support |
| | 2. | 32-bit physical memory addressing |
| | 3. | Supports DDR3 (1.5 V) and DDR3L (1.35 V) at 800/1066/1333 MT/s |
| | 4. | Single and dual rank support with mirroring |
| PCI Express | 1. | Four (4) integrated GEN2 PCIe controllers |
| | 2. | One (1) integrated Gen1 PCIe controller |
| | 3. | Support for up to two (2) PCIe ×8 lanes |
| | 4. | Support for up to four(4) PCIe ×1, ×2 or ×4 lanes |
| Networking Interfaces | 1. | Support 1 Gb and 10 Gb Ethernet |
| | 2. | Up to five (5) XAUI 10 Gb ports |
| | 3. | Up to six (6) 1 Gb SGMII ports (multiplexed w/XAUI ports) |
| | 4. | Three (3) 10 Gb Ethernet MACS supporting IEEE 802.1Q VLANs, IPv4/6 checksum processing, and TCP/UDP/ICMP checksum offload |

TABLE 3-continued

Example of ECX-1000 Series server on a chip technical specification

|  |  |  |
|---|---|---|
|  | 5. | Support for shared or private management LAN |
| SATA | 1. | Support for up to five (5) SATA disks |
| Controllers | 2. | Compliant with Serial ATA 2.0, AHCI Revision 1.3, and eSATA specifications |
|  | 3. | SATA 1.5 Gb/s and 3.0 Gb/s speeds supported |
| SD/eMMC | 1. | Compliant with SD 3.0 Host and MMC 4.4 (eMMC) specifications |
| Controller | 2. | Supports 1 and 4-bit SD modes and 1/4/8-bit MMC modes |
|  | 3. | Read/write rates up to 832 Mbps for MMC and up to 416 Mbps for SD |
| SSystem | 1. | Three (3) 12C interfaces |
| Integration | 2. | Two (2) SPI (master) interface |
| Features | 3. | Two (2) high-speed DART interfaces |
|  | 4. | 64 GPIO/Interrupt pins |
|  | 5. | JTAG debug port |

Figure 15:
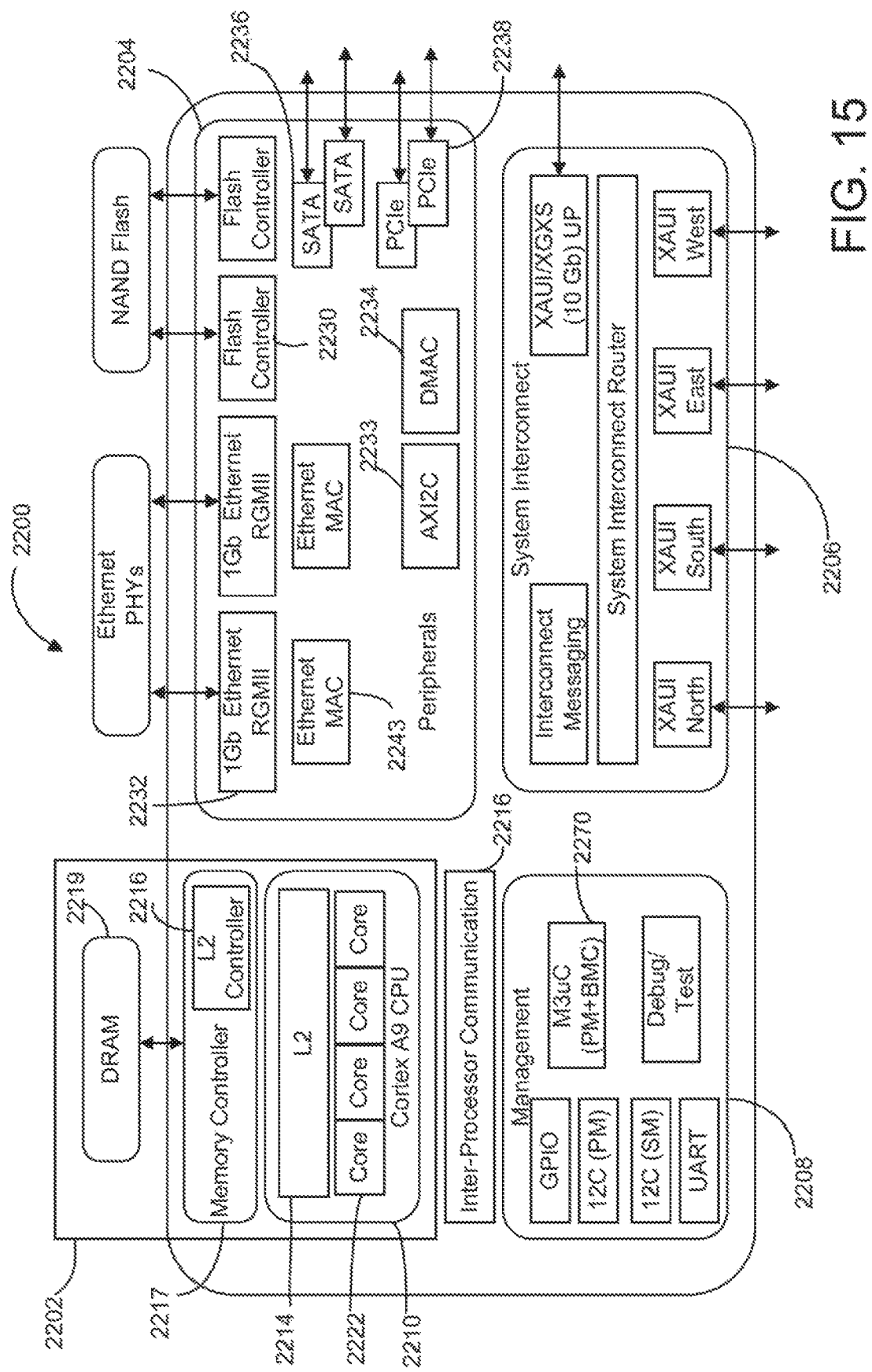
FIG. 15 illustrates a logical view of a system on a chip (SoC).

FIG. 15 shows a SoC unit (i.e., SoC 2200) configured in accordance with an embodiment of the present invention. More specifically, the SoC 2200 is configured for implementing discovery functionalities as disclosed herein. The SoC 2200 can be utilized in standalone manner. Alternatively, the SoC 2200 can be utilized in combination with a plurality of other SoCs on a node card such as, for example, with each one of the SoCs being associated with a respective node of the node card.

The SoC 2200 includes anode CPU subsystem 2202, a peripheral subsystem 2204, a system interconnect subsystem 2206, and a management subsystem 2208. In this regard, a SoC configured in accordance with the present invention can be logically divided into several subsystems. Each one of the subsystems includes a plurality of operation components therein that enable a particular one of the subsystems to provide functionality thereof. Furthermore, each one of these subsystems is preferably managed as independent power domains.

The node CPU subsystem 2202 of SoC 2200 provides the core CPU functionality for the SoC, and runs the primary user operating system (e.g. Ubuntu Linux). The Node CPU subsystem 2202 comprises a node CPU 2210, a L2 cache 2214, a L2 cache controller 2216, memory controller 2217, and main memory 2219. The node CPU 2210 includes 4 processing cores 2222 that share the L2 cache 2214. Preferably, the processing cores 2222 are each an ARM Cortex A9 brand processing core with an associated media processing engine (e.g., Neon brand processing engine) and each one of the processing cores 2222 can have independent L1 instruction cache and L1 data cache. Alternatively, each one of the processing cores can be a different brand of core that functions in a similar or substantially the same manner as ARM Cortex A9 brand processing core. Each one of the processing cores 2222 and its respective L1 cache is in a separate power domain. Optionally, the media processing engine of each processing core 2222 can be in a separate power domain. Preferably, all of the processing cores 2222 within the node CPU subsystem 2202 run at the same speed or are stopped (e.g., idled, dormant or powered down).

The memory controller 2217 is coupled to the L2 cache 2214 and to a peripheral switch of the peripheral subsystem 2204. Preferably, the memory controller 2217 is configured to control a plurality of different types of main memory (e.g., DDR3, DDR3L, LPDDR2). An internal interface of the memory controller 2217 can include a core data port, a peripherals data port, a data port of a power management unit (PMU) portion of the management subsystem 2208, and an asynchronous 32-bit AHB slave port. The PMU data port is desirable to ensure isolation for some low power states. The asynchronous 32-bit AHB slave port is used to configure the memory controller 2217 and access its registers. The asynchronous 32-bit AHB slave port is attached to the PMU fabric and can be synchronous to the PMU fabric in a similar manner as the asynchronous interface is at this end. In one implementation, the memory controller 2217 is an AXI interface (i.e., an Advanced eXtensible Interface).

The peripheral subsystem 2204 of SoC 2200 has the primary responsibility of providing interfaces that enable information storage and transfer functionality. This information storage and transfer functionality includes information storage and transfer both within a given SoC Node and with SoC Nodes accessibly by the given SoC Node. Examples of the information storage and transfer functionality include, but are not limited to, flash interface functionality, PCIe interface functionality, SATA interface functionality, and Ethernet interface functionality. The peripheral subsystem 2204 can also provide additional information storage and transfer functionality such as, for example, direct memory access (DMA) functionality. Each of these peripheral subsystem functionalities is provided by one or more respective controllers that interface to one or more corresponding storage media (i.e., storage media controllers).

The peripherals subsystem 2204 includes the peripheral switch and a plurality of peripheral controllers for providing the abovementioned information storage and transfer functionality. The peripheral switch can be implemented in the form of a High-Performance Matrix (HPM) that is a configurable auto-generated advanced microprocessor bus architecture 3 (i.e., AMBA protocol 3) bus subsystem based around a high-performance AXI cross-bar switch known as the AXI bus matrix, and extended by AMBA infrastructure components.

The peripherals subsystem 2204 includes flash controllers 2230 (i.e. a first type of peripheral controller). The flash controllers 2230 can provide support for any number of different flash memory configurations. A NAND flash controller such as that offered under the brand name Denali is an example of a suitable flash controller Examples of flash media include MultiMediaCard (MMC) media, embedded MultiMediaCard (eMMC) media, Secure Digital (SD) media, SLC/MLC+ECC media, and the like. Memory is an example of media (i.e., storage media) and error correcting code (ECC) memory is an example of a type of memory to which the main memory 2217 interfaces (e.g., main memory 2219).

The peripherals subsystem 2204 includes Ethernet MAC controllers 2232 (i.e. a second type of peripheral controller). Each Ethernet MAC controller 2232 can be of the universal 1Gig design configuration or the 10G design configuration. The universal 1Gig design configuration offers a preferred interface description. The Ethernet MAC controllers 2232 includes a control register set and a DMA (i.e., an AXI master and an AXI slave). Additionally, the peripherals subsystem 2204 can include an AXI2 Ethernet controller 2233. The peripherals subsystem 2204 includes a DMA controller 2234 (i.e., (i.e. a third type of peripheral controller). DMA functionality is useful only for fairly large transfers. Thus, because private memory of the management subsystem 2208 is relatively small, the assumption is that associated messages will be relatively small and can be handled by an interrupt process. If the management subsystem 2208 needs/wants large data transfer, it can power up the whole system except the cores and then DMA is available. The peripherals subsystem 2204 includes a SATA controller 2236 (i.e. a fourth type of peripheral controller). The peripherals subsystem 2204 also includes PCIe controllers 2238. As will be discussed below in greater detail, a XAUI controller of the peripherals subsystem 2204 is provided for enabling interfacing with other CPU nodes (e.g., of a common node card).

The system interconnect subsystem 2206 is a packet switch that provides intra-node and inter-node packet connectivity to Ethernet and within a cluster of nodes (e.g., small clusters up through integration with heterogeneous large enterprise data centers). The system interconnect subsystem 2206 provides a high-speed interconnect fabric, providing a dramatic increase in bandwidth and reduction in latency compared to traditional servers connected via 1 Gb Ethernet to a top of rack switch. Furthermore, the system interconnect subsystem 2206 is configured to provide adaptive link width and speed to optimize power based upon utilization.

An underlying objective of the system interconnect subsystem 2206 is support a scalable, power-optimized cluster fabric of server nodes. As such, the system interconnect subsystem 2206 has three primary functionalities. The first one of these functionalities is serving as a high-speed fabric upon which TCP/IP networking is built and upon which the operating system of the node CPU subsystem 2202 can provide transparent network access to associated network nodes and storage access to associated storage nodes. The second one of these functionalities is serving as a low-level messaging transport between associated nodes. The third one of these functionalities is serving as a transport for remote DMA between associated nodes.

The system interconnect subsystem 2206 can be connected to the node CPU subsystem 2202 and the management subsystem 2208 through a bus fabric (i.e., Ethernet AXIs) of the system interconnect subsystem 2206. An Ethernet interface of the system interconnect subsystem 2206 can be connected to peripheral interfaces (e.g., interfaces 2230, 2232, 2234, 2238) of the peripheral subsystem 2204. A fabric switch (i.e., a switch-mux) can be coupled between the XAUI link ports of the system interconnect subsystem 2206 and one or more MAC's 2243 of the system interconnect subsystem 2206. The XAUI link ports and MACs (i.e., high-speed interconnect interfaces) enabling the node that comprises the SoC 2200 to be connected to associated nodes each having their own SoC (e.g., identically configured SoCs).

The processor cores 2222 (i.e., A9 cores) of the node CPU subsystem 2202 and management processor 2270 (i.e., M3) of the management subsystem 2208 can address MACs (e.g., MAC 2243) of the system interconnect subsystem 2206. In certain embodiments, the processor cores 2222 of the node CPU subsystem 2202 will utilize a first MAC and second MAC and the management processor 2270 of the management subsystem 2208 will utilize a third MAC. To this end, MACs of the system interconnect subsystem 2206 can be configured specifically for their respective application.

The management subsystem 2208 is coupled directly to the node CPU subsystem 2202 and directly to the to the system interconnect subsystem 2206. An inter-processor communication (IPC) module (i.e., iPCM) of the management subsystem 2208, which includes IPC 2216, is coupled to the node CPU subsystem 2202, thereby directly coupling the management subsystem 2208 to the node CPU subsystem 2202. The management processor 2270 of the management subsystem 2208 is preferably, but not necessarily, an ARM Cortex brand M3 microprocessor. The management processor 2270 can have private ROM and private SRAM. The management processor 2270 can be coupled to shared peripherals and private peripherals of the management subsystem 2208. The private peripherals are only accessible by the management processor, whereas the shared peripherals are accessible by the management processor 2270 and each of the processing cores 2222. Instructions for implementing embodiments of the present invention (e.g., functionalities, processes and/or operations associated with r4emote memory access, pooled memory access, memcache, distributed memory, server resource disaggregation, and the like) can reside in non-transitory memory coupled to/allocated to the management processor 2270.

Additional capabilities arise because the management processor 2270 has visibility into all buses, peripherals, and controllers. It can directly access registers for statistics on all buses, memory controllers, network traffic, fabric links, and errors on all devices without disturbing or even the knowledge of the access by the core processing cores 2222. This allows for billing use cases where statistics can be gathered securely by the management processor without having to consume core processing resources (e.g., the processing cores 2222) to gather, and in a manner that cannot be altered by the core processor 2222.

The management processor 2270 has a plurality of responsibilities within its respective node One responsibility of the management processor 2270 is booting an operating system of the node CPU 2210. Another responsibility of the management processor 2270 is node power management. Accordingly, the management subsystem 2208 can also be considered to comprise a power management Unit (PMU) for the node and thus, is sometime referred to as such. As discussed below in greater detail, the management subsystem 2208 controls power states to various power domains of the SoC 2200 (e.g., to the processing cores 2222 by regulating clocks) The management subsystem 2208 is an "always-on" power domain. However, the management processor 2270 can turn off the clocks to the management processor 2270 and/or its private and/or shared peripherals to reduce the dynamic power. Another responsibility of the management processor 2270 is varying synchronized clocks of the node CPU subsystem 2202 (e.g., of the node CPU 2210 and a snoop control unit (SCU)). Another responsibility of the management processor 2270 is providing baseboard management control (BMC) and IPMI functionalities including console virtualization. Another responsibility of the management processor 2270 is providing router management. Another responsibility of the management processor 2270 is acting as proxy for the processing cores 2222 for interrupts and/or for network traffic. For example, a generalized interrupt controller (GIC) of the node CPU subsystem 2202 will cause interrupts intended to be received by a particular one of the processing core 2222 to be reflected to the management processor 2270 for allowing the management processor 2270 to wake the particular one of the processing cores 2222 when an interrupt needs to be processed by the particular one of the of the processing cores that is sleeping, as will be discussed below in greater detail. Another responsibility of the management processor 2270 is controlling phased lock loops (PLLs). A frequency is set in the PLL and it is monitored for lock. Once lock is achieved the output is enabled to the clock control unit (CCU). The CCU is then signaled to enable the function. The management processor 2270 is also responsible for selecting the dividers but the actual change over will happen in a single cycle in hardware. Another responsibility of the management processor 2270 is controlling a configuration of a variable internal supply used to supply electrical power to the node CPU subsystem 2202. For example, a plurality of discrete power supplies (e.g., some being of different power supplying specification than others (e.g., some having different power capacity levels)) can be selectively activated and deactivated as necessary for meeting power requirements of the node CPU subsystem 2202 (e.g., based on power demands of the processing cores 2222, the SCU, and/or the controller of the L2 cache 2214). A separate power control mechanism (e.g., switch) can be used to control power supply to each of the processing cores 2222 and separately to the SCU Another responsibility of the management processor 2270 is managing a real-time-clock (RTC) that exists on a shared peripheral bus of the management subsystem 2208. Another responsibility of the management processor 2270 is managing a watchdog timer on a private peripheral bus of the management subsystem 2208 to aid in recovery from catastrophic software failures. Still another responsibility of the management processor 2270 is managing an off-board EEPROM. The off-board EEPROM is device is used to store all or a portion of boot and node configuration information as well as all or a portion of IPMI statistics that require non-volatile storage. Each of these responsibilities of the management processor 2270 is an operational functionality managed by the management processor 2270. Accordingly, operational management functionality of each one of the subsystem refers to two or more of these responsibilities being managed by the management processor 2270.

Figure 16:
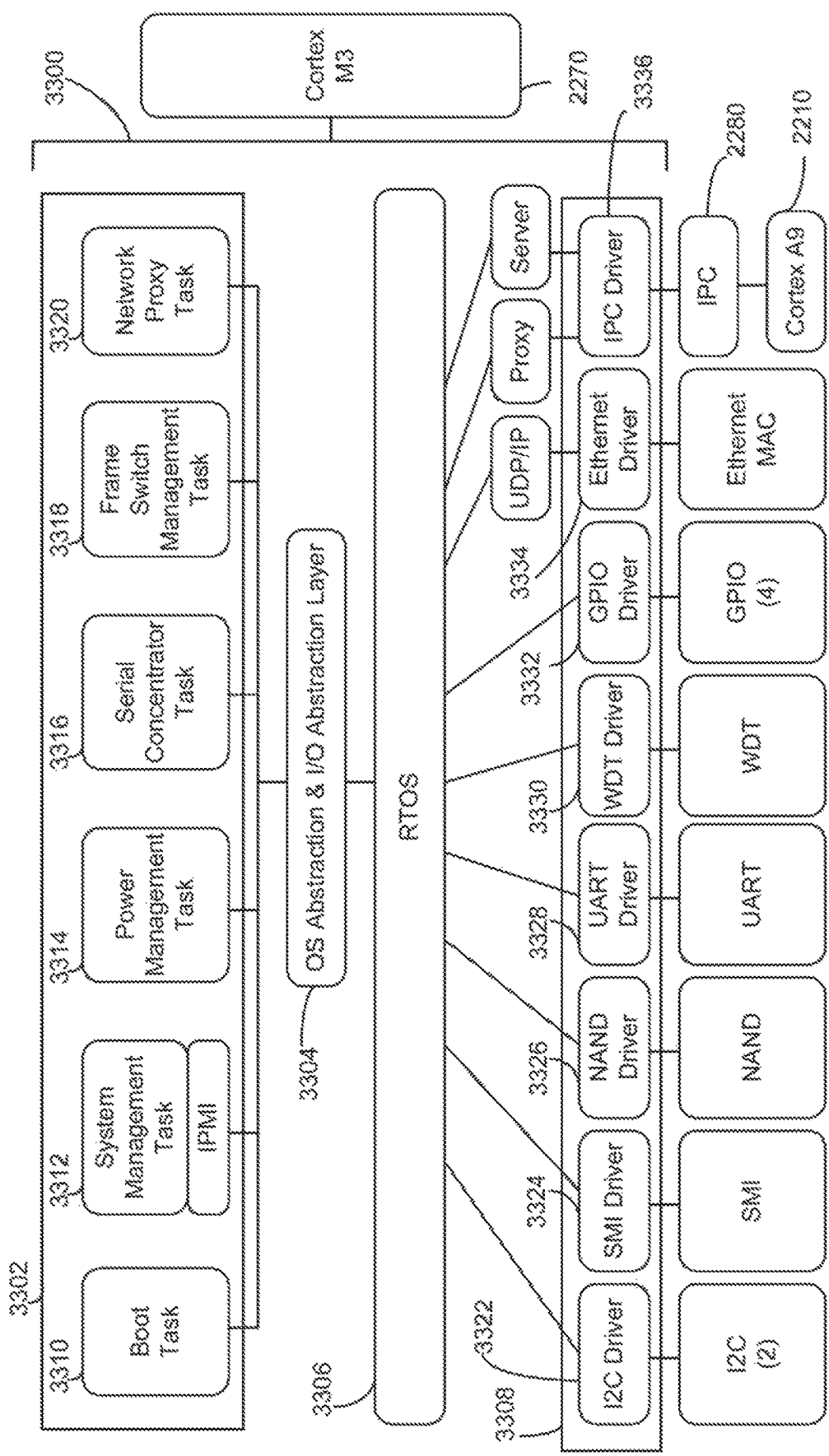
FIG. 16 illustrates a software view of a power management unit.

As shown in FIG. 16, software 3300 is provided on the management processor 2270. The management processor 2270 includes a plurality of application tasks 3302, an operating system (OS)/input-output (I/O) abstraction layer 3304, a real-time operating system (RTOS) 3306, and device drivers 3308 for the various devices. The operating system (OS)/input-output (10) abstraction layer 3304 is a software layer that resides between the application tasks3 302 and the real-time operating system (RTOS) 3306. The operating system (OS)/input-output (I/O) abstraction layer 3304 aids in porting acquired software into this environment. The OS abstraction portion of the operating system (OS)/input-output (I/O) abstraction layer 3304 provides posix-like message queues, semaphores and mutexes. The device abstraction portion of the operating system (OS)/input-output (I/O) abstraction layer 3304 provides a device-transparent open/close/read/write interface much like the posix equivalent for those devices used by ported software. The real-time operating system (RTOS) 3306 resides between the operating system (OS)/input-output (I/O) abstraction layer 3304 and the device drivers 3308.

The application tasks 3302 include, but are not limited to, a boot task 3310, a system management task 3312, a power management task 3314, a serial concentrator task 3316, a frame switch management task 3318 (sometimes called routing management), and a network proxy task 3320. The boot task 3310 provides the function of booting the processing cores 2222 and the management processor 2270. The system management task3 312 provides the function of integrated operation of the various subsystems of the SOC 2200. The power management task 3314 provides the function of managing power utilization of the various subsystems of the SOC 2200. The serial concentrator task 3316 provides the function of managing communication from the other application tasks to a system console. This console may be directly connected to the SOC node via a DART (i.e., a universal asynchronous receiver/transmitter) or it can be connected to another node in the system. The frame switch management task 3318 (sometimes called routing management) is responsible for configuring and managing routing network functionality. As discussed in greater detail below, the network proxy task 3320 maintains network presence of one or more of the processing cores 2222 while in a low-power sleep/hibernation state and to intelligently wake one or more of the processing cores 2222 when further processing is required.

Device drivers 3308 are provided for all of the devices that are controlled by the management processor 2270. Examples of the device drivers 3308 include, but are not limited to, an I2C driver 3322, a SMI driver 3324, a flash driver 3326 (e.g., NAND type storage media), a UART driver 3328, a watchdog time (i.e., WDT) driver 3330, a general purpose input-output (i.e., GPIO) driver 332, an Ethernet driver 3334, and an IPC driver 336. In many cases, these drivers are implemented as simple function calls. In some cases where needed for software portability, however, a device-transparent open/close/read/write type I/O abstraction is provided on top of these functions.

In regard to boot processes, it is well known that multiple-stage boot loaders are often used, during which several programs of increasing complexity sequentially load one after the other in a process of chain loading. Advantageously, however, the node CPU 2210 only runs one boot loader before loading the operating system. The ability for the node CPU 2210 to only run one boot loader before loading the operating system is accomplished via the management processor 2270 preloading a boot loader image into main memory (e.g., DRAM) of the node CPU subsystem before releasing the node CPU 2210 from a reset state. More specifically, the SOC 2200 can be configured to use a unique boot process, which includes the management processor 2270 loading a suitable OS boot loader (e.g., U-Boot) into main memory, starting the node CPU 2210 main OS boot loader (e.g., UEFI or U-Boot), and then loading the OS. This eliminates the need for a boot ROM for the node CPU, a first stage boot loader for the node CPU, and dedicated SRAM for boot of the node CPU.

While the foregoing has been with reference to a particular embodiment of the invention, it will be appreciated by those skilled in the art that changes in this embodiment may be made without departing from the principles and spirit of the disclosure, the scope of which is defined by the appended claims.

What is claimed is:

1. A method for use in a system comprising a first node server and a second node server, the method comprising:
performing the following at the second node server, wherein the second node server comprises a memory:
receiving a remote mapping request from the first node server to map a physical address in the memory to an address space of the first node server;
determining whether to accept the remote mapping request;
in response to determining to accept the remote mapping request, mapping the physical address in the memory to the address space of the first node server; and
receiving a request from the first node server to access data stored in the physical address in the memory using the mapping.

2. The method of claim 1, further comprising:
in response to receiving the request, sending the data to the first node server using a remote memory access channel.

3. The method of claim 2, wherein the data is sent to the first node server using a remote memory access channel.

4. The method of claim 1, wherein the data is accessed directly from the physical address by the first node server.

5. The method of claim 1, wherein:
the first node server comprises a node density configuration enabling the first node server to provide information computing resources to one or more data processing systems; and
the second node server comprises a memory configuration enabling the second node server to enable memory resources thereof to be allocated to caching data for applications running on the one or more data processing systems.

6. The method of claim 1, further comprising:
in response to determining not to accept the remote mapping request, preventing the first node server from accessing the data.

7. A non-transitory computer-readable medium having tangibly embodied thereon and accessible therefrom a set of instructions interpretable by one or more data processing devices of a system comprising a first node server and a second node server, wherein the set of instructions is configured to cause the one or more data processing devices of the second node server to implement operations for:
receiving a remote mapping request from the first node server to map a physical address in the memory to an address space of the first node server;
determining whether to accept the remote mapping request;
in response to determining to accept the remote mapping request, mapping the physical address in the memory to the address space of the first node server; and
receiving a request from the first node server to access data stored in the physical address in the memory using the mapping.

8. The non-transitory computer-readable medium of claim 7, wherein the set of instructions is further configured to cause the one or more data processing devices of the second node server to implement an operation for:
in response to receiving the request, sending the data to the first node server using a remote memory access channel.

9. The non-transitory computer-readable medium of claim 8, wherein the data is sent to the first node server using a remote memory access channel.

10. The non-transitory computer-readable medium of claim 7, wherein the data is accessed directly from the physical address by the first node server.

11. The non-transitory computer-readable medium of claim 7, wherein:
the first node server comprises a node density configuration enabling the first node server to provide information computing resources to one or more data processing systems; and
the second node server comprises a memory configuration enabling the second node server to enable memory resources thereof to be allocated to caching data for applications running on the one or more data processing systems.

12. The non-transitory computer-readable medium of claim 7, wherein the set of instructions is further configured to cause the one or more data processing devices of the second node server to implement an operation for:
in response to determining not to accept the remote mapping request, preventing the first node server from accessing the data.

13. A system comprising:
a first node server; and
a second node server configured to:
receive a remote mapping request from the first node server to map a physical address in the memory to an address space of the first node server;
determine whether to accept the remote mapping request;
in response to determining to accept the remote mapping request, map the physical address in the memory to the address space of the first node server; and
receive a request from the first node server to access data stored in the physical address in the memory using the mapping.

14. The system of claim 13, wherein the second node server is further configured to:
in response to receiving the request, send the data to the first node server using a remote memory access channel.

15. The system of claim 13, wherein the data is accessed directly from the physical address by the first node server.

16. The system of claim 13, wherein:
the first node server comprises a node density configuration enabling the first node server to provide information computing resources to one or more data processing systems; and
the second node server comprises a memory configuration enabling the second node server to enable memory resources thereof to be allocated to caching data for applications running on the one or more data processing systems.

17. The system of claim 13, wherein the second node server is further configured to:
in response to determining not to accept the remote mapping request, prevent the first node server from accessing the data.

* * * * *

UNITED STATES PATENT AND TRADEMARK OFFICE
CERTIFICATE OF CORRECTION

PATENT NO.      : 11,526,304 B2
APPLICATION NO. : 17/089207
DATED           : December 13, 2022
INVENTOR(S)     : Mark Bradley Davis Page 1 of 1

It is certified that error appears in the above-identified patent and that said Letters Patent is hereby corrected as shown below:

In the Claims

In Column 29, Claim 7, Line 28, delete "the memory" and replace with --a memory--.

In Column 30, Claim 13, Line 20, delete "the memory" and replace with --a memory--.

Signed and Sealed this
Twenty-fourth Day of October, 2023

Katherine Kelly Vidal
*Director of the United States Patent and Trademark Office*